(12) United States Patent
Katakura

(10) Patent No.: US 8,582,211 B2
(45) Date of Patent: Nov. 12, 2013

(54) ZOOM LENS AND IMAGE PICKUP APPARATUS EQUIPPED WITH SAME

(71) Applicant: Olympus Imaging Corp., Tokyo (JP)

(72) Inventor: Masahiro Katakura, Tokyo (JP)

(73) Assignee: Olympus Imaging Corp., Tokyo (JP)

( * ) Notice: Subject to any disclaimer, the term of this patent is extended or adjusted under 35 U.S.C. 154(b) by 0 days.

(21) Appl. No.: 13/770,563

(22) Filed: Feb. 19, 2013

(65) Prior Publication Data

US 2013/0242164 A1  Sep. 19, 2013

Related U.S. Application Data

(62) Division of application No. 13/237,194, filed on Sep. 20, 2011, now Pat. No. 8,390,938, which is a division of application No. 12/586,039, filed on Sep. 16, 2009, now Pat. No. 8,023,199.

(30) Foreign Application Priority Data

Oct. 10, 2008 (JP) .................. 2008-264104
Dec. 8, 2008 (JP) .................. 2008-312548

(51) Int. Cl.
  G02B 15/14 (2006.01)
(52) U.S. Cl.
  USPC .................. 359/682; 359/689
(58) Field of Classification Search
  USPC .................. 359/680–682, 689
  See application file for complete search history.

(56) References Cited

U.S. PATENT DOCUMENTS

| | | | |
|---|---|---|---|
| 4,304,466 A | 12/1981 | Betensky | |
| 5,054,897 A | 10/1991 | Ozawa | |
| 6,124,984 A | 9/2000 | Shibayama et al. | |
| 6,829,101 B2 | 12/2004 | Mihara et al. | |
| 7,042,652 B2 | 5/2006 | Nose et al. | |
| 7,075,733 B2 | 7/2006 | Itoh | |
| 7,110,187 B2 | 9/2006 | Shirota | |
| 7,277,233 B2 | 10/2007 | Satori | |
| 7,295,381 B2 | 11/2007 | Ito | |
| 7,576,924 B2 | 8/2009 | Katakura | |
| 2003/0184875 A1 | 10/2003 | Mihara et al. | |
| 2005/0200972 A1 | 9/2005 | Nose et al. | |
| 2005/0280902 A1 | 12/2005 | Itoh | |
| 2006/0152815 A1 | 7/2006 | Satori | |
| 2006/0181782 A1 | 8/2006 | Shirota | |
| 2007/0070495 A1 | 3/2007 | Hirose | |
| 2007/0115558 A1 | 5/2007 | Ito | |
| 2007/0211350 A1 | 9/2007 | Kurioka | |
| 2008/0043341 A1 | 2/2008 | Ori | |

FOREIGN PATENT DOCUMENTS

| | | |
|---|---|---|
| JP | 11-052246 | 2/1999 |
| JP | 2003-114386 | 4/2003 |
| JP | 2003-241091 | 8/2003 |
| JP | 2005-258059 | 9/2005 |
| JP | 2006-003539 | 1/2006 |
| JP | 2006-194975 | 7/2006 |
| JP | 2006-195064 | 7/2006 |
| JP | 2006-201599 | 8/2006 |
| JP | 2006-227197 | 8/2006 |
| JP | 2007-114727 | 5/2007 |
| JP | 2007-140359 | 6/2007 |
| JP | 2007-272216 | 10/2007 |
| JP | 2008-046529 | 2/2008 |

Primary Examiner — Scott J Sugarman
(74) Attorney, Agent, or Firm — Kenyon & Kenyon LLP

(57) ABSTRACT

A zoom lens has a plurality of lens units including, in order from its object side to image side, a first lens unit having a negative refracting power composed of two lens elements including a biconcave negative lens and a positive lens, and a second lens unit having a positive refracting power composed of four lens elements including a positive lens and a negative lens. During zooming from the wide angle end to the telephoto end, a distance between the lens units changes, and the second lens unit moves toward the object side. The zoom lens has an aperture stop that moves integrally with the second lens during the zooming and satisfies a specific condition.

16 Claims, 27 Drawing Sheets

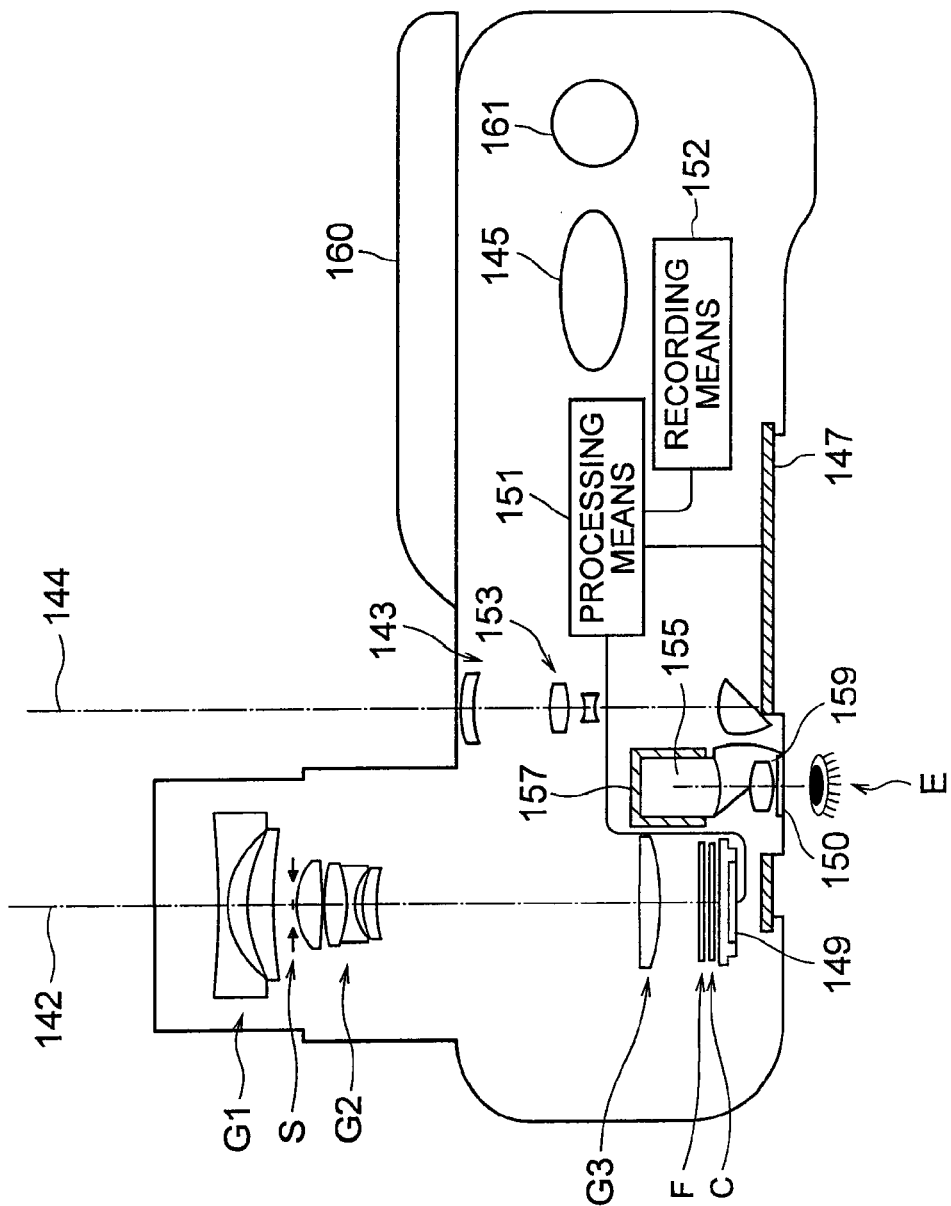

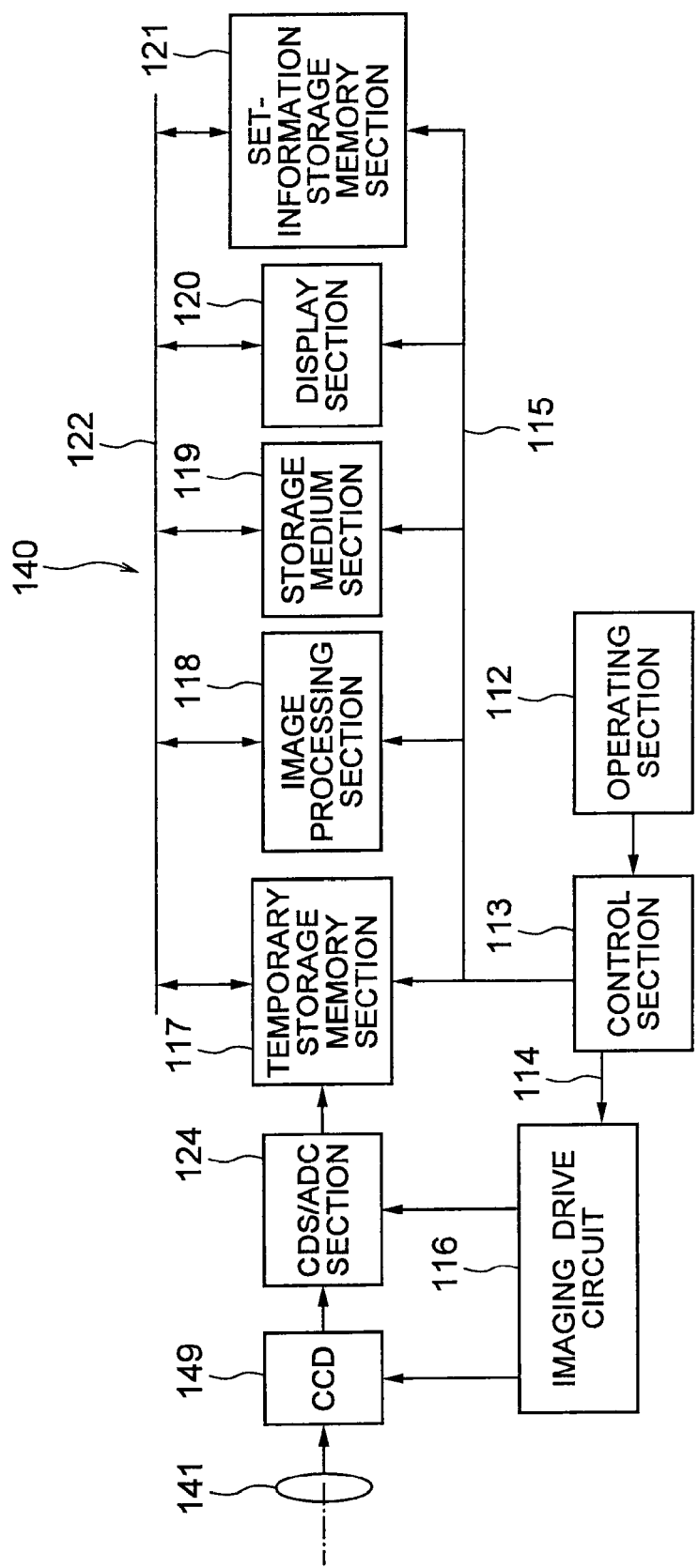

ZOOM LENS AND IMAGE PICKUP APPARATUS EQUIPPED WITH SAME

CROSS-REFERENCE TO RELATED APPLICATION

The present application is a divisional application of U.S. patent application Ser. No. 13/237,194 filed on Sep. 20, 2011, which is a divisional of U.S. patent application Ser. No. 12/586,039 filed on Sep. 16, 2009, which is based upon and claims the benefit of priority from the prior Japanese Patent Application Nos. 2008-264104 filed on Oct. 10, 2008 and 2008-312548 filed on Dec. 8, 2008; the entire contents of which are incorporated herein by reference.

BACKGROUND OF THE INVENTION

1. Field of the Invention

The present invention relates to a zoom lens in which the lens unit located closest to the object side has a negative refracting power. The present invention also relates to an image pickup apparatus, such as a digital camera, a video camera, or a camera-equipped cellular phone, equipped with a zoom lens.

2. Description of the Related Art

It has been conventionally known that a type of zoom lens in which the lens unit located closest to the object side has a negative refracting power is more advantageous in achieving a large angle of view and size reduction than a type of zoom lens in which the lens unit located closest to the object side has a positive refracting power. In addition, zoom lenses in which the lens unit located closest to the object side has a negative refracting power is also advantageous in reducing the thickness (i.e. the length along the optical axis) of the zoom lens in the state in which the lens barrel is collapsed, and therefore such zoom lenses are used, for example, as taking zoom lenses of compact digital cameras.

Among this type of zoom lenses in which the frontmost lens unit has a negative refracting power, there have been known zoom lenses in which the number of lenses in the first lens unit having a negative refracting power is as small as two, and the number of lenses in the second lens unit having a positive refracting power is four, whereby good optical performance is achieved (see patent documents 1 to 9 listed below).

The zoom lenses disclosed in patent documents 1 to 9 have the first lens unit (i.e. the frontmost lens unit) composed of two lens elements including a negative lens and a positive lens. This lens configuration is advantageous in reducing chromatic aberration in the first lens unit and in reducing the size of the zoom lens with respect to the diametrical direction. Furthermore, the negative lens in the first lens unit is designed to have a biconcave shape in the paraxial region, whereby the negative refracting power of the negative lens on the optical axis is shared by the object side surface and the image side surface. This is advantageous in reducing spherical aberration. Still further, the second lens unit is composed of four lens elements. This provides a sufficient degree of freedom in the design of the second lens unit and is advantageous in achieving good correction of aberrations in a small size zoom lens.

In recent years, image pickup apparatuses that use a CCD or CMOS sensor have replaced film cameras to become the mainstream. The size of image pickup apparatuses such as digital cameras and video cameras can easily be made small because the image pickup area thereof is relatively small.

In the field of digital cameras and video cameras that use a small image pickup element, there is a demand for image pickup apparatuses that is small in the thickness direction and has a high zoom ratio and a wide angle of view. There are known zoom lenses that are intended to be used in small-size image pickup apparatuses, as disclosed in, for example, patent documents 10 to 13 listed below.

Patent Document 1: Japanese Patent Application Laid-Open. No. 2003-114386
Patent document 2: Japanese Patent Application Laid-Open. No. 2005-258059
Patent Document 3: Japanese Patent Application Laid-Open. No. 2006-003539
Patent Document 4: Japanese Patent Application Laid-Open. No. 2006-195064
Patent Document 5: Japanese Patent Application Laid-Open. No. 2006-201599
Patent Document 6: Japanese Patent Application Laid-Open. No. 2006-227197
Patent Document 7: Japanese Patent Application Laid-Open. No. 2007-114727
Patent Document 8: Japanese Patent Application Laid-Open. No. 2007-140359
Patent Document 9: Japanese Patent Application Laid-Open. No. 2007-272216
Patent Document 10: Japanese Patent Application Laid-Open. No. 2003-241091
Patent Document 11: Japanese Patent Application Laid-Open. No. 11-52246
Patent Document 12: Japanese Patent Application Laid-Open. No. 2006-194957
Patent Document 13: Japanese Patent Application Laid-Open. No. 2008-46529

SUMMARY OF THE INVENTION

A zoom lens according to one aspect of the present invention comprises a plurality of lens units, wherein the plurality of lens units comprise, in order from its object side, a first lens unit having a negative refracting power comprising a biconcave negative lens and a positive lens, and a second lens unit having a positive refracting power comprising four lens elements comprising a positive lens and a negative lens, the total number of lens elements in the first lens unit is two, the total number of lens elements in the second lens unit is four, during zooming from the wide angle end to the telephoto end, the distance between the lens units changes, and the second lens unit moves toward the object side, the zoom lens comprises an aperture stop that moves integrally with the second lens unit during zooming from the wide angle end to the telephoto end, and the zoom lens satisfies the following conditional expressions (1A) and (2A):

$$-1.0 < (r_{11a} + r_{11b})/(r_{11a} - r_{11b}) < 0.98 \quad (1A)$$

$$-1.10 < f_{11}/r_{11b} < -0.30 \quad (2A),$$

where, $r_{11a}$ is the paraxial radius of curvature of the object side surface of the biconcave negative lens in the first lens unit, $r_{11b}$ is the paraxial radius of curvature of the image side surface of the biconcave negative lens in the first lens unit, and $f_{11}$ is the focal length of the biconcave negative lens in the first lens unit.

A zoom lens according to another aspect of the present invention comprises a plurality of lens units, wherein the plurality of lens units comprises, in order from its object side, a first lens unit having a negative refracting power, and a second lens unit having a positive refracting power, the first lens unit comprises a biconcave negative lens, the second lens unit comprises four lens elements comprising a positive lens and a negative lens, the total number of lens elements in the second lens unit is four, during zooming from the wide angle end to the telephoto end, the distance between the lens units changes, and the second lens unit moves toward the object side, the zoom lens comprises an aperture stop that moves integrally with the second lens unit during zooming from the wide angle end to the telephoto end, and the zoom lens satisfies the following conditional expressions (1A) and (3A):

$$-1.0<(r_{11a}+r_{11b})/(r_{11a}-r_{11b})<0.98 \quad (1A)$$

$$4.81<f_t/f_w<10 \quad (3A),$$

where, $r_{11a}$ is the paraxial radius of curvature of the object side surface of the biconcave negative lens in the first lens unit, $r_{11b}$ is the paraxial radius of curvature of the image side surface of the biconcave negative lens in the first lens unit, $f_t$ is the focal length of the entire zoom lens system at the telephoto end, and $f_w$ is the focal length of the entire zoom lens system at the wide angle end.

An image pickup apparatus according to still another aspect of the present invention comprises:

any one of the zoom lenses described above, an image pickup element disposed on the image side of the zoom lens to convert an optical image formed by the zoom lens into an electrical signal.

An image pickup apparatus according to still another aspect of the present invention comprises:

a zoom lens; and an image pickup element disposed on the image side of the zoom lens, the image pickup element comprising an image pickup surface and converting an image formed on the image pickup surface by the zoom lens into an electrical signal, wherein the zoom lens comprises, in order from its object side, a first lens unit having a negative refracting power, a second lens unit having a positive refracting power, and a third lens unit, the zoom lens further comprises an aperture stop that moves integrally with the second lens unit during zooming from the wide angle end to the telephoto end, during zooming from the wide angle end to the telephoto end, the first lens unit and the second lens unit move, and a distance between the lens units changes, the first lens unit comprises, in order from the object side, a negative lens and a positive lens, the total number of lens elements in the first lens unit is two, the second lens unit comprises four lens elements comprising a positive lens and a negative lens, the total number of lens elements in the second lens unit is four, and the zoom lens satisfies the following conditional expressions (1B), (2B), and (3B):

$$-1.0<(r_{1a}+r_{1b})/(r_{1a}-r_{1b})<0.98 \quad (1B)$$

$$0.30<\sigma_{2G}/ih(\max)<2.80 \quad (2B)$$

$$1.5<\Delta_{2G}/f_2<5 \quad (3B),$$

where $r_{1a}$ and $r_{1b}$ are the paraxial radii of curvature of the object side surface and the image side surface of the negative lens in the first lens unit respectively, $\sigma_{2G}$ is the thickness of the second lens unit on the optical axis, ih(max) is the maximum value of the maximum image height in an effective image pickup area on the image pickup surface, $\Delta_{2G}$ is the displacement of the position of the second lens unit at the telephoto end from the position thereof at the wide angle end, wherein a displacement toward the object side is represented by a positive value, and $f_2$ is the focal length of the second lens unit.

An image pickup apparatus according to still another aspect of the present invention comprises:

a zoom lens;

an image pickup element disposed on the image side of the zoom lens, having an image pickup surface, and converting an image formed on the image pickup surface by the zoom lens into an electrical signal;

a signal processing section that transforms the electrical signal into an image signal; and a monitor that displays a picked up image based on the image signal, the apparatus further comprising, a memory in which person's message information is stored, and a display switching operation portion for causing person's message information to be displayed on the monitor.

An image pickup apparatus according to still another aspect of the present invention comprises:

a zoom lens; and an image pickup element disposed on the image side of the zoom lens, having an image pickup surface, and converting an image formed by the zoom lens into an electrical signal, wherein the zoom lens comprises, in order from its object side, a first lens unit having a negative refracting power, a second lens unit having a positive refracting power, and a third lens unit, the zoom lens further comprises an aperture stop that moves integrally with the second lens unit during zooming from the wide angle end to the telephoto end, during zooming from the wide angle end to the telephoto end, the first lens unit and the second lens unit move, and a distance between the lens units changes, the first lens unit comprises a negative lens that satisfies conditional expression (1B) presented below, the second lens unit comprises four lens elements comprising a positive lens and a negative lens, the total number of lens elements in the second lens unit is four, and the zoom lens satisfies conditional expression (12B) presented below:

$$-1.0<(r_{1a}+r_{1b})/(r_{1a}-r_{1b})<0.98 \quad (1B)$$

$$1.75<\text{AVE}(n_d)<2.40 \quad (12B),$$

where $r_{1a}$ and $r_{1b}$ are the paraxial radii of curvature of the object side surface and the image side surface of the negative lens in the first lens unit respectively, and AVE($n_d$) is the average of the refractive indices of all the lenses included in the first to third lens units of the zoom lens.

BRIEF DESCRIPTION OF THE DRAWINGS

FIG. 26 is a cross sectional view of the digital camera; and

FIG. 27 is a block diagram of an internal circuit of a principal portion of the digital camera.

DETAILED DESCRIPTION OF THE INVENTION

Figure 1A:
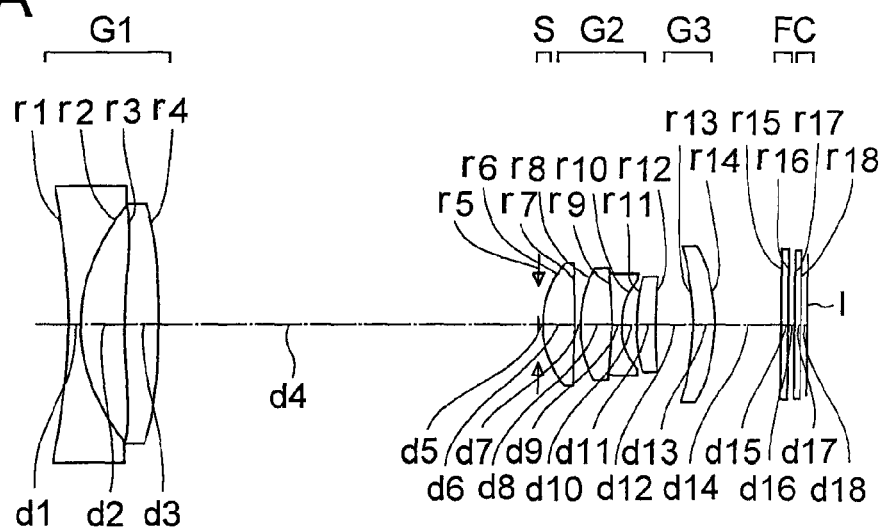
FIGS. 1A, 1B, and 1C are cross sectional views of a zoom lens according to a first embodiment of the present invention in the state in which the zoom lens is focused on an object point at infinity respectively at the wide angle end (FIG. 1A), in an intermediate state (FIG. 1B), and at the telephoto end (FIG. 1C)

A zoom lens according to a first aspect of the present invention has a plurality of lens units including, in order from the object side to the image side thereof, a first lens unit having a negative refracting power and a second lens unit having a positive refracting power, the first lens unit being composed of two lens elements including a biconcave negative lens and a positive lens, and the second lens unit being composed of four lens elements including a positive lens and a negative lens. During zooming from the wide angle end to the telephoto end, the distance between the lens units changes, and the second lens unit moves toward the object side. The zoom lens has an aperture stop that moves integrally with the second lens unit during zooming and satisfies the following conditional expressions (1A) and (2A):

$$-1.0 < (r_{11a} + r_{11b})/(r_{11a} - r_{11b}) < 0.98 \quad (1A)$$

$$-1.10 < f_{11}/r_{11b} < -0.30 \quad (2A),$$

where $r_{11a}$ is the paraxial radius of curvature of the object side surface of the biconcave negative lens in the first lens unit, $r_{11b}$ is the paraxial radius of curvature of the image side surface of the biconcave negative lens in the first lens unit, and $f_{11}$ is the focal length of the biconcave negative lens in the first lens unit.

With the above-described configuration, the zoom lens is of a type in which the frontmost lens unit has a negative refracting power, which is advantageous in reducing the size of the entire zoom lens. The second lens unit mainly functions as a compensator and moves toward the object side during zooming from the wide angle end to the telephoto end to change the magnification. The first lens unit is composed of two lens elements including a biconcave negative lens and a positive lens. This is advantageous in reducing the size of the first lens unit and facilitates correction of aberrations. The second lens unit is composed of four lens elements including a positive lens and a negative lens. This is advantageous in reducing spherical aberration and coma that are likely to be generated in the second lens unit. The aperture stop plays a significant roll in determining the optical paths in the respective lens units. Moving the aperture stop integrally with the second lens unit enables a reduction in the size of the effective diameter of the second lens unit and a reduction in the size of the second lens unit with respect to both the diametrical direction and the optical axis direction even if the second lens unit is designed to have an adequate positive refracting power. Thus, this is advantageous in achieving both a reduction in the size and an adequate zoom ratio and facilitates correction of aberrations.

To achieve a high zoom ratio in a zoom lens having a negative frontmost lens unit, the second lens unit that serves as a variator is to be designed to have a high positive refracting power. However, if the number of lens elements in the second lens unit is five or more, the thickness of the second lens unit on the optical axis becomes too large. This is disadvantageous in slimming the zoom lens in the state in which the lens barrel is collapsed. On the other hand, if the number of lens elements in the second lens unit is three or less, it is difficult to correct aberrations while providing an adequate positive refracting power. In particular, it is difficult to correct axial aberrations at the telephoto end.

It is preferred that the zoom lens satisfy the above described conditional expressions (1A) and (2A).

Conditional expression (1A) relates to a preferred shape of the biconcave negative lens in the first lens unit. If neither the lower limit nor the upper limit of conditional expression (1A) is not exceeded, the negative power can be shared by the object side surface and the image side surface of the biconcave negative lens. This is advantageous in reducing curvature of field at the wide angle end and spherical aberration at the telephoto end.

If the upper or lower limit of conditional expression (1A) is exceeded, the absolute value of the paraxial curvature of either the object side surface or the image side surface becomes too large, which tends to lead to curvature of field at the wide angle end and spherical aberration at the telephoto end.

Conditional expression (2A) specifies preferred values of the focal length of the biconcave negative lens in the first lens unit and preferred values of the paraxial radius of curvature of the image side surface of the biconcave negative lens in the first lens unit. To achieve an adequate angle of view, an adequate zoom ratio, and/or size reduction, it is necessary that the biconcave negative lens has a sufficiently high negative refracting power. However, simply making the negative refracting power higher is likely to lead to an increase in aberrations. By optimizing the paraxial radius of curvature of the image side concave surface of the biconcave negative lens so that conditional expression (2A) is satisfied, off-axis aberrations can readily be made small. This is advantageous in achieving a wide angle of view, a high zoom ratio, and size reduction.

If the lower limit of conditional expression (2A) is not exceeded, the paraxial radius of curvature of the image side surface of the biconcave negative lens is prevented from becoming too small. This is advantageous in reducing off-axis aberrations at the wide angle end. If the upper limit of conditional expression (2A) is not exceeded, the absolute value of the paraxial radius of curvature of the object side surface of the biconcave negative lens is prevented from becoming small. This is advantageous in reducing off-axis aberrations generated by the object side surface. Alternatively, the refractive index of the material of the biconcave negative lens may be made small, which is cost effective.

It is more preferred that the following features be additionally adopted in the above-described zoom lens according to the present invention.

It is preferred that the zoom lens include a third lens unit disposed on the image side of the second lens unit. This leads to an increase in the degree of freedom of design in terms of control of variations in aberrations and adjustment of the position of the exit pupil. In this case, if the third lens unit has a positive refracting power, the position of the exit pupil can effectively be made farther from the image plane.

On the other hand, the third lens unit having a negative refracting power is advantageous in reducing the size of the zoom lens. The third lens unit may be a single lens. The third lens unit composed of a single lens is advantageous in reducing the cost and in slimming the zoom lens in the state in which the lens barrel is collapsed.

The zoom lens may be a two-unit zoom lens. This is advantageous in reducing the size of the zoom lens in the state in which the lens barrel is collapsed and in reducing the cost.

The zoom lens may be a three-unit or a four-unit zoom lens.

A zoom lens according to a second aspect of the present invention includes, in order from the object side to the image side thereof, a first lens unit having a negative refracting power and a second lens unit having a positive refracting power, the first lens unit including a biconcave negative lens, and the second lens unit being composed of four lens elements including a positive lens and a negative lens. During zooming from the wide angle end to the telephoto end, the distance between the lens units changes and the second lens unit moves toward the object side. The zoom lens has an aperture stop that moves integrally with the second lens unit during zooming and satisfies the following conditional expressions (1A) and (3A):

$$-1.0 < (r_{11a} + r_{11b})/(r_{11a} - r_{11b}) < 0.98 \tag{1A}$$

$$4.81 < f_t/f_w < 10 \tag{3A},$$

where $r_{11a}$ is the paraxial radius of curvature of the object side surface of the biconcave negative lens in the first lens unit, $r_{11b}$ is the paraxial radius of curvature of the image side surface of the biconcave negative lens in the first lens unit, $f_t$ is the focal length of the entire zoom lens system at the telephoto end, and $f_w$ is the focal length of the entire zoom lens system at the wide angle end.

With the above-described configuration, the zoom lens is of a type in which the frontmost lens unit has a negative refracting power, which is advantageous in reducing the size of the entire zoom lens. The second lens unit is composed of four lens elements. This is advantageous in reducing spherical aberration and coma that are likely to be generated in the second lens unit. Moving the aperture stop integrally with the second lens unit enables a reduction in the size of the effective diameter of the second lens unit and a reduction in the size of the second lens unit with respect to both the diametrical direction and the optical axis direction while designing the second lens unit to have an adequate positive refracting power. Thus, this is advantageous in achieving both a reduction in the size and an adequate zoom ratio. The conditional expression (1A) has already been discussed in the foregoing, and no further description will be made on it and its effects.

Conditional expression (3A) specifies preferred values of the zoom ratio. If the lower limit of conditional expression (3A) is not exceeded so that the zoom lens has an adequate zoom ratio, the zoom lens can be suitably used in various shooting situations. It is preferred that the zoom ratio be made smaller than the upper limit of conditional expression (3A) to achieve both a reduction in variations of aberrations and compactness of the zoom lens.

It is more preferred that the following features be additionally adopted.

It is preferred that the zoom lens include a third lens unit disposed on the image side of the second lens unit. This leads to an increase in the degree of freedom of design in terms of control of variations in aberrations and adjustment of the position of the exit pupil. In this case, if the third lens unit has a positive refracting power, the position of the exit pupil can effectively made farther from the image plane.

On the other hand, the third lens unit having a negative refracting power is advantageous in reducing the size of the zoom lens. The third lens unit may be composed of a single lens. The third lens unit composed of a single lens is advantageous in reducing the cost and in slimming the zoom lens in the state in which the lens barrel is collapsed.

The zoom lens may be a two-unit zoom lens. This is advantageous in reducing the cost and in reducing the size of the zoom lens in the state in which the lens barrel is collapsed.

The zoom lens may be a three-unit or a four-unit zoom lens.

Furthermore, it is preferred that the first lens unit be composed of two lens elements including a biconcave negative lens and a positive lens. This facilitates the compatibility of size reduction and correction of aberration. In the zoom lenses according to the first aspect and the second aspect, it is preferred that the biconcave negative lens and the positive lens in the first lens unit be disposed with an air gap therebetween. This is advantageous in reducing the size of the first lens unit small with respect to the diametrical direction.

It is preferred that the zoom lens according to the first aspect and the zoom lens according to the second aspect satisfy the following features.

It is preferred that the first lens unit satisfy the following conditional expression (4A):

$$1.87 < \text{AVE}(n_{G1}) < 2.40 \quad (4A),$$

where $\text{AVE}(n_{G1})$ is the average of the refractive indices for the d-line of the biconcave negative lens in the first lens unit and the positive lens in the first lens unit.

Conditional expression (4A) specifies preferred values of the refractive indices of the lenses in the first lens unit.

If conditional expression (4A) is satisfied, the first lens unit can easily be designed to have a refracting power that is needed to achieve a wide angle of view or a high zoom ratio with an appropriate paraxial radius of curvature at a reasonable cost. If the lower limit of conditional expression (4A) is not exceeded, the absolute value of the paraxial radius of curvature of each lens surface can easily be made small, which is advantages in reducing aberrations, and the first lens unit can have an adequate negative refracting power. If the upper limit of conditional expression (4A) is not exceeded, reduction in the cost of the lens material and the machining cost is facilitated.

It is preferred that the biconcave negative lens in the first lens unit be located closer to the object side than the positive lens in the first lens unit. This facilitates reduction of chromatic aberration with a small number of lenses. In addition, this is advantages in reducing axial aberrations at the telephoto end. If these two lenses are cemented together, slimming of the zoom lens in the state in which the lens barrel is collapsed is facilitated. In the case where these two lenses have a gap therebetween on the optical axis, the principal point of the first lens unit will be located closer to the object side, which may lead to a reduction in the size of the first lens unit with respect to the diametrical direction and a reduction in the entire length of the zoom lens in use.

It is also preferred that the positive lens in the first lens unit satisfy the following conditional expression (5A):

$$12.0 < \nu d_{12} < 20.8 \quad (5A),$$

where $\nu d_{12}$ is the Abbe number of the positive lens in the first lens unit.

Conditional expression (5A) specifies preferred values of the Abbe number of the positive lens in the first lens unit. If conditional expression (5A) is satisfied, correction of chromatic aberration of magnification are facilitated throughout the zoom range from the wide angle end to the telephoto end and correction of axial chromatic aberration at the telephoto end. If the lower limit of conditional expression (5A) is not exceeded, the material cost can be made small. If the upper limit of conditional expression (5A) is not exceeded, a material having a high refractive index can be used, which is advantageous for correction of axial aberration, in particular at the telephoto end.

It is preferred that the first lens unit satisfy the following conditional expression (8):

$$-5.0 < f_{12}/f_{11} < -1.5 \quad (8A),$$

where $f_{11}$ is the focal length of the biconcave negative lens in the first lens unit, and $f_{12}$ is the focal length of the positive lens in the first lens unit.

Conditional expression (8A) specifies preferred values of the ratio of the refracting power of the biconcave negative lens and the refracting power of the positive lens in the first lens unit. Designing the first lens unit in such a way that conditional expression (8A) is satisfied is advantageous in correcting chromatic aberration and in reducing the entire length of the zoom lens while providing the first lens unit with an adequate negative refracting power that advantageously contributes to an increase in the angle of view. If the lower limit of conditional expression (8A) is not exceeded, the positive lens can have an adequate refracting power, which is advantageous in reducing axial aberrations, in particular at the telephoto end. If the upper limit of conditional expression (8A) is not exceeded, the first lens unit can have an adequate negative refracting power, which is advantages in increasing the angle of field.

It is also preferred that the total number of lens units included in the zoom lens be three or fewer. This is advantageous in slimming the zoom lens in the state in which the lens barrel is collapsed and in reducing the cost.

It is preferred that the biconcave negative lens in the first lens unit satisfy the following conditional expression (6A):

$$-2.00 < f_1/r_{11b} < -0.50 \quad (6A),$$

where $f_1$ is the focal length of the first lens unit.

Conditional expression (6A) specifies preferred values of the refracting power of the first lens unit and the paraxial radius of curvature of the image side surface of the biconcave negative lens. If conditional expression (6A) is satisfied, the negative refracting power of the first lens unit and the paraxial radius of curvature of the image side surface of the biconcave negative lens will be well balanced, which facilitates reduction in axial aberrations and off-axis aberrations and is advantageous in designing the first lens unit to have an adequate negative refracting power. It is preferred that the lower limit of conditional expression (6A) be not exceeded so that the paraxial radius of curvature of the image side surface of the biconcave negative lens does not become too small. This is advantageous in reducing off-axis aberrations at the wide angle end. It is preferred that the upper limit of conditional expression (6A) be not exceeded so that the absolute value of the paraxial radius of curvature of the object side surface of the biconcave negative lens does not become too small. This is advantageous in reducing off-axis aberrations generated by the object side surface of the biconcave negative lens.

Here, the "entrance pupil position" is defined as the distance, along the optical axis, from the vertex of the object side surface of the zoom lens to the image of the aperture stop as seen from the object side of the zoom lens. It is preferred that the entrance pupil position satisfy the following conditional expression (7A):

$$0.1 < \text{Enp}(w)/r_{11b} < 1.07 \qquad (7A),$$

where Enp(w) is the entrance pupil position at the wide angle end.

In order to reduce the thickness of the zoom lens in the state in which the lens barrel is collapsed, it is preferred that the position of the entrance pupil be made closer to the object side, particularly at the wide angle, whereby reduction of the size of the first lens unit with respect to the diametrical direction is facilitated. On the other hand, in order to reduce off-axis aberrations, it is preferred that the negative refracting power of the biconcave negative lens be made lower.

Conditional expression (7A) has been introduced taking the above-described reasons into consideration. Conditional expression (7A) specifies a preferred condition for achieving both slimming of the zoom lens and reduction of aberrations. If conditional expression (7A) is satisfied, it is possible to adjust the entrance pupil position appropriately while keeping the curvatures of the lens surfaces in the first lens unit small. Thus, reduction of the thickness of the zoom lens in the state in which the lens barrel is collapsed and reduction of off-axis aberration are facilitated. If the lower limit of conditional expression (7A) is not exceeded, the paraxial radius of curvature of the object side surface of the biconcave negative lens can be made large. This is advantageous in reducing off-axis aberrations. If the upper limit of conditional expression (7A) is not exceeded, the position of the entrance pupil can be made closer to object side. This is advantageous in reducing the size with respect to the diametrical direction.

It is also preferred that at least two lenses among the four lens elements in the second lens unit be cemented to the adjacent lens. In other words, it is preferred that the second lens unit includes a cemented lens. This is advantageous for correction of chromatic aberrations at all the zoom positions from the wide angle end to the telephoto end.

It is preferred that the above described four lens elements in the second lens unit be a positive lens, a positive lens, a negative lens, and a positive lens arranged in order from the object side. With this configuration, the positive refracting power of the second lens unit can be shared among the three positive lenses. This is advantageous in reducing axial aberrations and off-axis aberrations, in particular at the telephoto end. In addition, with the above-described arrangement of the position of the negative lens, a reduction of chromatic aberration and an improvement of the Petzval sum can be achieved, and the position of the principal point can be made closer to the object side. This is advantageous in making the zoom ratio higher.

It is preferred that the aperture stop be located between the first lens unit and the second lens unit. Locating the aperture stop in this way enables reduction in the size of the first lens unit with respect to the diametrical direction and facilitates reduction of aberration that may be caused with an increase in the angle of view.

It is also preferred that at least one of the lenses included in the zoom lens have anti-reflection coating applied on its refracting surface. With an increase in the angle of view a highly bright object such as the sun is more likely to fall in the image frame. In view of this, anti-reflection coating may be applied on a lens surface(s) that tends to create ghost images to thereby reduce ghost images.

The image pickup apparatus according to the present invention comprises any one of the zoom lenses described in the foregoing and an image pickup element disposed on the image side of the zoom lens to convert an optical image formed by the zoom lens into an electrical signal. Thus, an image pickup apparatus equipped with the zoom lens that has the above described advantages can be provided.

Furthermore, the following features may be added.

It is preferred that the image pickup apparatus be provided with an image transformation section that transforms, by image processing, an electrical signal representing an image containing distortion attributed to the zoom lens into an image signal representing an image in which distortion is corrected. By correcting the distortion electrically, the degree of correction of distortion of the zoom lens may be made lower. This is advantageous in reducing curvature of field and other aberrations. In addition, the first lens unit can easily be designed to have an adequate negative refracting power. This is advantages in achieving a wide angle of view and a high zoom ratio. Chromatic aberration of magnification may also be corrected by image processing by varying the distortion correction amounts among the respective color signals.

In other words, the image pickup apparatus may be provided with an image transformation section that transforms, by image processing, an electrical signal representing an image containing chromatic aberration of magnification attributed to the zoom lens into an image signal representing an image in which chromatic aberration of magnification is corrected.

It is more preferred that two or more of the above described features be adopted at the same time.

In the case where the zoom lens has the focusing function, the above-described conditions should be regarded as conditions in the state in which the zoom lens is focused on an object at the farthest distance.

It is more preferred that the conditional expressions presented in the foregoing be limited as follows.

In conditional expression (1A), it is more preferred that the lower limit value be 0.1, still more preferably 0.5, and the upper limit value be 0.9, still more preferably 0.8.

In conditional expression (2A), it is more preferred that the lower limit value be −1.08, still more preferably −1.04, and the upper limit value be −0.50, still more preferably −0.90.

In conditional expression (3A), it is more preferred that the lower limit value be 5.0, still more preferably 5.7, and the upper limit value be 8.0, still more preferably 6.0.

In conditional expression (4A), it is more preferred that the lower limit value be 1.90, still more preferably 1.92, and the upper limit value be 2.20, still more preferably 2.10.

In conditional expression (5A), it is more preferred that the lower limit value be 14.0, still more preferably 16.5, and the upper limit value be 20.7.

In conditional expression (6A), it is more preferred that the lower limit value be −1.95, still more preferably −1.90, and the upper limit value be −1.00, still more preferably −1.40.

In conditional expression (7A), it is more preferred that the lower limit value be 0.5, still more preferably 0.9, and the upper limit value be 1.05, still more preferably 1.04.

In conditional expression (8A), it is more preferred that the lower limit value be −4.5, still more preferably −4.0, and the upper limit value be −2.0, still more preferably −2.5.

A first mode of the image pickup apparatus according the present invention comprises a zoom lens and an image pickup element disposed on the image side of the zoom lens, having an image pickup surface, and converting an image formed on the image pickup surface by the zoom lens, the zoom lens including, in order from the object side thereof, a first lens unit having a negative refracting power, a second lens unit having a positive refracting power, and a third lens unit, the zoom lens further including an aperture stop that moves integrally with the second lens unit during zooming from the wide angle end to the telephoto end, wherein during zooming from the wide angle end to the telephoto end, the first lens unit and the second lens unit move, and the distances between the lens units change, the first lens unit is composed of two lens elements including, in order from the object side, a negative lens and a positive lens, the second lens unit is composed of four lens elements including a positive lens and a negative lens, and the zoom lens satisfies the following conditional expressions (1B), (2B), and (3B):

$$-1.0<(r_{1a}+r_{1b})/(r_{1a}-r_{1b})<0.98 \quad (1B)$$

$$0.30<\sigma_{2G}/ih(\max)<2.80 \quad (2B)$$

$$1.5<\Delta_{2G}/f_2<5 \quad (3B)$$

where $r_{1a}$ and $r_{1b}$ are the paraxial radii of curvature of the object side surface and the image side surface of the negative lens in the first lens unit respectively, $\sigma_{2G}$ is the thickness of the second lens unit on the optical axis, ih(max) is the maximum value of the maximum image height in the effective image pickup area on the image pickup surface, $\Delta_{2G}$ is the displacement of the position of the second lens unit at the telephoto end from the position thereof at the wide angle end, wherein the displacement toward the object side is represented by a positive value, and $f_2$ is the focal length of the second lens unit.

Having the first lens unit having a negative refracting power is advantageous in reducing the number of lens units in the zoom lens. A reduction in the number of lens units leads to a decrease in the total number of lenses. This is advantageous in reducing the cost and size of the zoom lens.

The second lens unit mainly functions as a variator and moves during zooming from the wide angle end to the telephoto end to provide the magnification change. By also moving the first lens unit during zooming, adjustment of the position of the image plane can be facilitated.

Having the third lens unit enables reduction of the difference between the emergence angle at the wide angle end and that at the telephoto end and correction of curvature of field.

The first lens unit is composed of two lens elements including, in order from the object side, a negative lens and a positive lens. This makes the position of the principal point of the first lens unit closer to the object side, which facilitates reduction of the size of the first lens unit with respect to the diametrical direction and reduction of the entire length of the zoom lens. In addition, this feature facilitates reduction of chromatic aberration of the first lens unit with a small number of lenses. In addition, this feature is advantageous in reducing axial aberrations at the telephoto end.

The second lens unit is composed of four lens elements including a positive lens and a negative lens. With this feature, the second lens unit can easily be designed to have an adequate positive refracting power, and correction of aberrations is facilitated. Thus, this feature is advantageous in achieving a wide angle of view and a high zoom ratio.

Conditional expression (1B) specifies preferred shapes of the negative lens in the first lens unit. If conditional expression (1B) is satisfied, reduction of curvature of field at the wide angle end and spherical aberration at the telephoto end is facilitated.

If the upper limit or the lower limit of conditional expression (1B) is exceeded, the paraxial curvature of either the object side refracting surface or the image side refracting surface becomes too large. In consequence, curvature of field and spherical aberration are likely to occur respectively at the wide angle and the telephoto end, which is disadvantageous in achieving a high zoom ratio.

Conditional expression (2B) specifies preferred values of the thickness of the second lens unit on the optical axis in relation to the maximum image height ih(max).

In order to achieve a wide angle of view or a high zoom ratio in a zoom lens of a type in which the frontmost lens unit has a negative refracting power, it is necessary that the second lens unit that functions as a variator has a sufficiently high positive refracting power. However if the second lens unit includes five or more lens elements as is often the case with conventional zoom lenses, the thickness of the second lens unit on the optical axis becomes large. This is disadvantageous in reducing the thickness of the zoom lens in the state in which the lens barrel is collapsed. On the other hand, if the second lens unit includes three or fewer lens elements, aberrations tend to occur as the second lens unit is designed to have an adequate positive refracting power. In particular, it is difficult to correct axial aberrations at the telephoto end.

If conditional expression (2B) is satisfied, the second lens unit can be made sufficiently compact even though it is composed of four lens elements. Therefore, a sufficient space that allows movement of the second lens units for achieving a wide angle of view and a high zoom ratio can be provided. This also leads to reduction in the entire length of the zoom lens and slimming of the zoom lens in the state in which the lens barrel is collapsed.

If the upper limit of conditional expression (2B) is exceeded, the space available for movement of the lens unit during zooming becomes small. Then, the second lens unit needs to have an unduly high positive refracting power, which makes correction of aberrations difficult. In addition, the thickness of the zoom lens in the state in which the lens barrel is collapsed will become large.

If the lower limit of conditional expression (2B) is exceeded, it is difficult to design the second lens unit to have an adequate positive refracting power while correcting aberrations.

The sign "ih(max)" represents the maximum value of the maximum image height in the effective image pickup area on the image pickup surface. There have been known technologies of changing the effective image pickup area to crop the picked up image or change the aspect ratio and technologies of using a barrel-shaped image pickup area at wide angle zoom positions and transforming an image signal representing the barrel shaped image into an image signal representing a rectangular image by signal processing.

In such cases where the maximum image height may change, ih(max) represents the value of the maximum image height in the possible effective image pickup area of the image pickup apparatus in which the maximum image height becomes largest.

Conditional expression (3B) specifies a preferred condition in terms of the displacement of the second lens unit during zooming from the wide angle end to the telephoto end and the focal length of the second lens unit. If conditional expression (3B) is satisfied, variations in aberrations during zooming can be made small, and an increase in the zoom ratio is facilitated.

If the lower limit of conditional expression (3B) is exceeded, the magnification change provided by the second lens unit becomes small, and the third lens unit (and the subsequent lens unit(s), if any) is required to provide a large magnification change. This leads to an increase in curvature of field and variations in the exit pupil position.

If the upper limit of conditional expression (3B) is exceeded, the refracting power and/or the displacement of the second lens unit become too large. Then, axial aberrations at the telephoto end and variations in aberrations between the wide angle end and the telephoto end tend to be large.

In the case where the zoom lens has the focusing function, the above-described conditions should be regarded as conditions in the state in which the zoom lens is focused on an object at the farthest distance. This also applies to the conditions described in the following.

In the above-described image pickup apparatus according to the present invention, it is more preferred that one or some of the following features be additionally adopted.

In the image pickup apparatus according to the present invention, it is preferred that the lens closest to the object side in the second lens unit be a positive lens, and the following conditional expression (4B) be satisfied:

$$1.1 < f_2/r_{3a} < 3.0 \quad (4B),$$

where $r_{3a}$ is the paraxial radius of curvature of the refracting surface closest to the object side in the second lens unit.

Conditional expression (4B) specifies a preferred relationship between the paraxial radius of curvature of the refracting surface closest to the object side in the second lens unit and the focal length of the second lens unit. If conditional expression (4B) is satisfied, the aforementioned refracting surface will have an appropriate paraxial radius of curvature in relation to the focal length of the second lens unit. Thus, the position of the principal point is made close to the object side, whereby reduction in the size of the zoom lens and reduction of axial and off-axis aberrations are facilitated. In addition, reduction in the diametrical size of the second lens unit is also facilitated.

If the lower limit of conditional expression (4B) is not exceeded, the object side refracting surface has an adequate curvature, whereby reduction in the diametrical size is facilitated. In addition, the curvature of other lens surfaces can also be made small, whereby reduction of aberrations is facilitated.

If the upper limit of conditional expression (4B) is not exceeded, the refracting power of the aforementioned refracting surface is prevented from becoming too high. Then, variations in the incidence angle of axial beams and off-axis beams can be made small, whereby reduction of aberrations is facilitated, in particular at the telephoto end.

In the image pickup apparatus according to the present invention, it is preferred that the zoom lens be a three-unit zoom lens, and the third lens unit have a positive refracting power.

If the third lens unit has a positive refracting power, the position of the exit pupil can be made farther from the image pickup surface. Then, brightness falloff in the peripheral region of the image is unlikely to occur. This leads to satisfactory image quality in the peripheral region of the image.

In the image pickup apparatus according to the present invention, it is preferred that at least two adjacent lenses in the second lens unit be cemented together.

Having a cemented lens in the second lens unit is advantageous in correcting axial and off-axis aberrations.

In the image pickup apparatus according to the present invention, it is preferred that the lens closest to the object side in the second lens unit satisfy the following conditional expression (5B):

$$1.1 < f_2/L_3 < 3.0 \quad (5B),$$

where $L_3$ is the focal length of the lens closest to the object side in the second lens unit.

Conditional expression (5B) specifies preferred values of the ratio of the focal length of the lens closest to the object side in the second lens unit and the focal length of the second lens unit.

To achieve slimming of the zoom lens in the state in which the lens barrel is collapsed, the second lens unit may be shifted, when the lens barrel is collapsed, away from the optical axis of the zoom lens in shooting. In the case where this collapsing scheme is employed, if the size of the second lens unit is made smaller with respect to the diametrical direction, the shift amount of the second lens unit can also be made smaller. This is advantages in achieving size reduction with respect to the diametrical direction.

If conditional expression (5B) is satisfied, rays can be refracted moderately by the lens closest to the object side in the second lens unit. This is advantageous in achieving size reduction with respect to the diametrical direction.

If the lower limit of conditional expression (5B) is not exceeded, the lens closest to the object side in the second lens unit can have an adequate positive refracting power. This is advantageous in reducing the size of the second lens unit with respect to the diametrical direction. If the upper limit of conditional expression (5B) is not exceeded, the refracting power of the lens closest to the object side in the second lens unit is prevented from becoming too high. This is advantageous in reducing, in particular, axial aberrations.

In the image pickup apparatus according to the present invention, it is preferred that the second lens unit be composed of three positive lenses and one negative lens.

Having three positive lenses in the second lens unit enables the positive refracting power to be favorably shared among them. In addition, having a negative lens in the second lens unit enables improvement of the Petzval sum and chromatic aberration characteristics.

In the image pickup apparatus according to the present invention, it is preferred that the second lens unit be composed of a positive lens, a positive lens, a negative lens, and a positive lens arranged in order from the object side.

Composing the second lens unit of a positive lens, a positive lens, a negative lens, and a positive lens arranged in order from the object side enables the positive refracting power to be favorable shared among them. Furthermore, arranging the negative lens as the third lens in the second lens unit enables to shift the position of the principal point toward the object side. This is advantageous in achieving an adequate zoom ratio and in reducing the diameter of the second lens unit.

In the image pickup apparatus according to the present invention, it is preferred that the lens closest to the object side and the lens closest to the image side in the second lens unit be positive lenses that satisfy the following conditional expression (6B):

$$1.7 < L_6/L_3 < 10 \quad (6B),$$

where $L_3$ is the focal length of the lens closest to the object side in the second lens unit, and $L_6$ is the focal length of the lens closest to the image side in the second lens unit.

Conditional expression (6B) specifies preferred values of the ratio of the refracting power of the positive lens closest to the object side and the refracting power of the positive lens closest to the image side in the second lens unit. If conditional expression (6B) is satisfied, the diametrical size of the second lens unit is prevented from becoming large, and correction of axial aberrations is facilitated.

If the lower limit of conditional expression (6B) is not exceeded, the object side lens in the second lens unit has an adequate refracting power. This is advantageous in reducing the size with respect to the diametrical direction. If the upper limit of conditional expression (6B) is not exceeded, the image side lens in the second lens unit has an adequate refracting power. This is advantages in reducing axial aberrations.

In the image pickup apparatus according to the present invention, it is preferred that the average of the refractive indices for the d-line of all the lenses in the first lens unit satisfy the following conditional expression (7B):

$$1.87 < \mathrm{AVE}(n_{dg1}) < 2.40 \tag{7B}$$

where $\mathrm{AVE}(n_{dg1})$ is the average of the refractive indices for the d-line of all the lenses in the first lens unit.

Conditional expression (7B) specifies preferred values of the average of the refractive indices for the d-line of all the lenses in the first lens unit. Using lens materials that satisfy conditional expression (7B) is advantageous in providing the first lens unit with an adequate negative refracting power while reducing the cost.

If the lower limit of conditional expression (7B) is not exceeded, it is possible to design the first lens unit to have an adequate negative refracting power while preventing the curvatures of the lens surfaces in the first lens unit from becoming large. This is advantageous in achieving an adequate zoom ratio while suppressing aberrations. If the upper limit of conditional expression (7B) is not exceeded, reduction in the cost of the lens materials is facilitated.

In the image pickup apparatus according to the present invention, it is preferred that the third lens unit have a positive refracting power, and the refracting power of the second lens unit and the refracting power of the third lens unit satisfy the following conditional expression (8B):

$$1.0 < P_2/P_3 < 4.0 \tag{8B}$$

where $P_2$ is the refracting power of the second lens unit, and $P_3$ is the refracting power of the third lens unit.

Conditional expression (8B) specifies preferred sharing of the positive refracting power among the second lens unit and the third lens unit. If conditional expression (8B) is satisfied, the positive refracting power can be favorably shared among the second lens unit and the third lens unit, and reduction of axial aberrations in the second lens unit and off-axis aberrations in the third lens unit is facilitated.

Furthermore, in the case where the third lens unit is moved during the focusing operation, conditional expression (8B) provides an advantageous condition for reducing the entire length of the zoom lens while leaving a space for movement of the second lens unit for zooming and a space for movement of the third lens unit for the focusing operation.

If the lower limit of conditional expression (8B) is not exceeded, the second lens unit can have an adequate refracting power, whereby the space required for zooming can be made small. This is advantageous in reducing the entire length of the zoom lens. Alternatively, the refracting power of the third lens unit can be made small, whereby reduction of off-axis aberrations, in particular curvature of field and chromatic aberration of magnification, is facilitated.

If the upper limit of conditional expression (8B) is not exceeded, the refracting power of the second lens unit can be made moderately small, which is advantageous in reducing aberrations, in particular axial aberrations.

The value of the refracting power is the inverse of the focal length.

In the image pickup apparatus according to the present invention, it is preferred that the second lens unit and the third lens unit satisfy the following conditional expressions (9B) and (10B):

$$4.0 < \beta_2(t)/\beta_2(w) < 10.0 \tag{9B}$$

$$0.7 < \beta_3(t)/\beta_3(w) < 2.0 \tag{10B},$$

where $\beta_2(w)$ is the lateral magnification of the second lens unit at the wide angle end, $\beta_2(t)$ is the lateral magnification of the second lens unit at the telephoto end, $\beta_3(w)$ is the lateral magnification of the third lens unit at the wide angle end, and $\beta_3(t)$ is the lateral magnification of the third lens unit at the telephoto end.

Conditional expressions (9B) and (10B) specify preferred magnification changes that the second lens unit and the third lens unit provide. If conditional expressions (9B) and (10B) are satisfied, the second lens unit and the third lens unit can provide the magnification change satisfactorily. This is advantageous in achieving a high zoom ratio.

If the lower limit of conditional expression (9B) is not exceeded, the second lens unit can provide the magnification change adequately, and the magnification change that the other lens unit(s) provides can be made small. This is advantageous in reducing aberrations.

If the magnification change that the second lens unit provides is designed to be so small that the upper limit of conditional expression (9B) is not exceeded, an advantage in achieving good optical performance of the second lens unit composed of four lens elements can be provided.

If the lower limit of conditional expression (10B) is not exceeded, the magnification change that the other lens units provide can be made smaller. This is advantageous in reducing aberrations.

If the magnification change that the third lens unit provides is designed to be so small that the upper limit of conditional expression (10B) is not exceeded, the movement amount of the third lens unit can be made smaller and/or the refractive index of the third lens unit can be made lower. This is advantageous in achieving good optical performance.

In the image pickup apparatus according to the present invention, it is preferred that the third lens unit have a positive refracting power, and the optical path length of the zoom lens at the wide angle end and that at the telephoto end satisfy the following conditional expression (11B):

$$0.5 < D_w/D_t \le 1.0 \tag{11B},$$

where $D_w$ is the optical path length from the object side surface to the image pickup surface of the zoom lens at the wide angle end, and $D_t$ is the optical path length from the object side surface to the image pickup surface of the zoom lens at the telephoto end.

Conditional expression (11B) specifies preferred values of the optical path length of the zoom lens that is advantageous in achieving an adequate angle of view and an adequate zoom ratio. If conditional expression (11B) is satisfied, an advantage in reducing the size of the first lens unit at the wide angle end with respect to the diametrical direction and in providing a space allowing movement of the second lens unit for zooming is provided.

If the lower limit of conditional expression (11B) is not exceeded, an adequate gap can be provided between the second lens unit and the third lens unit at the wide angle end. This is advantageous in making the position of the exit pupil farther from the image plane by the effect of the third lens unit.

In the case where the third lens unit is moved during the focusing operation, this is advantageous in allowing a sufficient movement of the third lens unit for the focusing operation.

It is preferred that the upper limit of conditional expression (11B) be not exceeded. This is advantageous in providing a space allowing movement of the second lens unit. On the other hand, the entire length of the zoom lens at the wide angle end may be made short, whereby the size of the first lens unit can be prevented from becoming large with an increase in the angle of view.

A second mode of the image pickup apparatus according to the present invention is intended to be friendly to users.

The image pickup apparatus according to the second mode includes a zoom lens, an image pickup element that is disposed on the image side of the zoom lens, has an image pickup surface, and converts an image formed on the image pickup surface by the zoom lens into an electrical signal, a signal processing section that transforms the electrical signal into an image signal, and a monitor that displays a picked up image based on the image signal. The image pickup apparatus according to the second mode is characterized by a memory in which person's message information is stored and a display switching operation portion for causing person's message information to be displayed on the monitor.

The display of person's message information can motivate a person considering the purchase of the image pickup apparatus in, for example, an appliance store to buy it with reliance and affinity. In addition, the user may be more likely to feel a sense of attachment to the image pickup apparatus he/she purchased.

The image pickup apparatus may further have a zooming operation portion with which the zooming operation of the zoom lens is performed, and the zooming operation portion may also serve, at least partly, as the display switching operation portion. If this is the case, an operation portion can be commonly used, and the number of parts can be reduced.

The person's message information may include a moving image and voice of a person. For example, an explanation of features of the image pickup apparatus and/or an instruction of operations of the apparatus may be presented to a person considering the purchase by a moving image and voice information. The person's message information may be information provided by one or more of a person engaged in the manufacturing of the image pickup apparatus, a designer of the apparatus, a salesperson of a shop, and a person engaged in the product planning.

A third mode of the image pickup apparatus according to the present invention is intended to provide an image pickup apparatus equipped with a zoom lens that can be easily designed to have a wide angle of view and a high zoom ratio.

The image pickup apparatus according to the third mode of the present invention includes a zoom lens and an image pickup element that is disposed on the image side of the zoom lens, has an image pickup surface, and converts an optical image formed in the image pickup surface by the zoom lens into an electrical signal, wherein the zoom lens includes, in order from the object side thereof, a first lens unit having a negative refracting power, a second lens unit having a positive refracting power, and a third lens unit, the zoom lens further includes an aperture stop that moves integrally with the second lens unit during zooming from the wide angle end to the telephoto end, and during the zooming from the wide angle end to the telephoto end, the first lens unit and the second lens unit move, and the distances between the lens units change, the first lens unit includes a negative lens that satisfies the following conditional expression (1B), the second lens is composed of four lens elements including a positive lens and a negative lens and satisfies the following conditional expression (12B):

$$-1.0<(r_{1a}+r_{1b})/(r_{1a}-r_{1b})<0.98 \tag{1B}$$

$$1.75<\text{AVE}(n_d)<2.40 \tag{12B},$$

where $r_{1a}$ and $r_{1b}$ are the paraxial radii of curvature of the object side surface and the image side surface of the negative lens in the first lens unit respectively, and $\text{AVE}(n_d)$ is the average of the refractive indices of all the lenses included in the first to third lens units of the zoom lens.

In the image pickup apparatus according to the third mode, conditional expression (12B) may be introduced instead of conditional expressions (2B) and (3B) mentioned before in connection with the first aspect of the present invention.

If the lower limit of conditional expression (12B) is not exceeded, it is possible to make the absolute values of the paraxial radii of curvature of the lenses in the zoom lens small while designing the lens units to have sufficient refracting powers. This leads to slimming of each lens unit and an improvement in the optical performance and is advantageous in achieving an adequate zoom ratio and an adequate angle of view.

If the upper limit of conditional expression (12B) is not exceeded, reduction of the cost of the material of the lenses is facilitated.

In the image pickup apparatus according to the present invention, it is preferred that the first lens unit be composed of a negative lens and a positive lens arranged in order from the object side.

If the first lens unit is composed of two lens elements including a negative lens and a positive lens arranged in order from the object side, the principal point of the first lens unit is made closer to the object side, whereby reduction of the size of the first lens unit with respect to the diametrical direction and the entire length of the zoom lens is facilitated.

In addition, this feature facilitates reduction of chromatic aberration of the first lens unit with a small number of lenses. In addition, this feature is advantageous in reducing axial aberrations at the telephoto end.

In the image pickup apparatus according to the present invention, it is preferred that the zoom lens satisfy the following conditional expression (13B):

$$3.6<f_t/f_w<10 \tag{13B},$$

where $f_w$ is the focal length of the zoom lens at the wide angle end, and $f_t$ is the focal length of the zoom lens at the telephoto end.

Conditional expression (13B) specifies preferred values of the zoom ratio of the zoom lens.

It is preferred, in order for the advantages of the present invention to be enjoyed, that the lower limit of conditional expression (13B) is not exceeded so that the zoom lens has an adequate zoom ratio.

It is preferred that the upper limit of conditional expression (13B) be not exceeded. This facilitates reduction of the size and cost and improvement of the optical performance.

In the image pickup apparatus according to the present invention, it is preferred that the apparatus have an image transformation section that transforms, by image processing, an electrical signal representing an image containing distortion attributed to the zoom lens into an image signal in which distortion is corrected.

With this feature, an image that has been electrically corrected in terms of distortion can be recorded or displayed. Therefore, the zoom lens is allowed to have distortion. This provides an advantage in correction of curvature of field and coma, and consequently good image quality can easily be achieved with a small-size zoom lens.

In the image pickup apparatus according to the present invention, it is preferred that the apparatus have an image transformation section that transforms, by image processing, an electrical signal containing chromatic aberration of magnification attributed to the zoom lens into an image signal in which chromatic aberration of magnification is corrected.

It is preferred that the apparatus have an image transformation section that transforms, by image processing, an electrical signal representing an image formed by the zoom lens into an image signal in which color misregistration caused by chromatic aberration of magnification is corrected. By electrically correcting chromatic aberration of magnification of the zoom lens, images having improved image quality can be obtained.

Thus, the zoom lens is allowed to have chromatic aberration of magnification, which assures a higher degree of freedom in the selection of lens materials, whereby reduction in the cost, slimming of the zoom lens, and improvement of the performance are facilitated.

In the image pickup apparatus according to the present invention, it is more preferred that two or more of the above described features be adopted at the same time.

It is more preferred that the lower limit value and/or the upper limit value of each of the conditional expressions be further limited as follows. With such further limitations, the advantageous effects of the present invention can be achieved more effectively.

In conditional expression (1B), it is more preferred that the lower limit value be −1.0, still more preferably 0.5, and the upper limit value be 0.90, still more preferably 0.85.

In conditional expression (2), it is more preferred that the lower limit value be 1.00, still more preferably 1.40, and the upper limit value be 1.80, still more preferably 1.68.

In conditional expression (3B), it is more preferred that the lower limit value be 1.6, still more preferably 1.8, and the upper limit value be 3.5, still more preferably 2.1.

In conditional expression (4B), it is more preferred that the lower limit value be 1.3, still more preferably 1.7, and the upper limit value be 2.5, still more preferably 2.0.

In conditional expression (5B), it is more preferred that the lower limit value be 1.2, still more preferably 1.4, and the upper limit value be 2.0, still more preferably 1.7.

In conditional expression (6B), it is more preferred that the lower limit value be 2.0, still more preferably 2.3, and the upper limit value be 8.0, still more preferably 6.5.

In conditional expression (7B), it is more preferred that the lower limit value be 1.90, still more preferably 1.92, and the upper limit value be 2.20, still more preferably 2.10.

In conditional expression (8B), it is more preferred that the lower limit value be 1.2, still more preferably 1.3, and the upper limit value be 3.0, still more preferably 2.3.

In conditional expression (9B), it is more preferred that the lower limit value be 4.4, still more preferably 4.7, and the upper limit value be 7.0, still more preferably 5.3.

In conditional expression (10B), it is more preferred that the lower limit value be 0.8, still more preferably 0.9, and the upper limit value be 1.5, still more preferably 1.2.

In conditional expression (11B), it is more preferred that the lower limit value be 0.7, still more preferably 0.8, and the upper limit value be 0.99, still more preferably 0.98.

In conditional expression (12B), it is more preferred that the lower limit value be 1.76, still more preferably 1.78, and the upper limit value be 2.3, still more preferably 2.2.

In conditional expression (13B), it is more preferred that the lower limit value be 3.8, still more preferably 4.4, and the upper limit value be 8.0, still more preferably 6.5.

The present invention can provide a zoom lens in which the frontmost lens unit has a negative refracting power and that is advantageous in achieving an adequate zoom ratio and an adequate angle of field or in reducing the size. The present invention can also provide an image pickup apparatus equipped with such a zoom lens.

The image pickup apparatus according to the present invention is advantageous in that it can be equipped with a zoom lens that is small in size and advantageous in achieving a wide angle of field and a high zoom ratio.

In the following, embodiments of the zoom lens and the image pickup apparatus equipped with the zoom lens according to the present invention will be described in detail with reference to the drawings. It should be understood, however, that the present invention is not limited by the embodiments.

In the following, first to twenty-second embodiments of the zoom lens according to the present invention will be described. FIGS. 1A, 1B and 1C to 11A, 11B and 11C are cross sectional views of the zoom lenses according to the first to the eleventh embodiments respectively at the wide angle end (FIGS. 1A, 2A, 3A, 4A, 5A, 6A, 7A, 8A, 9A, 10A, and 11A), in an intermediate focal length state (FIGS. 1B, 2B, 3B, 4B, 5B, 6B, 7B, 8B, 9B, 10B, and 11B), and at the telephoto end (FIGS. 1C, 2C, 3C, 4C, 5C, 6C, 7C, 8C, 9C, 10C, and 11C) in the state in which the zoom lenses are focused on an object point at infinity. In FIGS. 1A through 11C, a first lens unit is denoted by G1, an aperture stop is denoted by S, a second lens unit is denoted by G2, a third lens unit is denoted by G3, a fourth lens unit is denoted by G4, a plane parallel plate having wavelength range restriction coating applied thereon that blocks or reduces infrared light, constituting a low pass filter is denoted by F, a plane parallel plate constituting a cover glass for an electronic image pickup element is denoted by C, and the image plane is denoted by I. The cover glass C may have multi-layer coating for wavelength range restriction applied on its surface. The cover glass C may be designed to have a function of a low pass filter.

All the zoom lenses according to the embodiments have a zoom ratio within the range of approximately 4.8 to 5.8. The zoom lenses according to the first to eighth embodiments are three-unit zoom lenses with a negative-positive-positive type refracting power arrangement. The zoom lens according to the ninth embodiment is a four-unit zoom lens with a negative-positive-positive-positive type refracting power arrangement. The zoom lens according to the tenth embodiment is a three-unit zoom lens with a negative-positive-negative type power arrangement. These zoom lenses have a wide angle of view at the wide angle end. The zoom lens according to the eleventh embodiment is a small-size, small-diameter, two-unit zoom lens with a negative-positive type refracting power arrangement.

In each embodiment, the effective image pickup area has a fixed rectangular shape at all the zoom positions. All the numerical values associated with conditional expressions presented below for each embodiment are for the state in which the zoom lens is focused on an object at infinity. The entire length refers to the value obtained by adding the back focus to the distance from the incidence surface to the exit surface of the lens on the optical axis. The back focus is represented by an equivalent air distance.

In all the embodiments, the aperture stop S moves integrally with the second lens unit G2. In the numerical data, dimensions are in mm (millimeters) and angles are in degrees. In all the embodiments, focusing is performed by moving the fourth lens unit G4. Zoom data will be presented for the wide angle end (WE), the intermediate focal length state (ST) defined in connection with the present invention, and the telephoto end (TE).

During zooming from the wide angle end to the telephoto end, the first lens unit moves first toward the image side and thereafter toward the object side, the second unit moves only toward the object side. The way of movement of the third lens unit during zooming differs among the embodiments. In the first, fourth, seventh, and eighth embodiments, the third lens unit moves only toward the image side. In the second, third, fifth, ninth, and tenth embodiments, the third lens unit moves first toward the object side and thereafter toward the image side. In the sixth embodiment, the third lens unit moves first toward the image side and thereafter toward the object side. In the ninth embodiment, the fourth lens unit is fixed.

In the first through ninth embodiments, the focusing operation from an object at a long distance to an object at a short distance is performed by moving the third lens unit toward the object side. In the tenth embodiment, the focusing operation from an object at a long distance to an object at a short distance is performed by moving the third lens unit toward the image side. Alternatively, the first lens unit may be moved toward the object side. In the eleventh embodiment, the focusing operation from an object at a long distance to an object at a short distance is performed by moving the first lens unit toward the object side.

The plane parallel plates include the low pass filter on which IR cut coating is applied and the CCD cover glass.

Figure 1B:
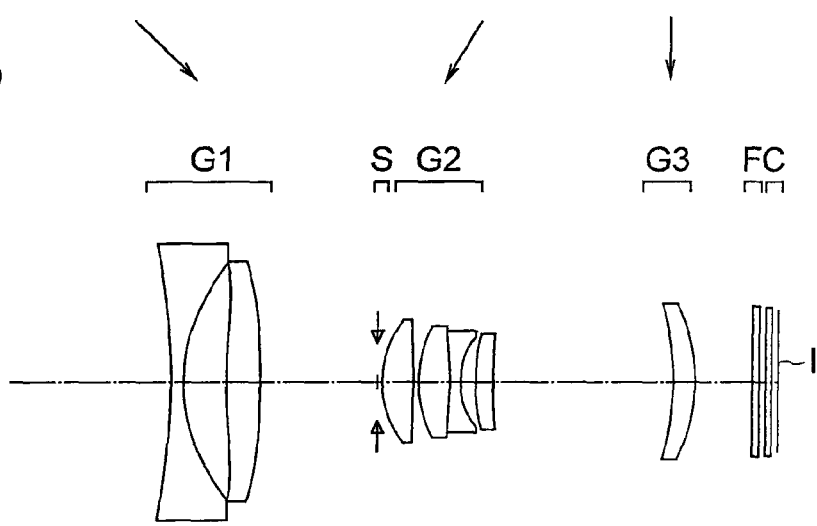
Figure 1C:
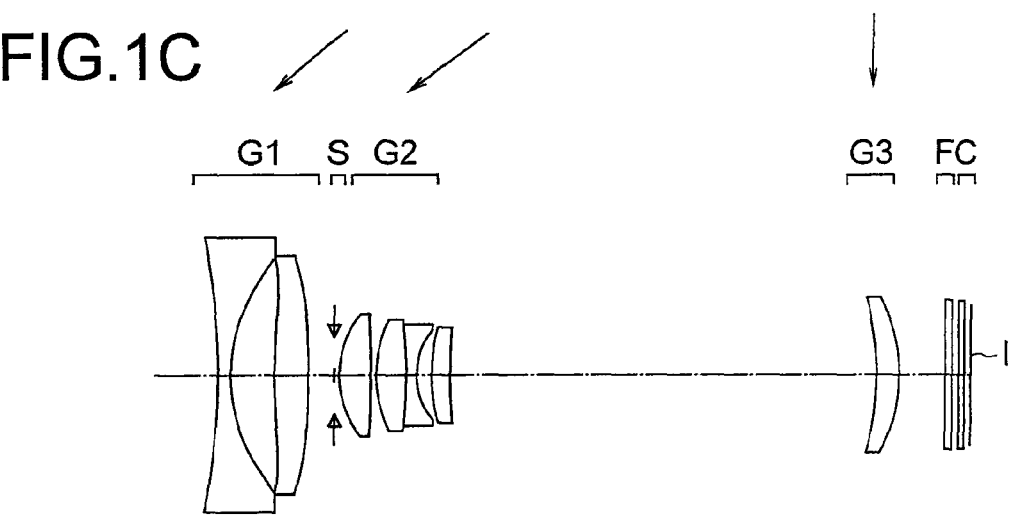

As shown in FIGS. 1A, 1B, and 1C, the zoom lens according to the first embodiment includes, in order from the object side thereof, a first lens unit G1 having a negative refracting power, an aperture stop S, a second lens unit G2 having a positive refracting power, and a third lens unit G3 having a positive refracting power.

The first lens unit G1 is composed of a biconcave negative lens and a biconvex positive lens. The second lens unit G2 is composed of a biconvex positive lens, a cemented lens made up of a biconvex positive lens and a biconcave negative lens, and a positive meniscus lens having a convex surface directed toward the object side. The third lens unit G3 is composed of a positive meniscus lens having a convex surface directed toward the image side. All the lens elements in each lens unit G1, G2, G3 are arranged in the mentioned order from the object side.

The following seven lens surfaces are aspheric surfaces: both surfaces of the biconcave negative lens in the first lens unit G1, both surfaces of the biconvex positive lens in the first lens unit G1, both surfaces of the biconvex positive lens located closest to the object side in the second lens unit G2, and the image side surface of the positive meniscus lens in the third lens unit G3.

Figure 2A:
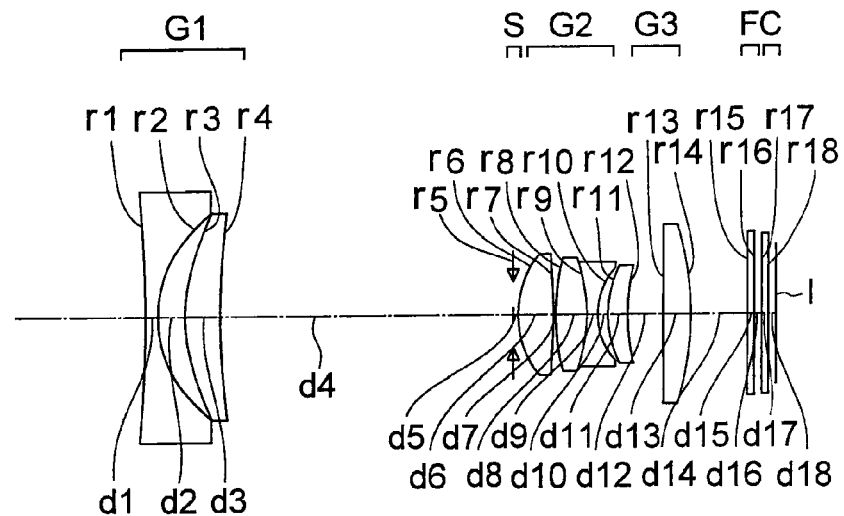
FIGS. 2A, 2B, and 2C are cross sectional views similar to FIGS. 1A, 1B, and 1C showing a zoom lens according to a second embodiment of the present invention.
Figure 2B:
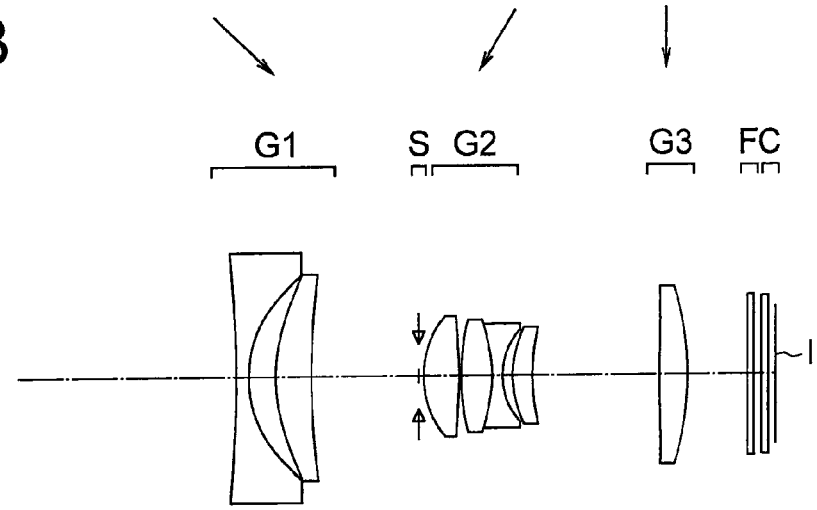
Figure 2C:
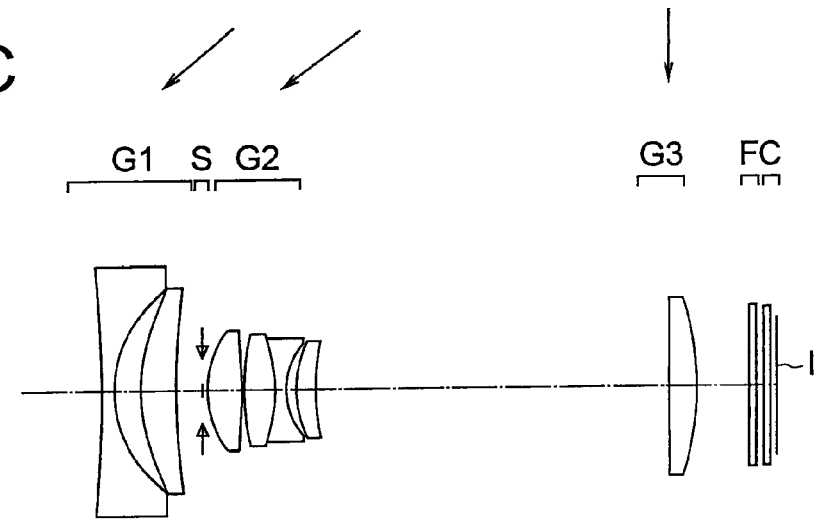

As shown in FIGS. 2A, 2B, and 2C, the zoom lens according to the second embodiment includes, in order from the object side thereof, a first lens unit G1 having a negative refracting power, an aperture stop S, a second lens unit G2 having a positive refracting power, and a third lens unit G3 having a positive refracting power.

The first lens unit G1 is composed of a biconcave negative lens and a positive meniscus lens having a convex surface directed toward the object side. The second lens unit G2 is composed of a biconvex positive lens, a cemented lens made up of a biconvex positive lens and a biconcave negative lens, and a positive meniscus lens having a convex surface directed toward the object side. The third lens unit G3 is composed of a biconvex positive lens. All the lens elements in each lens unit G1, G2, G3 are arranged in the mentioned order from the object side.

The following seven lens surfaces are aspheric surfaces: both surfaces of the biconcave negative lens in the first lens unit G1, both surfaces of the positive meniscus lens in the first lens unit G1, both surfaces of the biconvex positive lens located closest to the object side in the second lens unit G2, and the image side surface of the biconvex positive lens in the third lens unit G3.

Figure 3A:
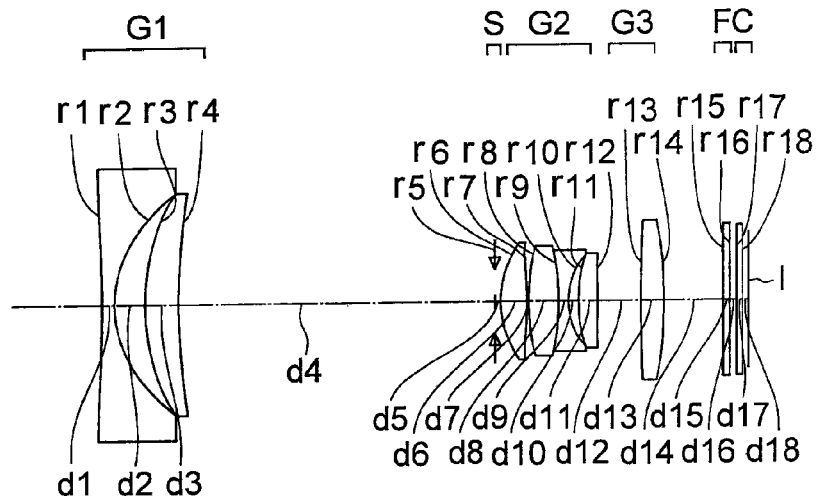
FIGS. 3A, 3B, and 3C are cross sectional views similar to FIGS. 1A, 1B, and 1C showing a zoom lens according to a third embodiment of the present invention.
Figure 3B:
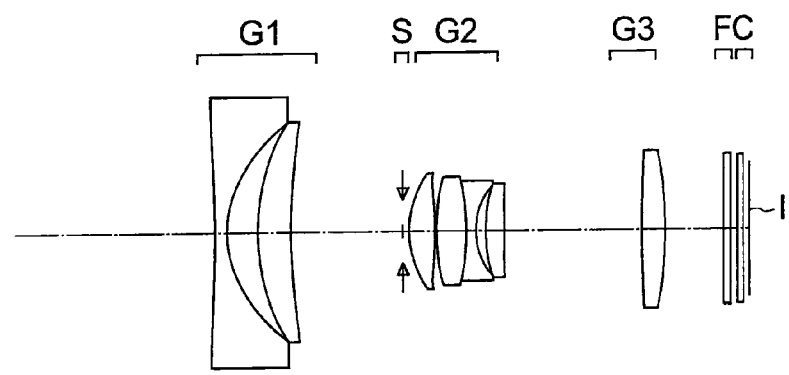
Figure 3C:
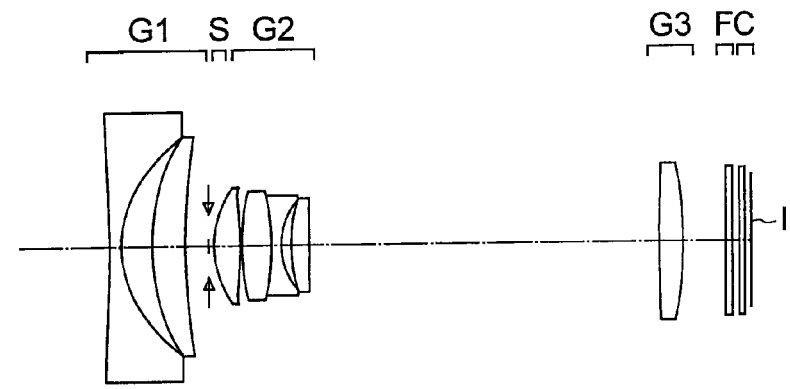

As shown in FIGS. 3A, 3B, and 3C, the zoom lens according to the third embodiment includes, in order from the object side thereof, a first lens unit G1 having a negative refracting power, an aperture stop S, a second lens unit G2 having a positive refracting power, and a third lens unit G3 having a positive refracting power.

The first lens unit G1 is composed of a biconcave negative lens and a positive meniscus lens having a convex surface directed toward the object side. The second lens unit G2 is composed of a biconvex positive lens, a cemented lens made up of a biconvex positive lens and a biconcave negative lens, and a positive meniscus lens having a convex surface directed toward the object side. The third lens unit G3 is composed of a biconvex positive lens. All the lens elements in each lens unit G1, G2, G3 are arranged in the mentioned order from the object side.

The following seven lens surfaces are aspheric surfaces: both surfaces of the biconcave negative lens in the first lens unit G1, both surfaces of the positive meniscus lens in the first lens unit G1, both surfaces of the biconvex positive lens located closest to the object side in the second lens unit G2, and the image side surface of the biconvex positive lens in the third lens unit G3.

Figure 4A:
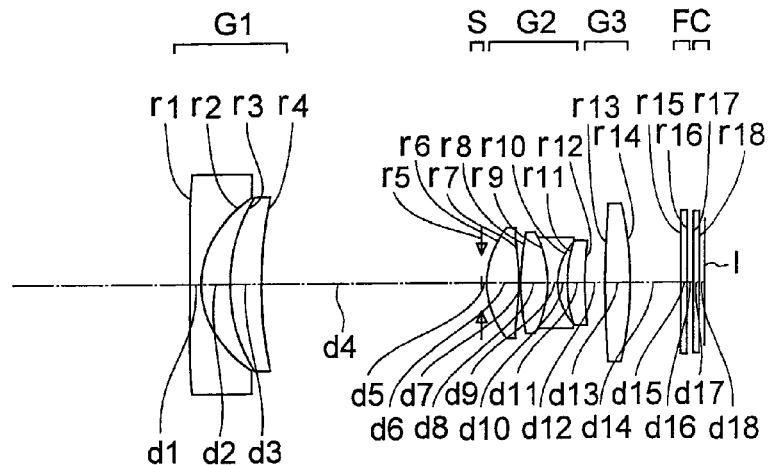
FIGS. 4A, 4B, and 4C are cross sectional views similar to FIGS. 1A, 1B, and 1C showing a zoom lens according to a fourth embodiment of the present invention.
Figure 4B:
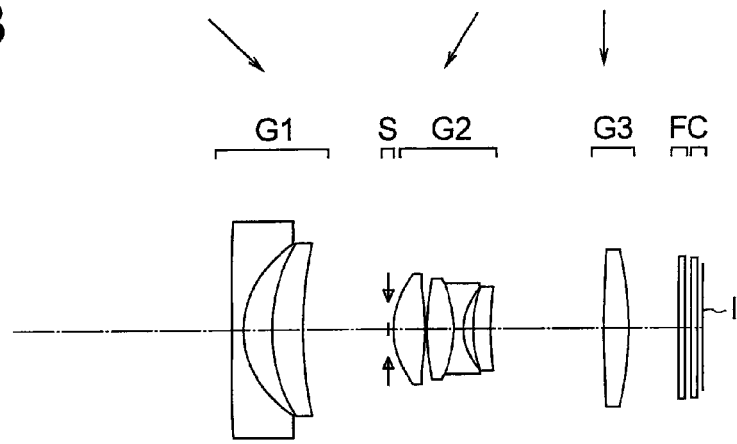
Figure 4C:
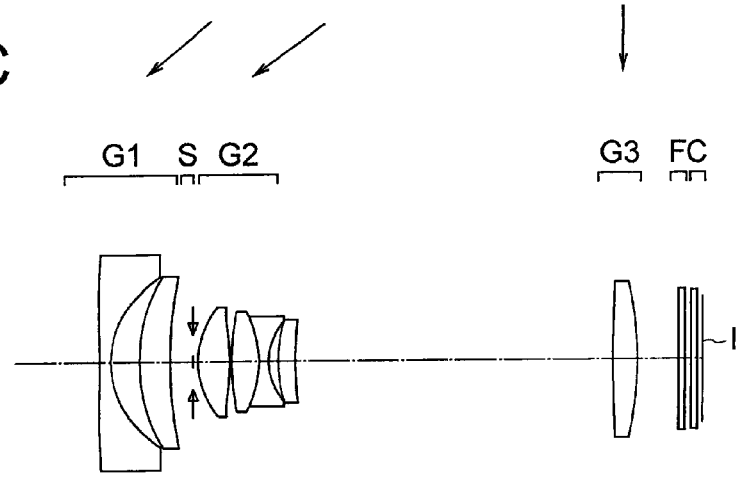

As shown in FIGS. 4A, 4B, and 4C, the zoom lens according to the fourth embodiment includes, in order from the object side thereof, a first lens unit G1 having a negative refracting power, an aperture stop S, a second lens unit G2 having a positive refracting power, and a third lens unit G3 having a positive refracting power.

The first lens unit G1 is composed of a biconcave negative lens and a positive meniscus lens having a convex surface directed toward the object side. The second lens unit G2 is composed of a biconvex positive lens, a cemented lens made up of a biconvex positive lens and a biconcave negative lens, and a positive meniscus lens having a convex surface directed toward the object side. The third lens unit G3 is composed of a biconvex positive lens. All the lens elements in each lens unit G1, G2, G3 are arranged in the mentioned order from the object side.

The following seven lens surfaces are aspheric surfaces: both surfaces of the biconcave negative lens in the first lens unit G1, both surfaces of the positive meniscus lens in the first lens unit G1, both surfaces of the biconvex positive lens located closest to the object side in the second lens unit G2, and the image side surface of the biconvex positive lens in the third lens unit G3.

Figure 5A:
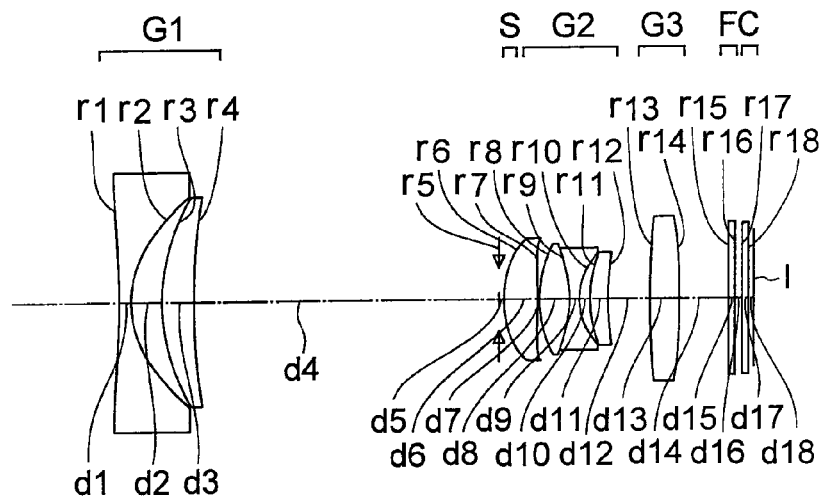
FIGS. 5A, 5B, and 5C are cross sectional views similar to FIGS. 1A, 1B, and 1C showing a zoom lens according to a fifth embodiment of the present invention.
Figure 5B:
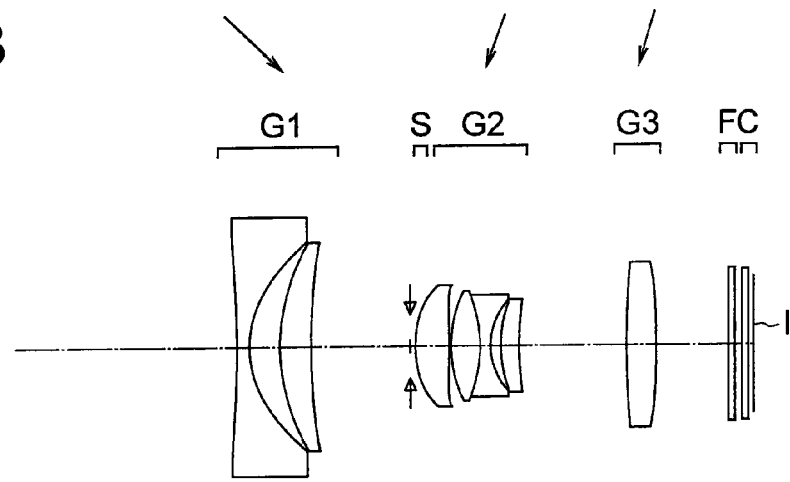
Figure 5C:
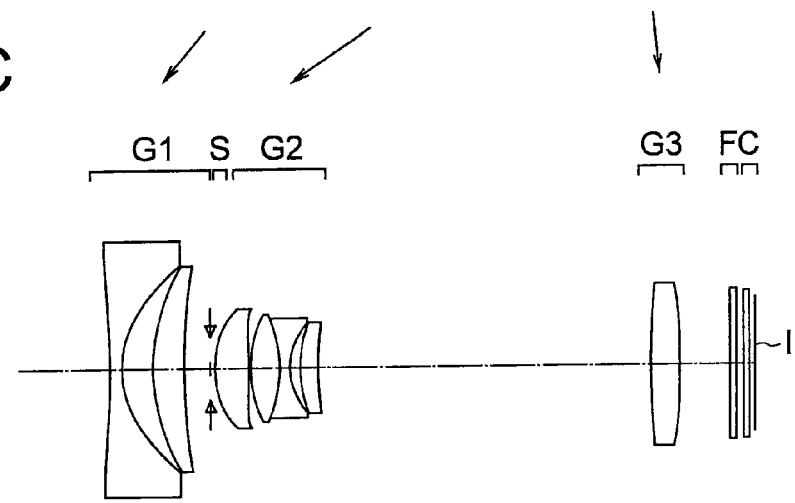

As shown in FIGS. 5A, 5B, and 5C, the zoom lens according to the fifth embodiment includes, in order from the object side thereof, a first lens unit G1 having a negative refracting power, an aperture stop S, a second lens unit G2 having a positive refracting power, and a third lens unit G3 having a positive refracting power.

The first lens unit G1 is composed of a biconcave negative lens and a positive meniscus lens having a convex surface directed toward the object side. The second lens unit G2 is composed of a biconvex positive lens, a cemented lens made up of a biconvex positive lens and a biconcave negative lens, and a positive meniscus lens having a convex surface directed toward the object side. The third lens unit G3 is composed of a biconvex positive lens. All the lens elements in each lens unit G1, G2, G3 are arranged in the mentioned order from the object side.

The following five lens surfaces are aspheric surfaces: both surfaces of the biconcave negative lens in the first lens unit G1, both surfaces of the biconvex positive lens located closest to the object side in the second lens unit G2, and the object side surface of the positive meniscus lens in the second lens unit G2.

Figure 6A:
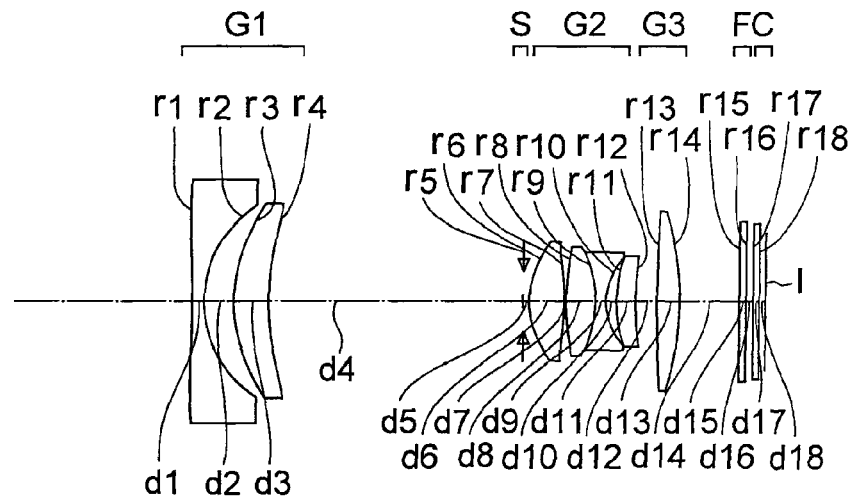
FIGS. 6A, 6B, and 6C are cross sectional views similar to FIGS. 1A, 1B, and 1C showing a zoom lens according to a sixth embodiment of the present invention.
Figure 6B:
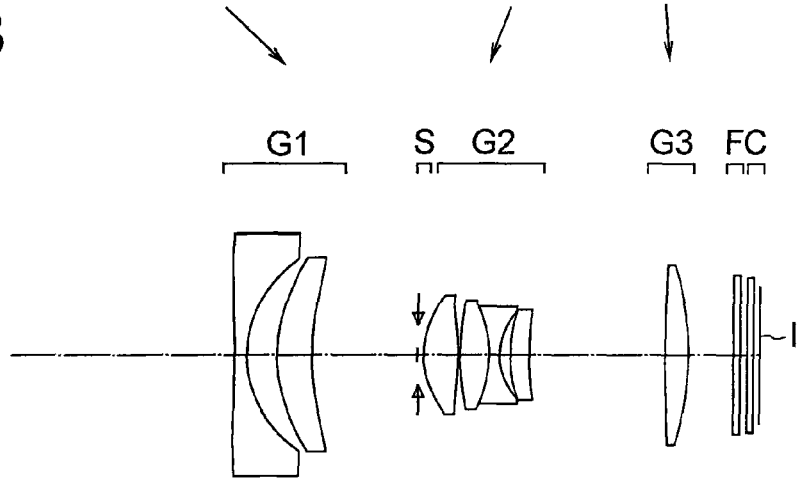
Figure 6C:
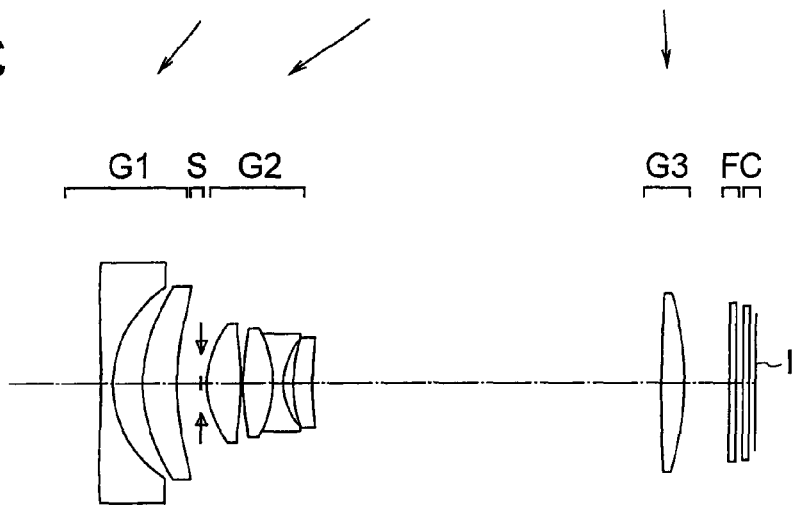

As shown in FIGS. 6A, 6B, and 6C, the zoom lens according to the sixth embodiment includes, in order from the object side thereof, a first lens unit G1 having a negative refracting power, an aperture stop S, a second lens unit G2 having a positive refracting power, and a third lens unit G3 having a positive refracting power.

The first lens unit G1 is composed of a biconcave negative lens and a positive meniscus lens having a convex surface directed toward the object side. The second lens unit G2 is composed of a biconvex positive lens, a cemented lens made up of a biconvex positive lens and a biconcave negative lens, and a positive meniscus lens having a convex surface directed toward the object side. The third lens unit G3 is composed of a biconvex positive lens. All the lens elements in each lens unit G1, G2, G3 are arranged in the mentioned order from the object side.

The following seven lens surfaces are aspheric surfaces: both surfaces of the biconcave negative lens in the first lens unit G1, both surfaces of the biconvex positive lens located closest to the object side in the second lens unit G2, both surfaces of the positive meniscus lens in the second lens unit G2, and the image side surface of the biconvex positive lens in the third lens unit G3.

Figure 7A:
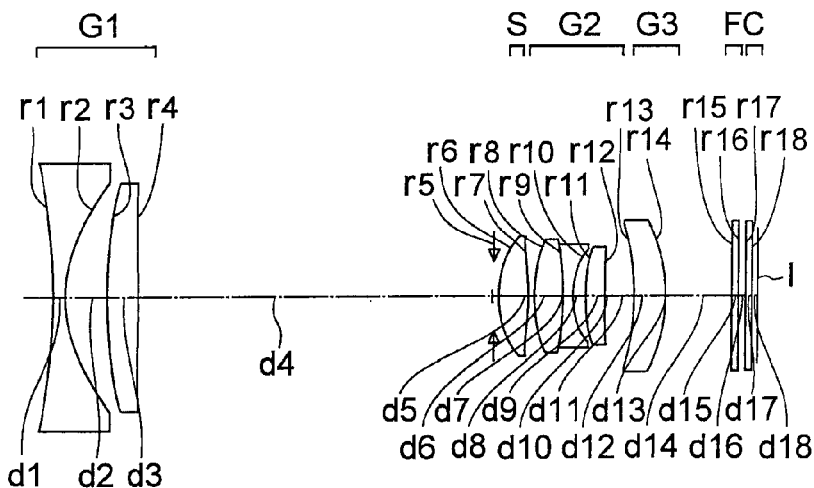
FIGS. 7A, 7B, and 7C are cross sectional views similar to FIGS. 1A, 1B, and 1C showing a zoom lens according to a seventh embodiment of the present invention.
Figure 7B:
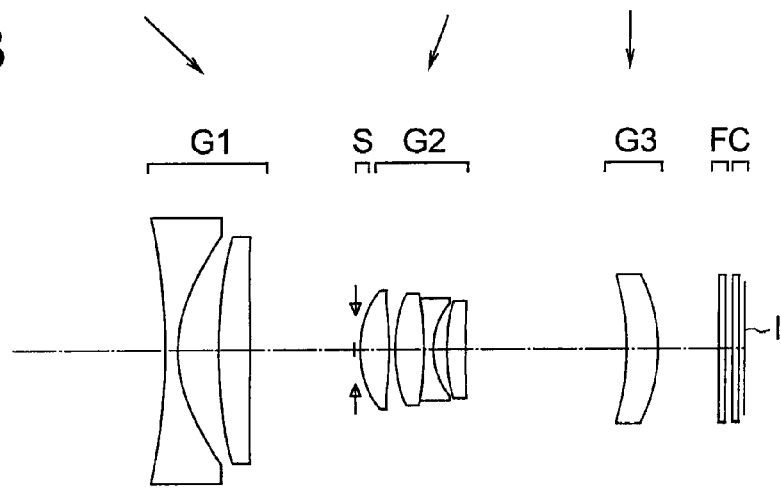
Figure 7C:
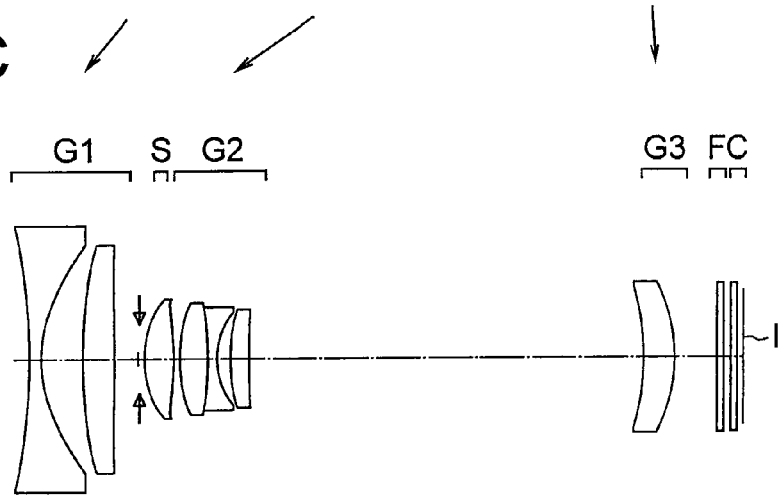

As shown in FIGS. 7A, 7B, and 7C, the zoom lens according to the seventh embodiment includes, in order from the object side thereof, a first lens unit G1 having a negative refracting power, an aperture stop S, a second lens unit G2 having a positive refracting power, and a third lens unit G3 having a positive refracting power.

The first lens unit G1 is composed of a biconcave negative lens and a biconvex positive lens. The second lens unit G2 is composed of a biconvex positive lens, a cemented lens made up of a biconvex positive lens and a biconcave negative lens, and a positive meniscus lens having a convex surface directed toward the object side. The third lens unit G3 is composed of a positive meniscus lens having a convex surface directed toward the image side. All the lens elements in each lens unit G1, G2, G3 are arranged in the mentioned order from the object side.

The following five lens surfaces are aspheric surfaces: both surfaces of the biconcave negative lens in the first lens unit G1, both surfaces of the biconvex positive lens located closest to the object side in the second lens unit G2, and the image side surface of the positive meniscus lens in the third lens unit G3.

Figure 8A:
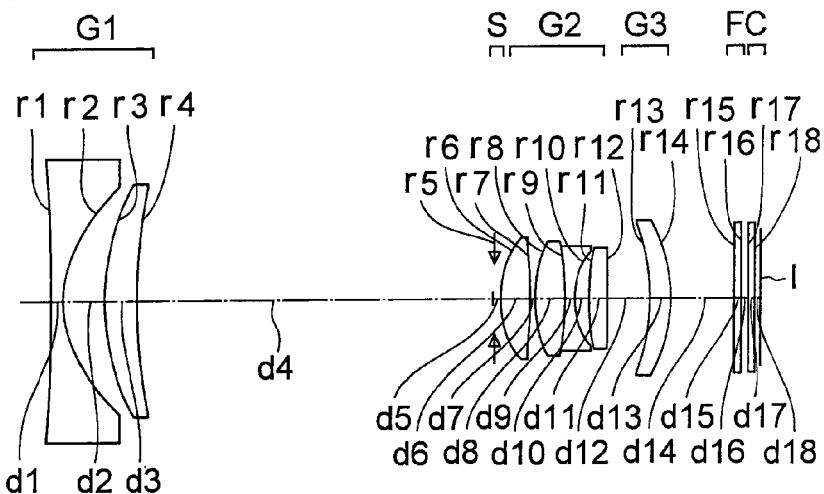
FIGS. 8A, 8B, and 8C are cross sectional views similar to FIGS. 1A, 1B, and 1C showing a zoom lens according to a eighth embodiment of the present invention.
Figure 8B:
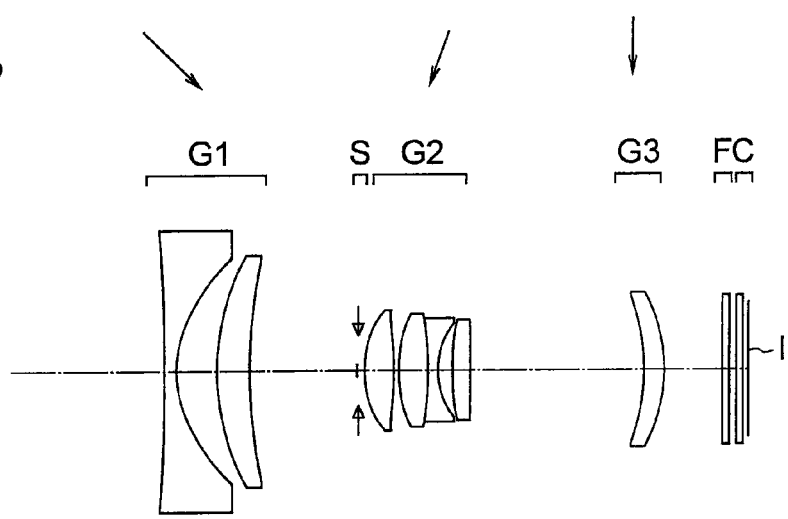
Figure 8C:
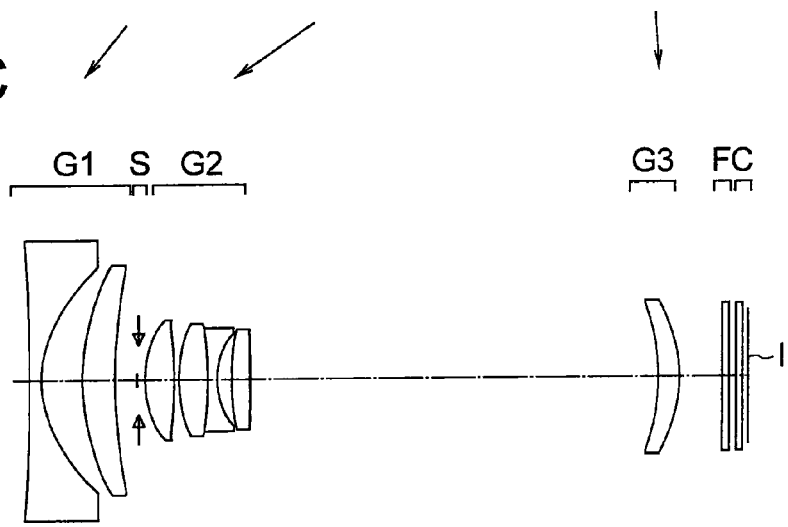

As shown in FIGS. 8A, 8B, and 8C, the zoom lens according to the eighth embodiment includes, in order from the object side thereof, a first lens unit G1 having a negative refracting power, an aperture stop S, a second lens unit G2 having a positive refracting power, and a third lens unit G3 having a positive refracting power.

The first lens unit G1 is composed of a biconcave negative lens and a positive meniscus lens having a convex surface directed toward the object side. The second lens unit G2 is composed of a biconvex positive lens, a cemented lens made up of a biconvex positive lens and a biconcave negative lens, and a biconvex positive lens. The third lens unit G3 is composed of a positive meniscus lens having a convex surface directed toward the image side. All the lens elements in each lens unit G1, G2, G3 are arranged in the mentioned order from the object side.

The following five lens surfaces are aspheric surfaces: both surfaces of the biconcave negative lens in the first lens unit G1, both surfaces of the biconvex positive lens located closest to the object side in the second lens unit G2, and the image side surface of the positive meniscus lens in the third lens unit G3.

Figure 9A:
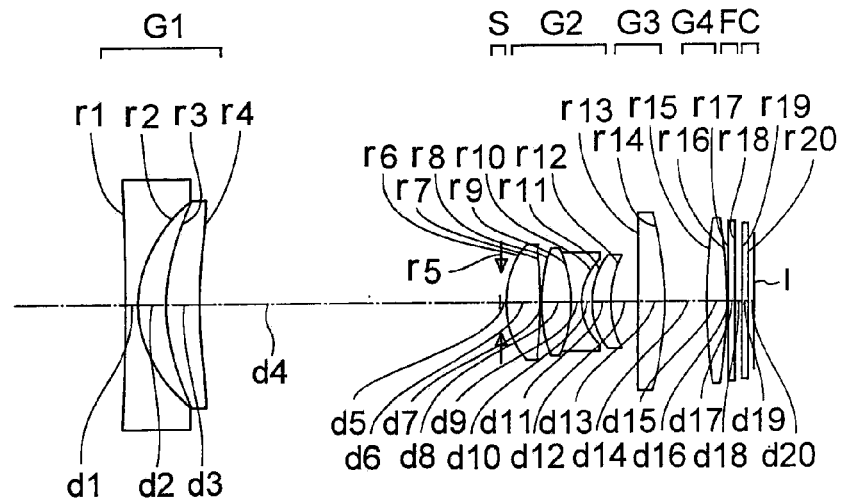
FIGS. 9A, 9B, and 9C are cross sectional views similar to FIGS. 1A, 1B, and 1C showing a zoom lens according to a ninth embodiment of the present invention.
Figure 9B:
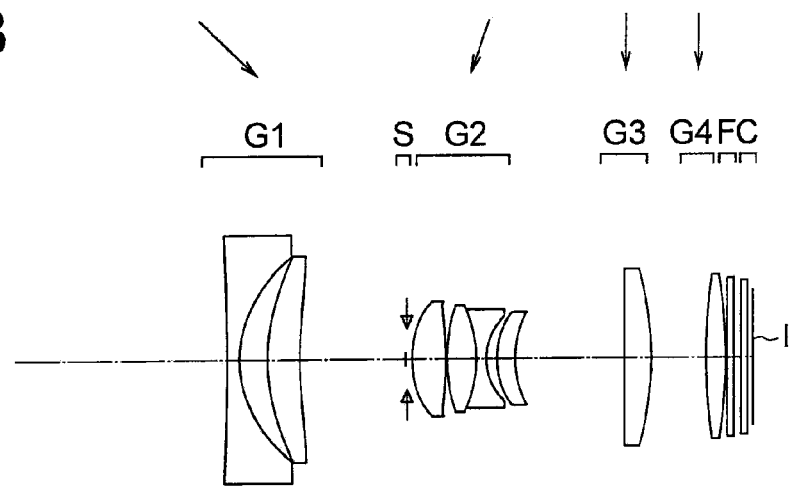
Figure 9C:
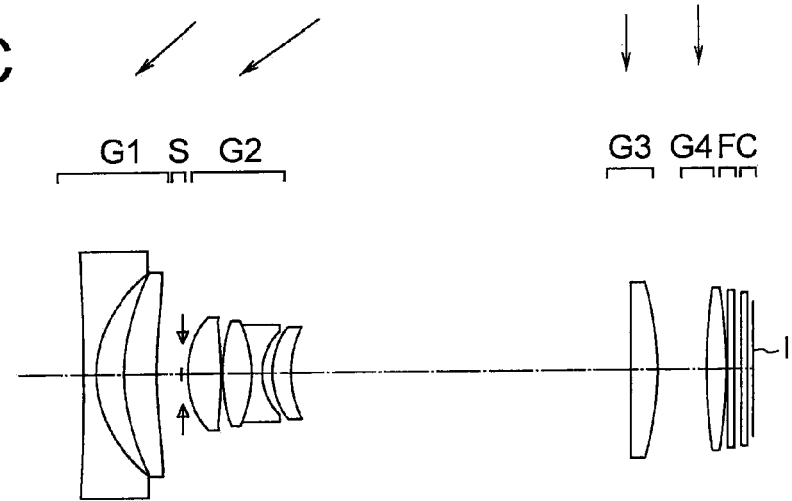

As shown in FIGS. 9A, 9B, and 9C, the zoom lens according to the ninth embodiment includes, in order from the object side thereof, a first lens unit G1 having a negative refracting power, an aperture stop S, a second lens unit G2 having a positive refracting power, a third lens unit G3 having a positive refracting power, and a fourth lens unit G4 having a positive refracting power.

The first lens unit G1 is composed of a biconcave negative lens and a positive meniscus lens having a convex surface directed toward the object side. The second lens unit G2 is composed of a biconvex positive lens, a cemented lens made up of a biconvex positive lens and a biconcave negative lens, and a positive meniscus lens having a convex surface directed toward the object side. The third lens unit G3 is composed of a biconvex positive lens. The fourth lens unit G4 is composed of a biconvex positive lens. All the lens elements in each lens unit G1, G2, G3, G4 are arranged in the mentioned order from the object side.

The following seven lens surfaces are aspheric surfaces: both surfaces of the biconcave negative lens in the first lens unit G1, both surfaces of the positive meniscus lens in the first lens unit G1, both surfaces of the biconvex positive lens located closest to the object side in the second lens unit G2, and the image side surface of the biconvex positive lens in the third lens unit G3.

Figure 10A:
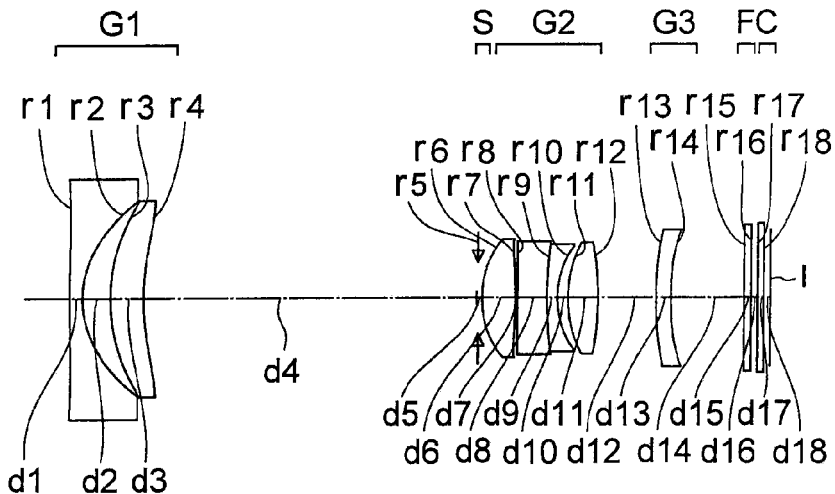
FIGS. 10A, 10B, and 10C are cross sectional views similar to FIGS. 1A, 1B, and 1C showing a zoom lens according to a tenth embodiment of the present invention.
Figure 10B:
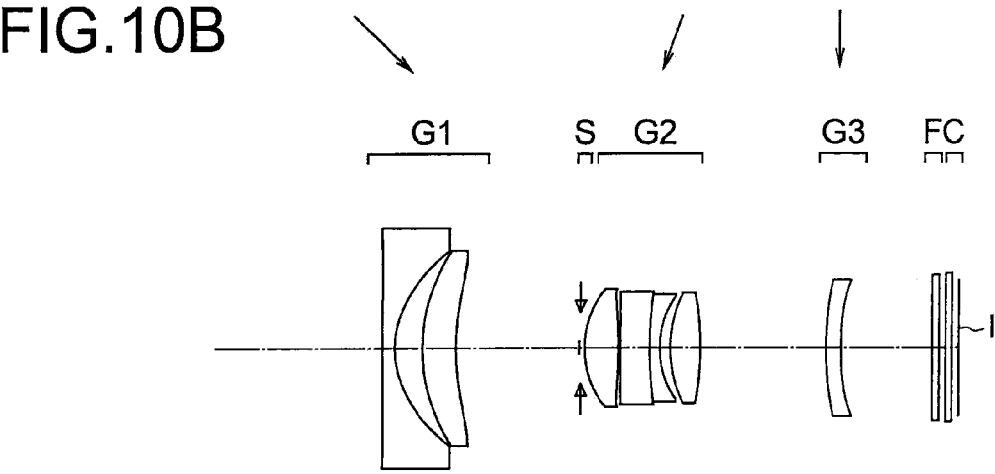
Figure 10C:
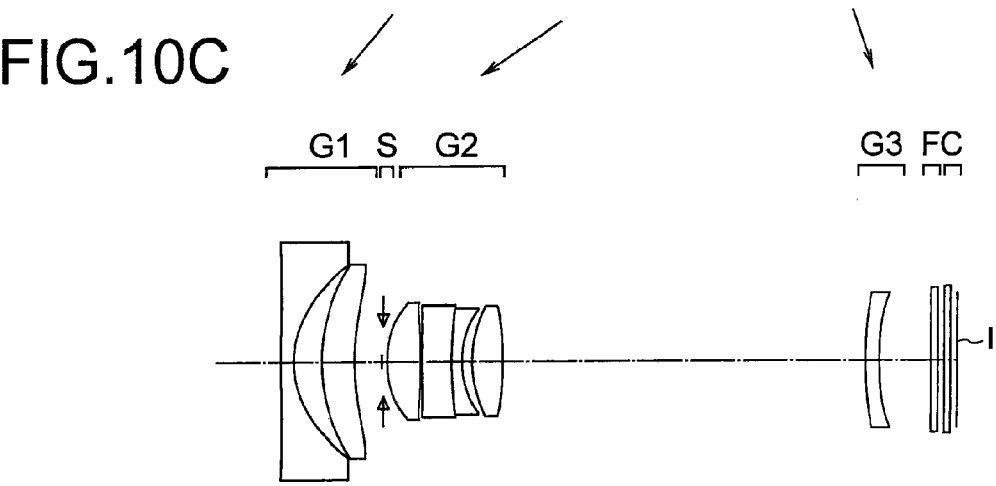

As shown in FIGS. 10A, 10B, and 10C, the zoom lens according to the tenth embodiment includes, in order from the object side thereof, a first lens unit G1 having a negative refracting power, an aperture stop S, a second lens unit G2 having a positive refracting power, and a third lens unit G3 having a negative refracting power.

The first lens unit G1 is composed of a biconcave negative lens and a positive meniscus lens having a convex surface directed toward the object side. The second lens unit G2 is composed of a biconvex positive lens, a cemented lens made up of a negative meniscus lens having a convex surface directed toward the object side and a negative meniscus lens having a convex surface directed toward the object side, and a biconvex positive lens. The third lens unit G3 is composed of a negative meniscus lens having a convex surface directed toward the object side. All the lens elements in each lens unit G1, G2, G3 are arranged in the mentioned order from the object side.

The following ten lens surfaces are aspheric surfaces: both surfaces of the biconcave negative lens in the first lens unit G1, both surfaces of the positive meniscus lens in the first lens unit G1, both surfaces of the biconvex positive lens located closest to the object side in the second lens unit G2, both surfaces of the biconvex positive lens located closest to the image side in the second lens unit G2, and both surfaces of the negative meniscus lens in the third lens unit G3.

Figure 11A:
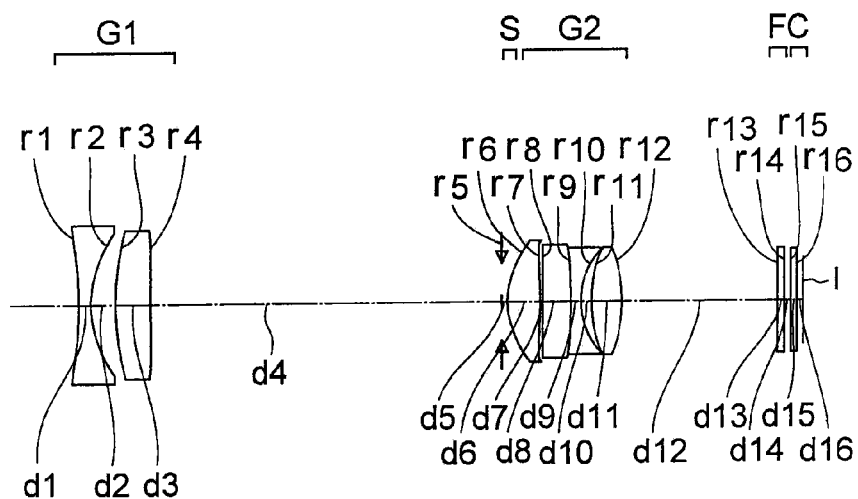
FIGS. 11A, 11B, and 11C are cross sectional views similar to FIGS. 1A, 1B, and 1C showing a zoom lens according to a eleventh embodiment of the present invention.
Figure 11B:
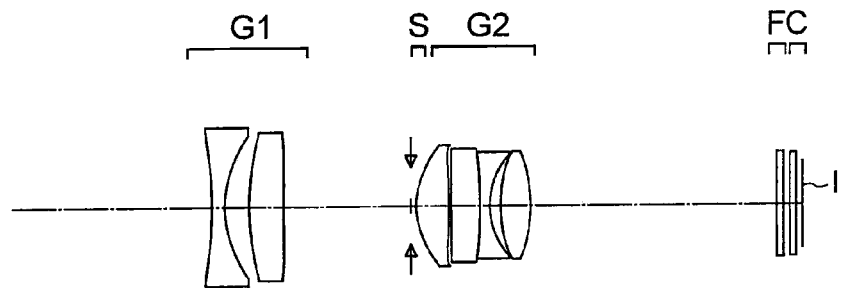
Figure 11C:
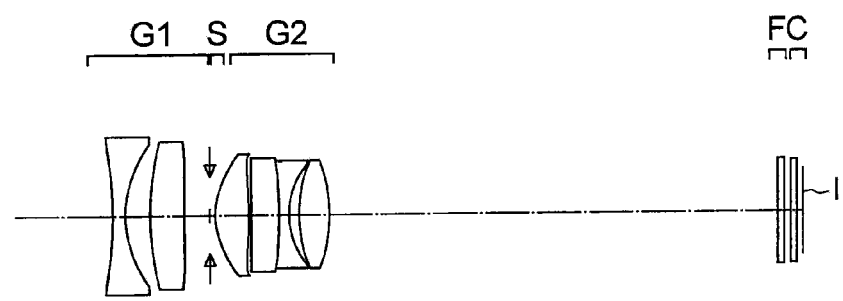
Figure 12A:
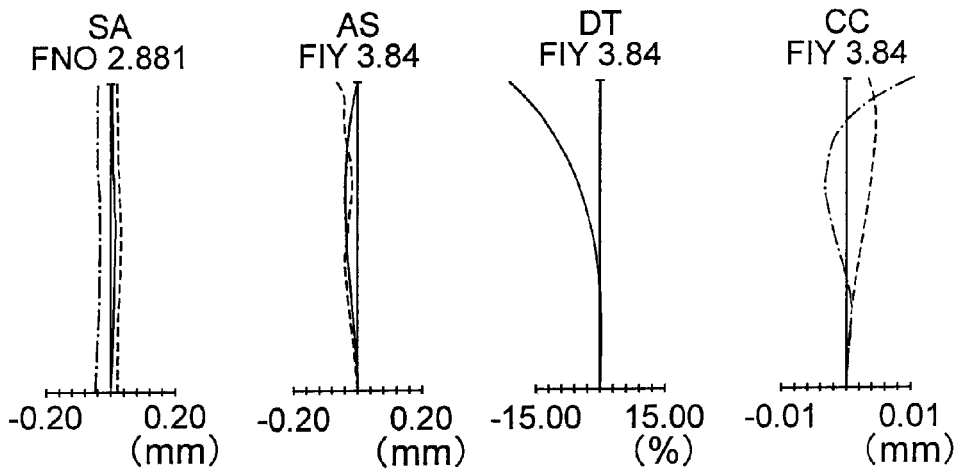
FIGS. 12A, 12B and 12C are diagrams showing spherical aberration, astigmatism, distortion, and chromatic aberration of magnification of the zoom lens according to the first embodiment in the state in which the zoom lens is focused on an object point at infinity respectively at the wide angle end (FIG. 12A), in the intermediate state (FIG. 12B), and the telephoto end (FIG. 12C)
Figure 12B:
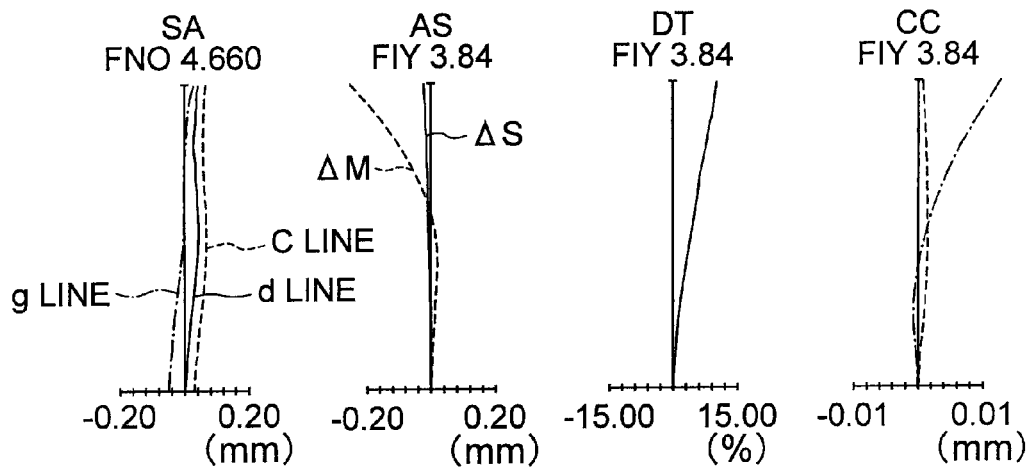
Figure 12C:
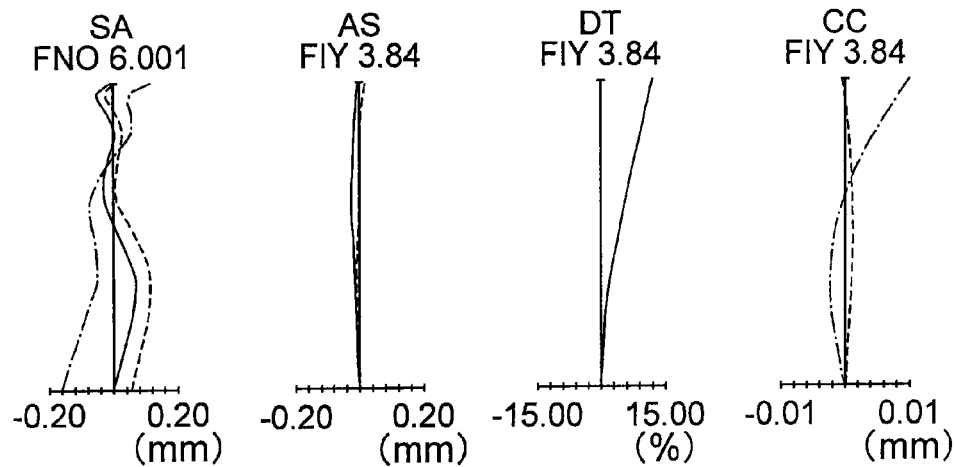
Figure 13A:
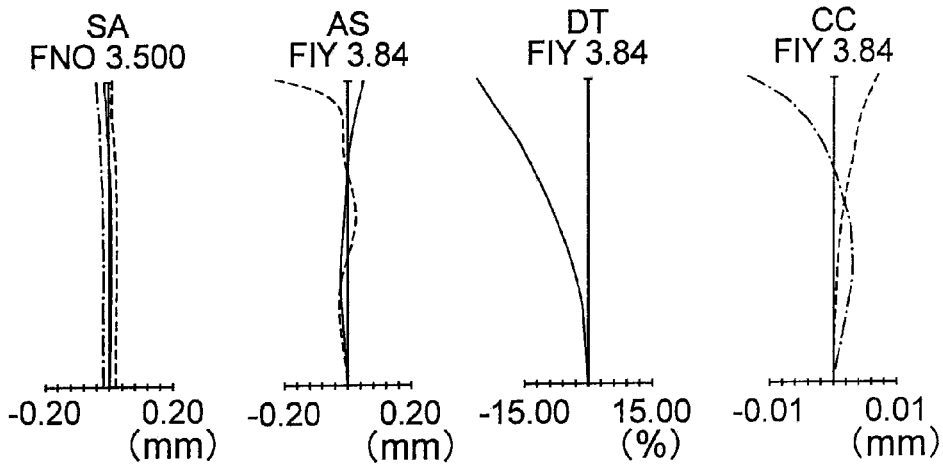
FIGS. 13A, 13B, and 13C are diagrams similar to FIGS. 12A, 12B, and 12C showing aberrations of the zoom lens according to the second embodiment in the state in which the zoom lens is focused on an object point at infinity.
Figure 13B:
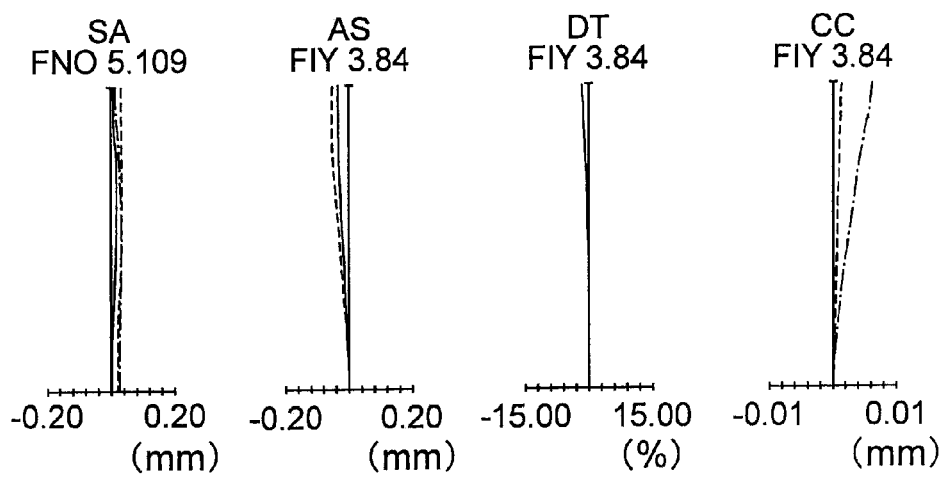
Figure 13C:
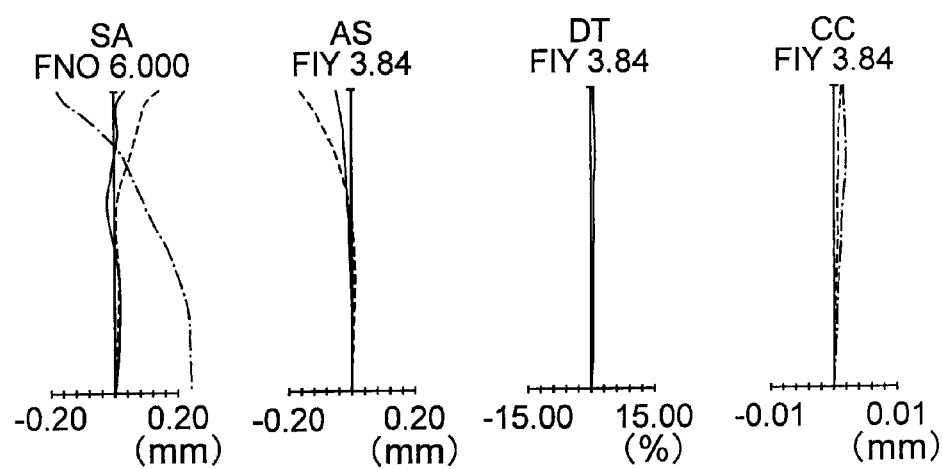
Figure 14A:
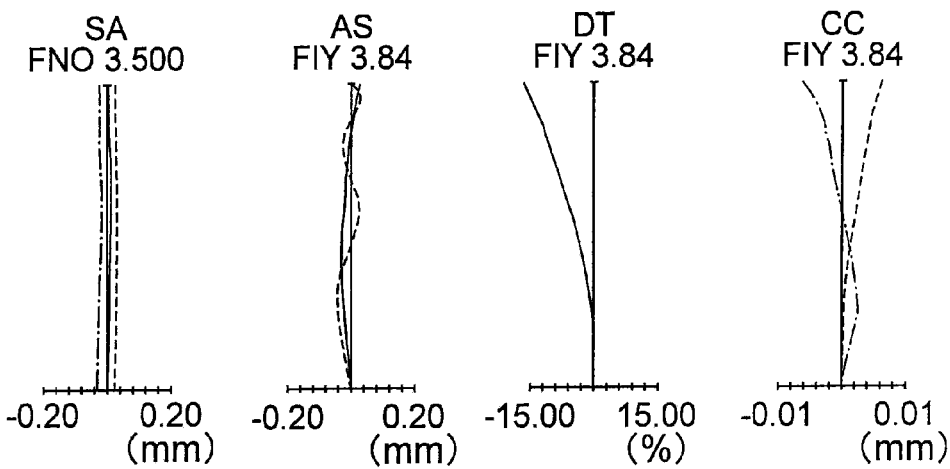
FIGS. 14A, 14B, and 14C are diagrams similar to FIGS. 12A, 12B, and 12C showing aberrations of the zoom lens according to the third embodiment in the state in which the zoom lens is focused on an object point at infinity.
Figure 14B:
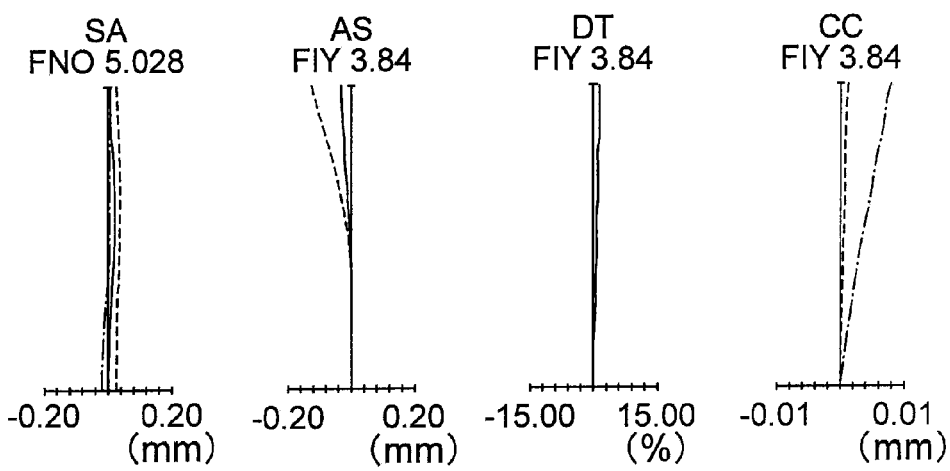
Figure 14C:
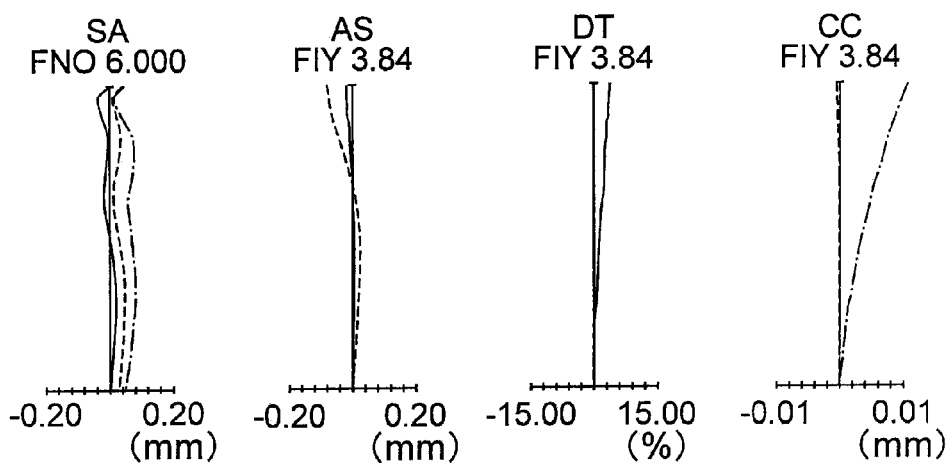
Figure 15A:
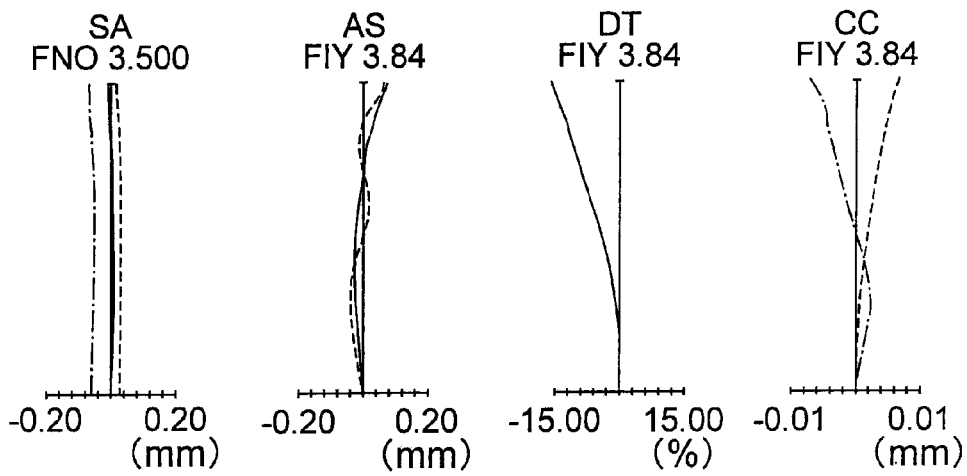
FIGS. 15A, 15B, and 15C are diagrams similar to FIGS. 12A, 12B, and 12C showing aberrations of the zoom lens according to the fourth embodiment in the state in which the zoom lens is focused on an object point at infinity.
Figure 15B:
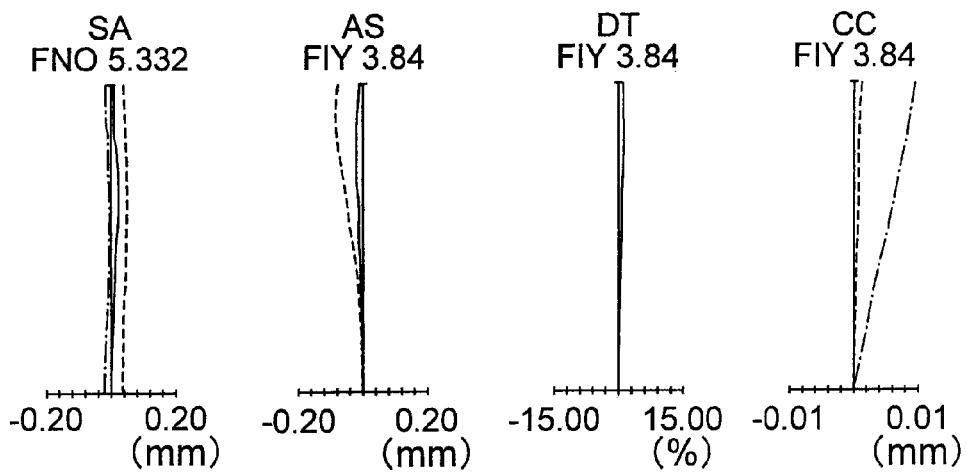
Figure 15C:
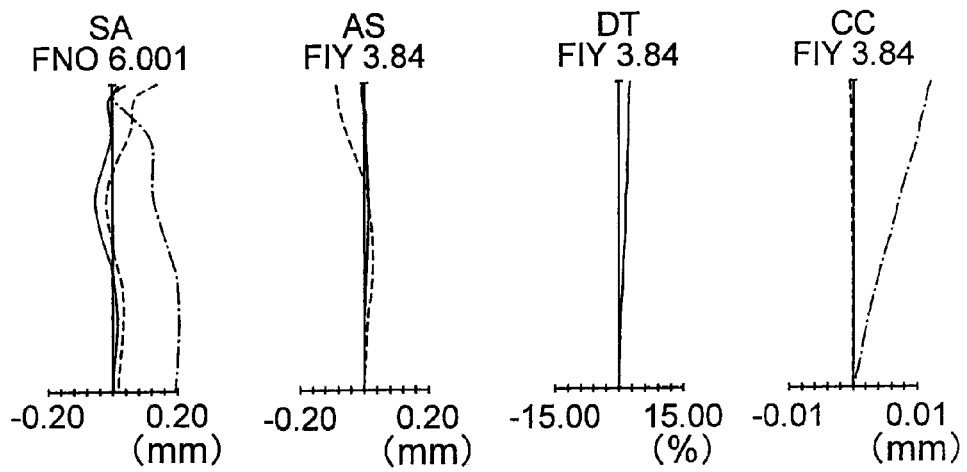
Figure 16A:
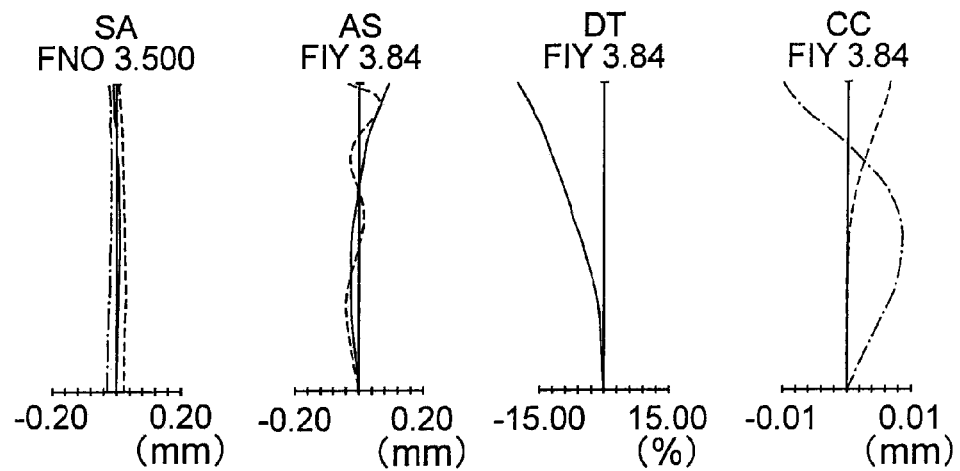
FIGS. 16A, 16B, and 16C are diagrams similar to FIGS. 12A, 12B, and 12C showing aberrations of the zoom lens according to the fifth embodiment in the state in which the zoom lens is focused on an object point at infinity.
Figure 16B:
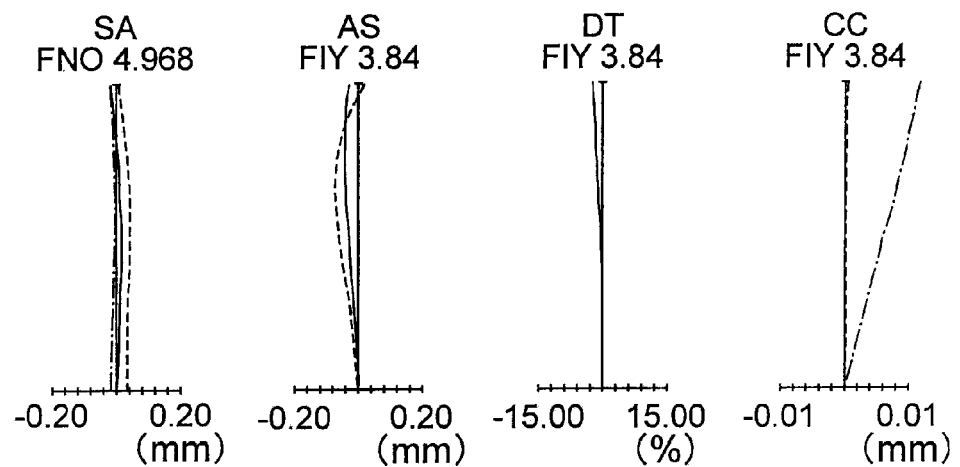
Figure 16C:
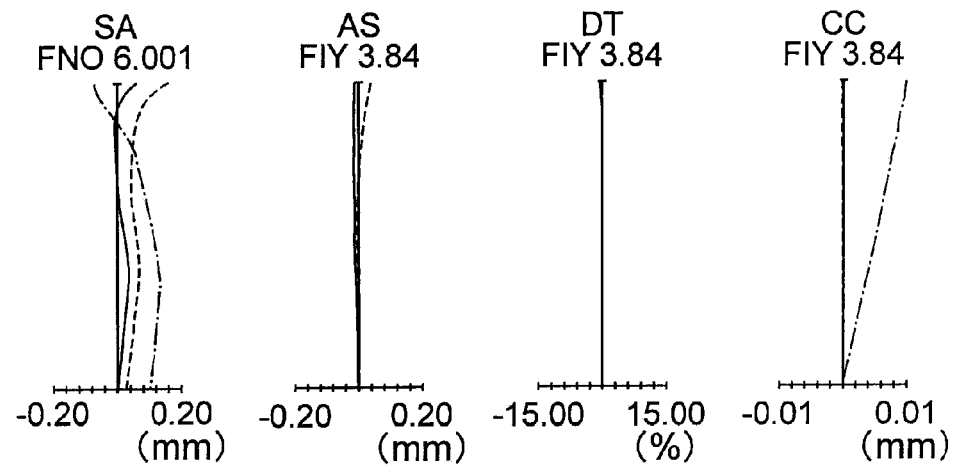
Figure 17A:
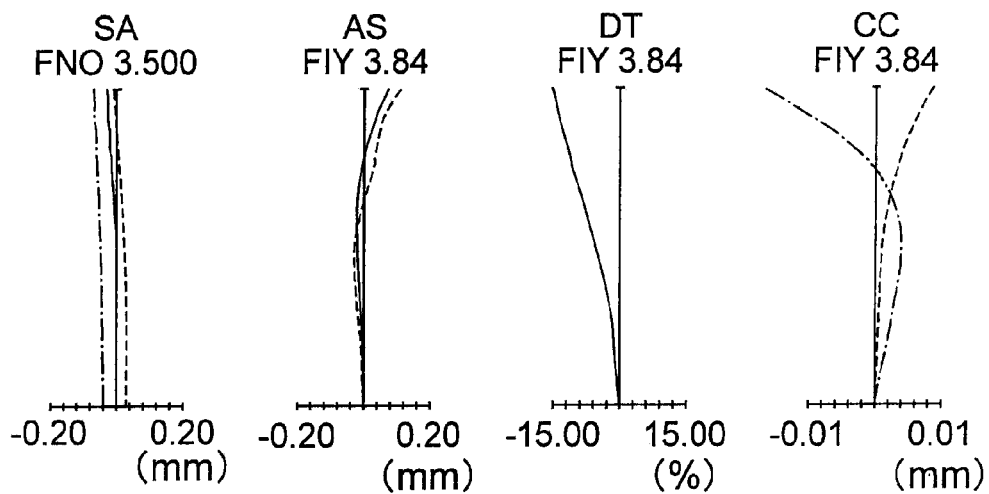
FIGS. 17A, 17B, and 17C are diagrams similar to FIGS. 12A, 12B, and 12C showing aberrations of the zoom lens according to the sixth embodiment in the state in which the zoom lens is focused on an object point at infinity.
Figure 17B:
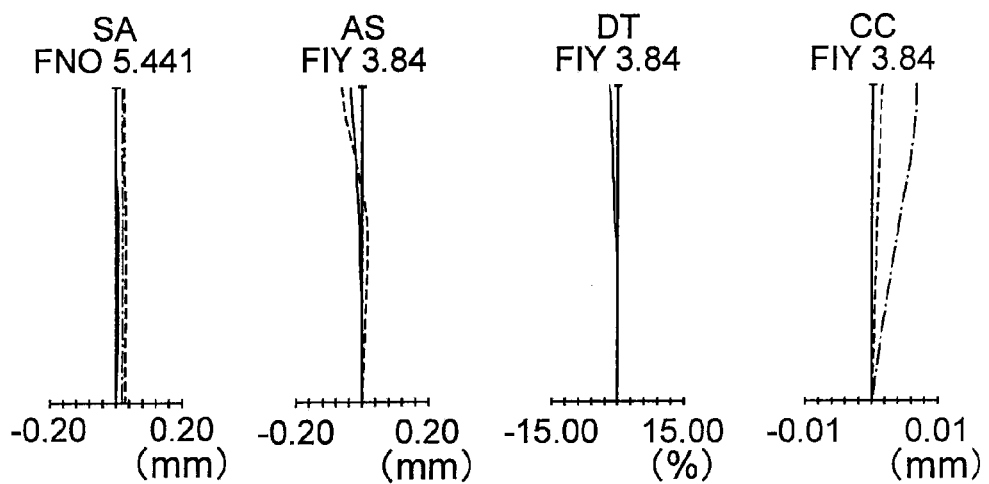
Figure 17C:
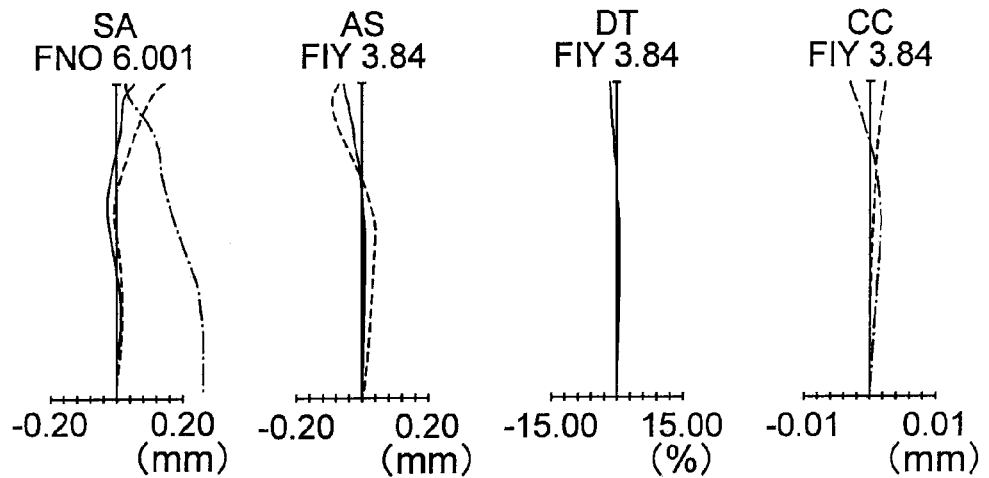
Figure 18A:
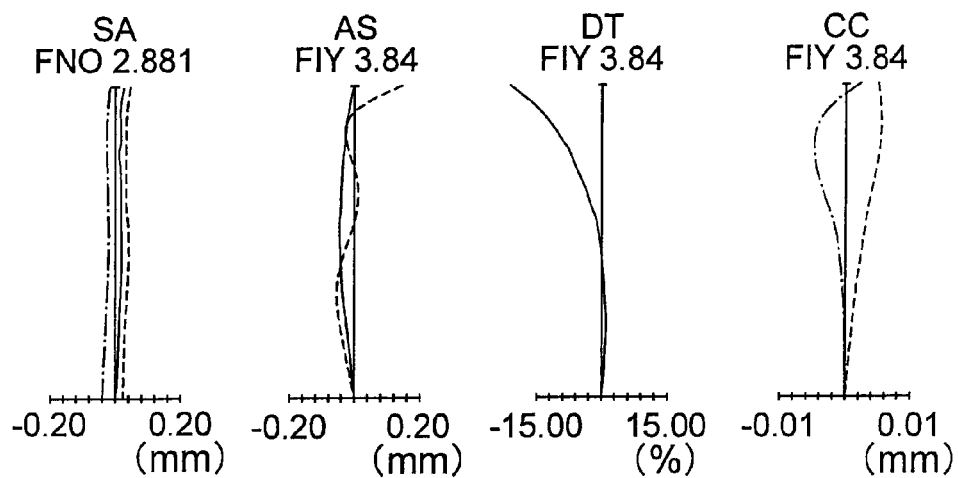
FIGS. 18A, 18B, and 18C are diagrams similar to FIGS. 12A, 12B, and 12C showing aberrations of the zoom lens according to the seventh embodiment in the state in which the zoom lens is focused on an object point at infinity.
Figure 18B:
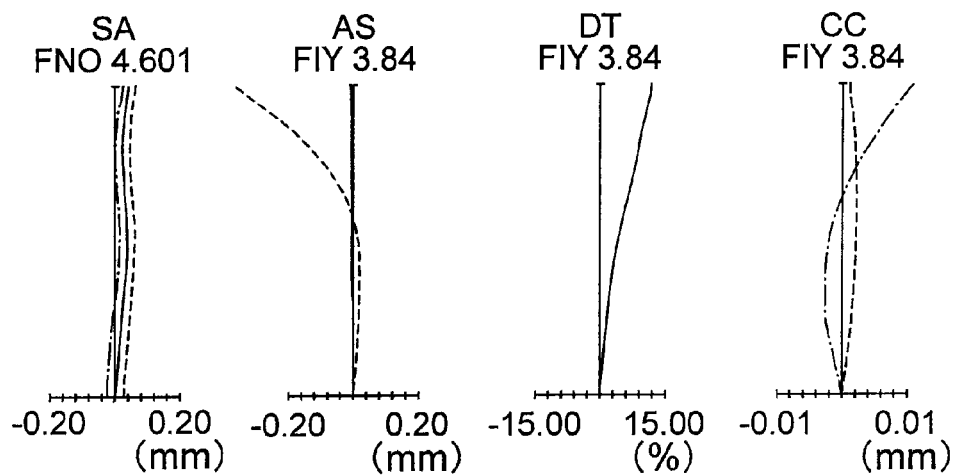
Figure 18C:
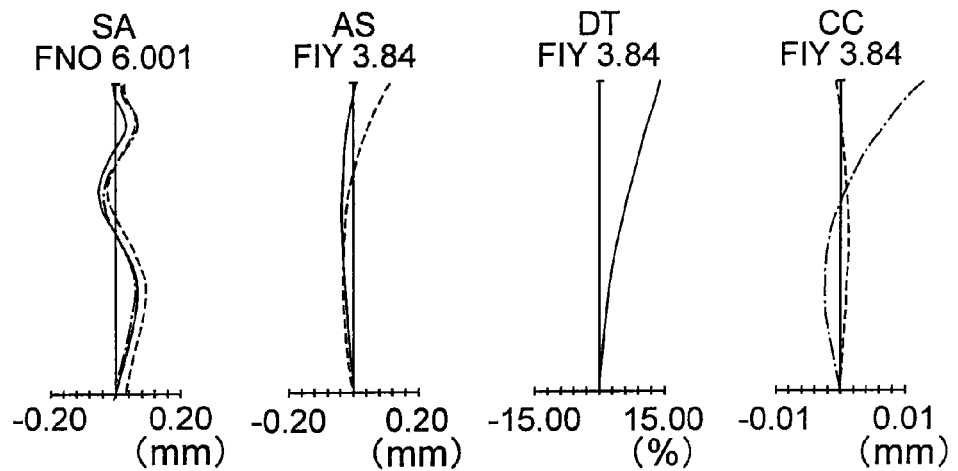
Figure 19A:
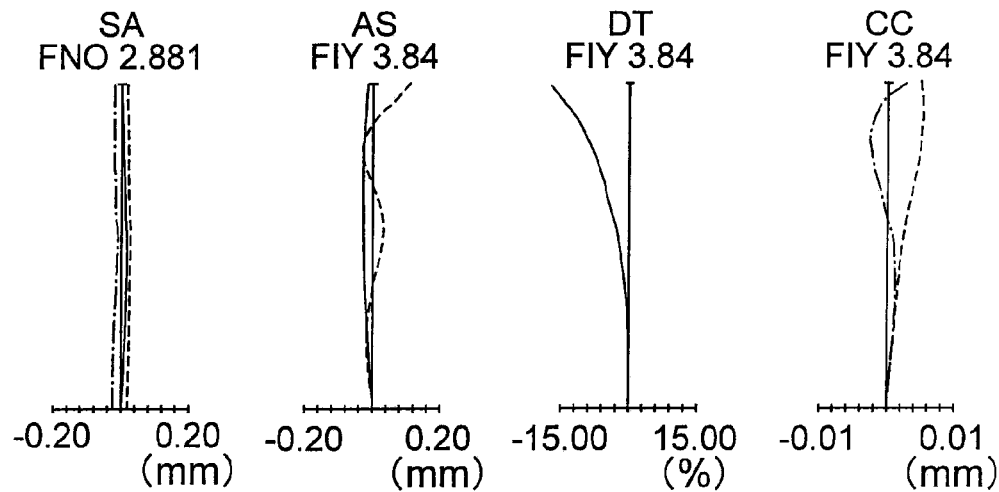
FIGS. 19A, 19B, and 19C are diagrams similar to FIGS. 12A, 12B, and 12C showing aberrations of the zoom lens according to the eighth embodiment in the state in which the zoom lens is focused on an object point at infinity.
Figure 19B:
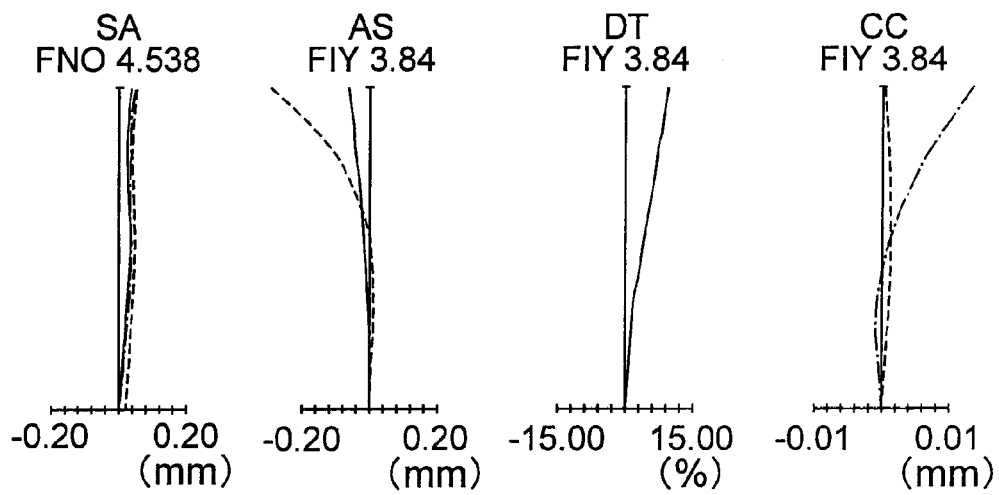
Figure 19C:
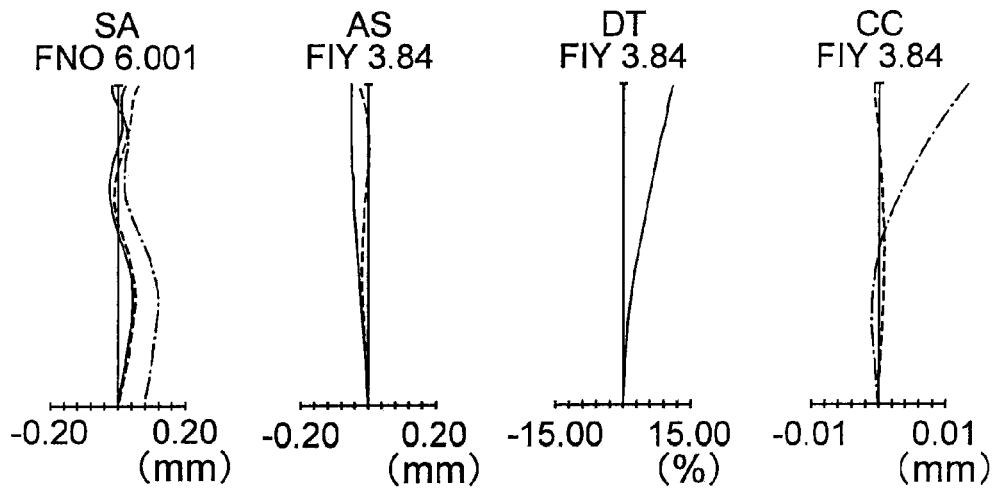
Figure 20A:
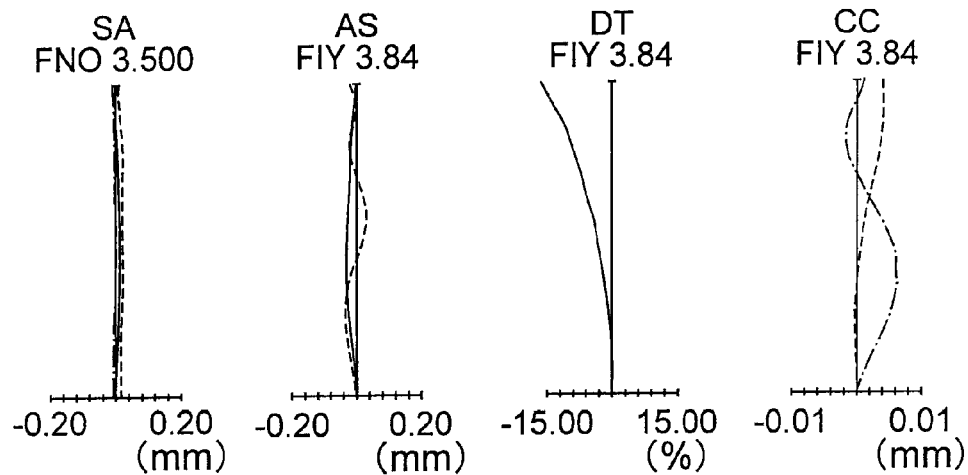
FIGS. 20A, 20B, and 20C are diagrams similar to FIGS. 12A, 12B, and 12C showing aberrations of the zoom lens according to the ninth embodiment in the state in which the zoom lens is focused on an object point at infinity.
Figure 20B:
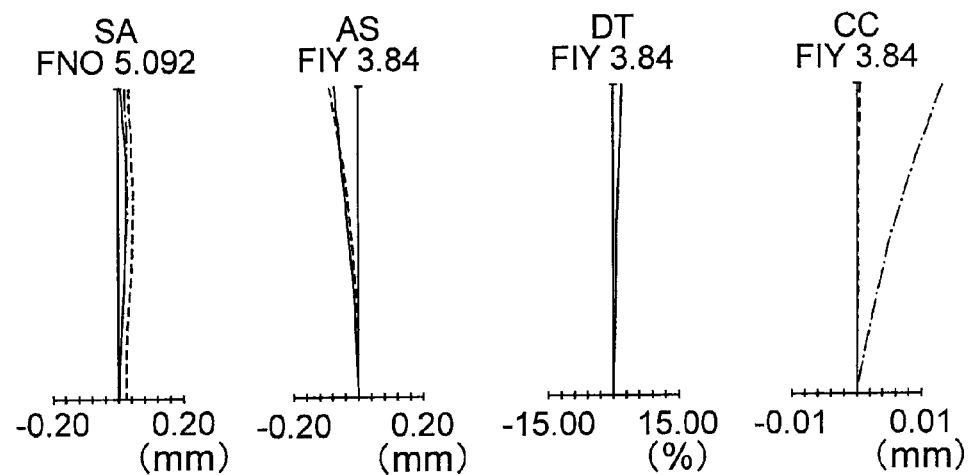
Figure 20C:
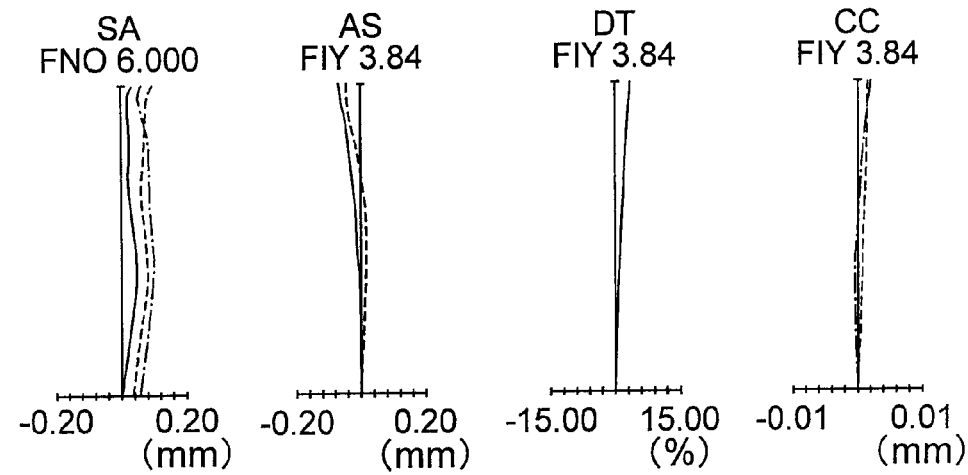
Figure 21A:
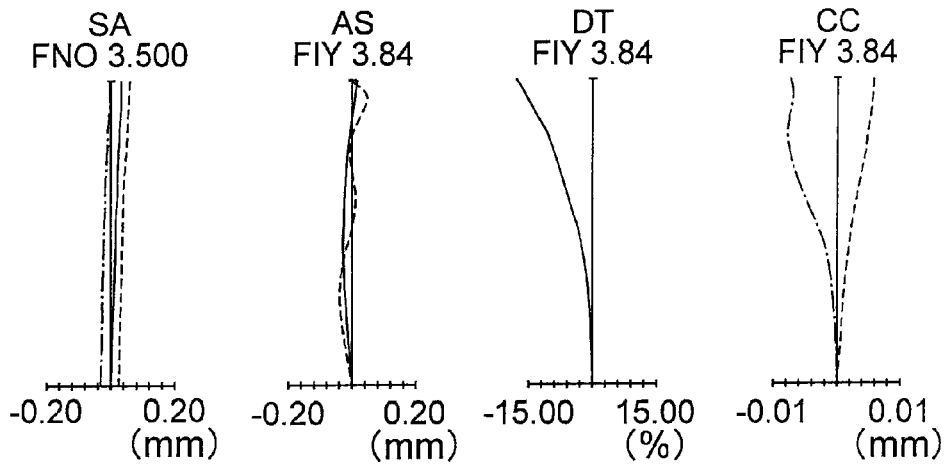
FIGS. 21A, 21B, and 21C are diagrams similar to FIGS. 12A, 12B, and 12C showing aberrations of the zoom lens according to the tenth embodiment in the state in which the zoom lens is focused on an object point at infinity.
Figure 21B:
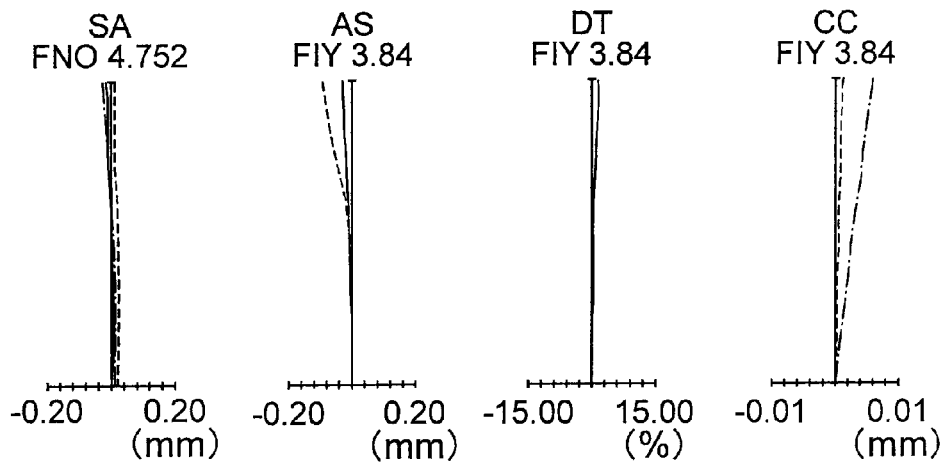
Figure 21C:
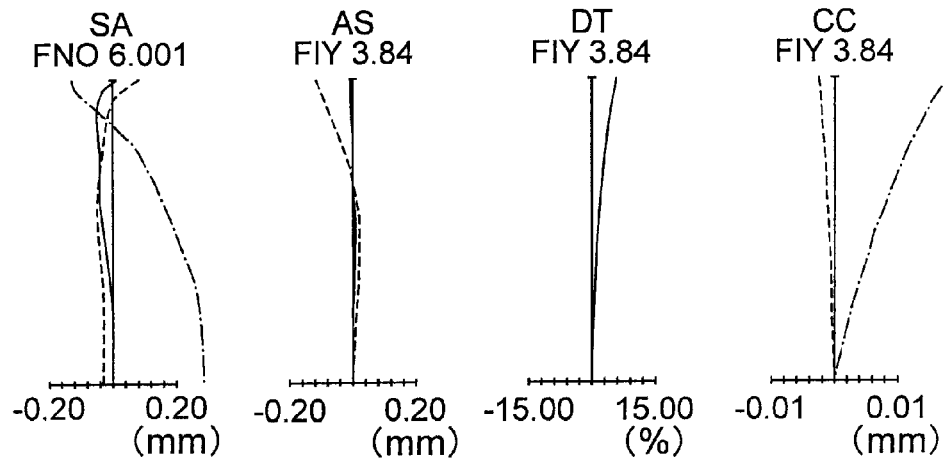
Figure 22A:
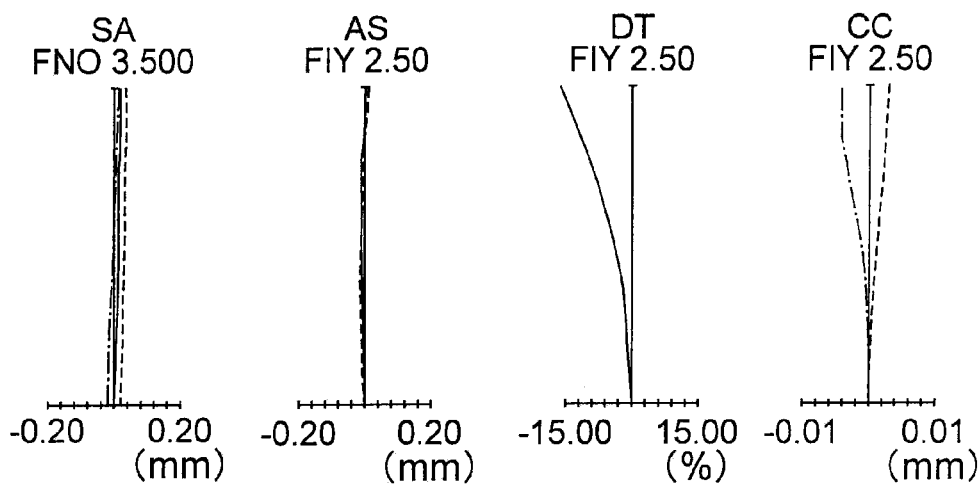
FIGS. 22A, 22B, and 22C are diagrams similar to FIGS. 12A, 12B, and 12C showing aberrations of the zoom lens according to the eleventh embodiment in the state in which the zoom lens is focused on an object point at infinity.
Figure 22B:
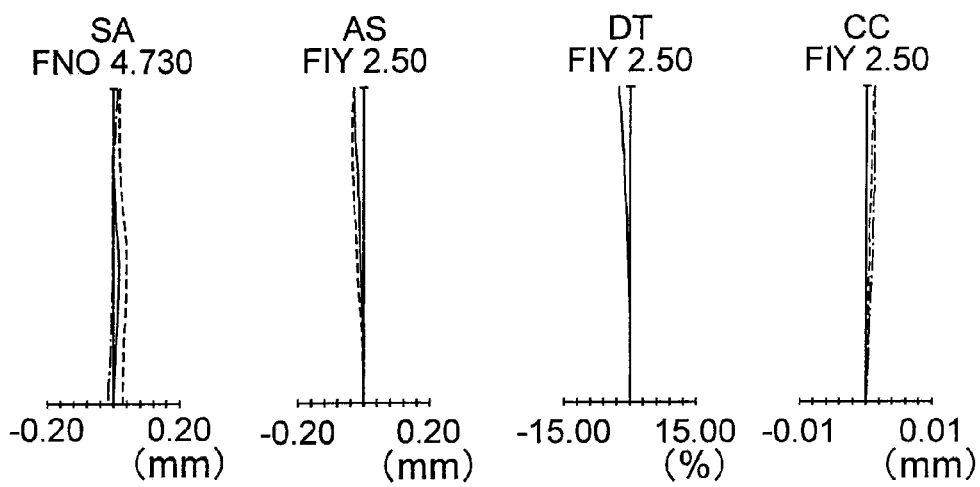
Figure 22C:
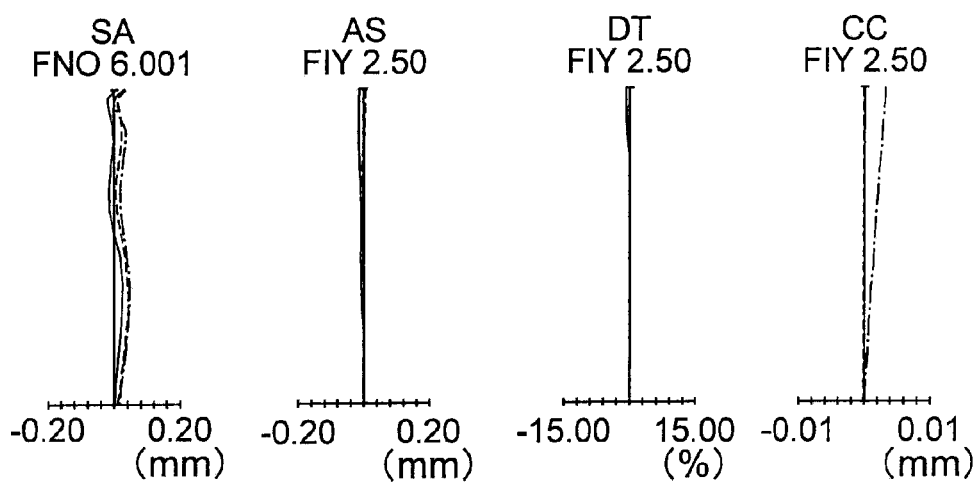

As shown in FIGS. 11A, 11B, and 11C, the zoom lens according to the eleventh embodiment includes, in order from the object side thereof, a first lens unit G1 having a negative refracting power, an aperture stop S, and a second lens unit G2 having a positive refracting power.

The first lens unit G1 is composed of a biconcave negative lens and a positive meniscus lens having a convex surface directed toward the object side. The second lens unit G2 is composed of a biconvex positive lens, a cemented lens made up of a biconvex positive lens and a biconcave negative lens, and a biconvex positive lens. All the lens elements in each lens unit G1, G2 are arranged in the mentioned order from the object side.

The following ten lens surfaces are aspheric surfaces: both surfaces of the biconcave negative lens in the first lens unit G1, both surfaces of the positive meniscus lens in the first lens unit G1, both surfaces of the biconvex positive lens located closest to the object side in the second lens unit G2, the object side surface of the biconvex positive lens located second closest to the object side in the second lens unit G2, the image side surface of the biconcave negative lens in the second lens unit G2, and both surfaces of the biconvex positive lens located closest to the image side in the second lens unit G2.

Numerical data of each embodiment described above is shown below. Apart from symbols described above, f denotes a focal length of the entire zoom lens system, $F_{NO}$ denotes an F number, ω denotes a half image angle, WE denotes a wide angle end, ST denotes an intermediate state, TE denotes a telephoto end, each of r1, r2, . . . denotes radius of curvature of each lens surface, each of d1, d2, . . . denotes a distance between two lenses, each of nd1, nd2, . . . denotes a refractive index of each lens for a d-line, and each of vd1, vd2, . . . denotes an Abbe's number for each lens.

The overall length of the lens system which will be described later is a length which is obtained by adding the back focus to a distance from the first lens surface up to the last lens surface. BF (back focus) is a unit which is expressed upon air conversion of a distance from the last lens surface up to a paraxial image plane.

When Z is let to be an optical axis with a direction of traveling of light as a positive (direction), and Y is let to be in a direction orthogonal to the optical axis, a shape of the aspheric surface is described by the following expression.

$$Z=(Y^2/r)/[1+\{1-(K+1)(Y/r)^2\}^{1/2}]+A_4Y^4+A_6Y^6+A_8Y^8+A_{10}Y^{10}+A_{12}Y^{12}$$

where, r denotes a paraxial radius of curvature, K denotes a conical coefficient, A4, A6, A8, A10, and $A_{12}$ denote aspherical surface coefficients of a fourth order, a sixth order, an eight order, a tenth order, and a twelfth order respectively. Moreover, in the aspherical surface coefficients, 'e-n' (where, n is an integral number) indicates '$10^{-n}$'.

Further, "*" means that the surface is an aspheric surface, and "S" means that the surface is an aperture stop. The sign "ω" represents half angle of view. The sign "IH" represents image height.

Numerical Example 1 unit mm

Surface data

| Surface No. | r | d | nd | vd |
|---|---|---|---|---|
| Object plane | ∞ | ∞ | | |
| 1* | −33.000 | 0.70 | 1.88300 | 40.76 |
| 2* | 7.781 | 2.50 | | |
| 3* | 27.495 | 1.90 | 2.10220 | 16.80 |
| 4* | −416.858 | Variable | | |
| 5(S) | ∞ | 0.30 | | |
| 6* | 5.479 | 1.80 | 1.61881 | 63.85 |
| 7* | −28.056 | 0.30 | | |
| 8 | 7.138 | 1.75 | 1.57099 | 50.80 |
| 9 | −23.817 | 0.60 | 1.90366 | 31.32 |
| 10 | 4.123 | 0.80 | | |
| 11 | 9.992 | 1.10 | 1.53100 | 55.60 |
| 12 | 54.381 | Variable | | |
| 13 | −15.353 | 1.30 | 1.88300 | 40.76 |
| 14* | −7.372 | Variable | | |
| 15 | ∞ | 0.40 | 1.51633 | 64.14 |
| 16 | ∞ | 0.40 | | |
| 17 | ∞ | 0.40 | 1.51633 | 64.14 |
| 18 | ∞ | 0.36 | | |
| Image plane | ∞ | | | |

Aspherical coefficients

1st surface

K = 0.000
A4 = 9.99446e−05, A6 = −9.63628e−07, A8 = 2.04237e−10

2nd surface

K = −3.135
A4 = 6.09572e−05, A6 = 8.29447e−06, A8 = −1.60404e−07,
A10 = 7.16869e−10

3rd surface

K = 0.000
A4 = −6.39964e−04, A6 = 8.67632e−06, A8 = −6.03020e−08

4th surface

K = 0.000
A4 = −4.71619e−04, A6 = 5.19991e−06, A8 = −4.06136e−08

6th surface

K = 0.084
A4 = −6.35142e−04, A6 = 6.90448e−05, A8 = −1.20381e−05,
A10 = 7.54600e−07

7th surface

K = 0.000
A4 = 1.97786e−04, A6 = 7.07487e−05, A8 = −1.13387e−05,
A10 = 8.32015e−07

14th surface

K = 0.000
A4 = 1.15151e−03, A6 = −1.30691e−05, A8 = 2.68138e−07

Zoom data

| | WE | ST | TE |
|---|---|---|---|
| IH | 3.84 | 3.84 | 3.84 |
| focal length | 3.74 | 9.80 | 21.56 |
| Fno. | 2.88 | 4.66 | 6.00 |
| 2ω(°) | 105.03 | 39.26 | 18.08 |
| BF | 4.97 | 4.47 | 3.88 |
| total length | 41.73 | 34.42 | 42.73 |
| d4 | 21.65 | 6.69 | 1.50 |

-continued

| unit mm | | | |
|---|---|---|---|
| d12 | 2.06 | 10.21 | 24.30 |
| d14 | 3.68 | 3.19 | 2.59 |

Unit focal length

| f1 = −12.06 | f2 = 10.93 | f3 = 14.92 |
|---|---|---|

Numerical Example 2 unit mm

Surface data

| Surface No. | r | d | nd | vd |
|---|---|---|---|---|
| Object plane | ∞ | ∞ | | |
| 1* | −29.340 | 0.70 | 1.85135 | 40.10 |
| 2* | 6.777 | 1.52 | | |
| 3* | 10.860 | 2.00 | 2.00170 | 20.60 |
| 4* | 30.132 | Variable | | |
| 5(S) | ∞ | 0.30 | | |
| 6* | 5.337 | 2.00 | 1.69839 | 56.54 |
| 7* | −16.575 | 0.10 | | |
| 8 | 12.761 | 1.75 | 1.83481 | 42.71 |
| 9 | −9.077 | 0.60 | 1.90366 | 31.32 |
| 10 | 3.726 | 0.60 | | |
| 11 | 6.026 | 1.10 | 1.49700 | 81.54 |
| 12 | 10.694 | Variable | | |
| 13 | 604.034 | 1.60 | 1.85135 | 40.10 |
| 14* | −15.867 | Variable | | |
| 15 | ∞ | 0.40 | 1.51633 | 64.14 |
| 16 | ∞ | 0.40 | | |
| 17 | ∞ | 0.40 | 1.51700 | 64.20 |
| 18 | ∞ | 0.36 | | |
| Image plane | ∞ | | | |

Aspherical coefficients

1st surface

K = 0.000
A4 = 4.68880e−04, A6 = −8.84965e−06, A8 = 6.14251e−08
2nd surface

K = −3.135
A4 = 1.34192e−03, A6 = 1.05982e−06, A8 = −5.74933e−07,
A10 = 8.39406e−09
3rd surface K = 0.000
A4 = −1.19540e−04
4th surface K = 0.000
A4 = −1.19553e−04, A6 = −1.03634e−06, A8 = −2.38329e−08
6th surface K = −0.438
A4 = −3.79081e−04, A6 = 3.77178e−05, A8 = −6.63306e−06,
A10 = 7.54600e−07
7th surface K = 0.000
A4 = 5.13385e−04, A6 = 2.51731e−05, A8 = −5.09002e−06,
A10 = 8.53420e−07

-continued unit mm

14th surface

K = 0.000
A4 = 1.92331e−04, A6 = −4.48192e−06, A8 = 4.05357e−08

Zoom data

| | WE | ST | TE |
|---|---|---|---|
| IH | 3.84 | 3.84 | 3.84 |
| focal length | 4.53 | 9.80 | 21.74 |
| Fno. | 3.50 | 5.11 | 6.00 |
| 2ω(°) | 98.06 | 43.38 | 19.91 |
| BF | 4.40 | 4.70 | 4.27 |
| total length | 35.23 | 30.34 | 38.23 |
| d4 | 16.55 | 6.10 | 1.50 |
| d12 | 2.00 | 7.26 | 20.18 |
| d14 | 3.11 | 3.42 | 2.99 |
| d18 | 0.36 | 0.36 | 0.36 |

Unit focal length

| f1 = −11.94 | f2 = 9.54 | f3 = 18.18 |
|---|---|---|

Numerical Example 3 unit mm

Surface data

| Surface No. | r | d | nd | vd |
|---|---|---|---|---|
| Object plane | ∞ | ∞ | | |
| 1* | −35.000 | 0.70 | 1.85135 | 40.10 |
| 2* | 6.838 | 1.80 | | |
| 3* | 10.926 | 2.00 | 2.00170 | 20.60 |
| 4* | 28.379 | Variable | | |
| 5(S) | ∞ | 0.30 | | |
| 6* | 5.320 | 1.53 | 1.70656 | 52.36 |
| 7* | −30.201 | 0.10 | | |
| 8 | 10.800 | 1.75 | 1.77250 | 49.60 |
| 9 | −13.682 | 0.60 | 1.90366 | 31.32 |
| 10 | 3.889 | 0.60 | | |
| 11 | 9.527 | 1.10 | 1.49700 | 81.54 |
| 12 | 57.115 | Variable | | |
| 13 | 73.671 | 1.40 | 1.85135 | 40.10 |
| 14* | −23.751 | Variable | | |
| 15 | ∞ | 0.40 | 1.51633 | 64.14 |
| 16 | ∞ | 0.40 | | |
| 17 | ∞ | 0.40 | 1.51700 | 64.20 |
| 18 | ∞ | 0.36 | | |
| Image plane | ∞ | | | |

Aspherical coefficients

1st surface

K = 0.000
A4 = 4.01305e−04, A6 = −5.00245e−06, A8 = 2.08702e−08
2nd surface

K = −3.135
A4 = 6.81679e−04, A6 = 1.92654e−05, A8 = −4.90041e−07,
A10 = 2.88794e−09
3rd surface K = 0.000
A4 = −5.84207e−04, A6 = 2.05468e−05, A8 = −2.38179e−07
4th surface K = 0.000
A4 = −3.27069e−04, A6 = 1.33908e−05, A8 = −2.09187e−07

-continued unit mm

6th surface

K = −0.160
A4 = −5.55522e−04, A6 = 3.64091e−05, A8 = −8.52940e−06,
A10 = 7.54600e−07
7th surface K = 0.000
A4 = 1.67778e−04, A6 = 3.09282e−05, A8 = −6.80590e−06,
A10 = 7.52751e−07
14th surface K = 0.000
A4 = 3.64817e−04, A6 = −1.11486e−05, A8 = 1.98493e−07

Zoom data

|  | WE | ST | TE |
|---|---|---|---|
| IH | 3.84 | 3.84 | 3.84 |
| focal length | 4.49 | 9.80 | 21.56 |
| Fno. | 3.50 | 5.03 | 6.00 |
| 2ω(°) | 91.57 | 42.35 | 19.50 |
| BF | 4.78 | 4.92 | 3.87 |
| total length | 38.12 | 31.58 | 38.23 |
| d4 | 18.90 | 6.72 | 1.50 |
| d12 | 2.56 | 8.06 | 20.97 |
| d14 | 3.49 | 3.63 | 2.59 |

Unit focal length

| f1 = −12.66 | f2 = 10.32 | f3 = 21.24 |
|---|---|---|

Numerical Example 4 unit mm

Surface data

| Surface No. | r | d | nd | νd |
|---|---|---|---|---|
| Object plane | ∞ | ∞ |  |  |
| 1* | −38.664 | 0.70 | 1.85135 | 40.10 |
| 2* | 6.310 | 1.80 |  |  |
| 3* | 8.901 | 2.00 | 2.00170 | 20.60 |
| 4* | 16.647 | Variable |  |  |
| 5(S) | ∞ | 0.30 |  |  |
| 6* | 5.217 | 2.00 | 1.76802 | 49.24 |
| 7* | −16.728 | 0.10 |  |  |
| 8 | 13.257 | 1.75 | 1.75500 | 52.32 |
| 9 | −6.940 | 0.60 | 1.90366 | 31.32 |
| 10 | 3.652 | 0.60 |  |  |
| 11 | 7.522 | 1.10 | 1.49700 | 81.54 |
| 12 | 17.611 | Variable |  |  |
| 13 | 73.671 | 1.60 | 1.85135 | 40.10 |
| 14* | −17.850 | Variable |  |  |
| 15 | ∞ | 0.40 | 1.51633 | 64.14 |
| 16 | ∞ | 0.40 |  |  |
| 17 | ∞ | 0.40 | 1.51700 | 64.20 |
| 18 | ∞ | 0.36 |  |  |
| Image plane | ∞ |  |  |  |

Aspherical coefficients

1st surface

K = 0.000
A4 = 7.72121e−04, A6 = −1.32903e−05, A8 = 8.19472e−08
2nd surface

K = −3.135
A4 = 1.31070e−03, A6 = 2.72921e−05, A8 = −5.31690e−07,
A10 = −6.96475e−10
3rd surface K = 0.000
A4 = −7.72827e−04, A6 = 1.65807e−05, A8 = −7.50695e−08

-continued unit mm

4th surface

K = 0.000
A4 = −5.00670e−04, A6 = 7.07748e−06, A8 = −5.62963e−08
6th surface

K = −0.145
A4 = −6.47506e−04, A6 = 3.59886e−05, A8 = −7.47112e−06,
A10 = 7.54600e−07
7th surface K = 0.000
A4 = 4.73085e−04, A6 = 2.94405e−05, A8 = −5.48603e−06,
A10 = 8.25074e−07
14th surface K = 0.000
A4 = 2.95904e−04, A6 = −9.31694e−06, A8 = 1.43807e−07

Zoom data

|  | WE | ST | TE |
|---|---|---|---|
| IH | 3.84 | 3.84 | 3.84 |
| focal length | 4.49 | 9.80 | 21.56 |
| Fno. | 3.50 | 5.33 | 6.00 |
| 2ω(°) | 91.08 | 42.49 | 19.78 |
| BF | 4.42 | 4.33 | 3.87 |
| total length | 32.27 | 29.59 | 38.23 |
| d4 | 13.98 | 5.39 | 1.50 |
| d12 | 1.31 | 7.33 | 20.31 |
| d14 | 3.13 | 3.04 | 2.58 |

Unit focal length

| f1 = −10.97 | f2 = 8.93 | f3 = 17.01 |
|---|---|---|

Numerical Example 5 unit mm

Surface data

| Surface No. | r | d | nd | νd |
|---|---|---|---|---|
| Object plane | ∞ | ∞ |  |  |
| 1* | −33.169 | 0.70 | 1.85135 | 40.10 |
| 2* | 6.380 | 1.80 |  |  |
| 3 | 11.481 | 1.90 | 2.00170 | 20.60 |
| 4 | 36.652 | Variable |  |  |
| 5(S) | ∞ | 0.30 |  |  |
| 6* | 5.519 | 2.00 | 1.76802 | 49.24 |
| 7* | −387.323 | 0.10 |  |  |
| 8 | 6.944 | 1.75 | 1.65838 | 59.27 |
| 9 | −8.000 | 0.60 | 1.90366 | 31.32 |
| 10 | 3.722 | 0.60 |  |  |
| 11* | 6.018 | 1.10 | 1.54975 | 48.94 |
| 12 | 15.865 | Variable |  |  |
| 13 | 50.000 | 1.80 | 1.85135 | 40.10 |
| 14 | −30.573 | Variable |  |  |
| 15 | ∞ | 0.40 | 1.51633 | 64.14 |
| 16 | ∞ | 0.40 |  |  |

-continued

| unit mm | | | | |
|---|---|---|---|---|
| 17 | ∞ | 0.40 | 1.51700 | 64.20 |
| 18 | ∞ | 0.36 | | |
| Image plane | ∞ | | | |

Aspherical coefficients

1st surface

K = 0.000
A4 = 4.65723e−04, A6 = −6.75729e−06, A8 = 3.00586e−08
2nd surface

K = −3.135
A4 = 1.50232e−03, A6 = −4.04704e−06, A8 = −3.75924e−07,
A10 = 2.65200e−09
6th surface K = −0.152
A4 = −2.70882e−04, A6 = 3.16426e−05, A8 = −5.34649e−06,
A10 = 7.54600e−07
7th surface K = 0.000
A4 = −2.97122e−04, A6 = 4.73560e−05, A8 = −4.89964e−06,
A10 = 1.14175e−06
11th surface K = 0.000
A4 = −1.68514e−03, A6 = 3.50142e−05, A8 = 5.59533e−06

Zoom data

| | WE | ST | TE |
|---|---|---|---|
| IH | 3.84 | 3.84 | 3.84 |
| focal length | 4.49 | 9.90 | 21.56 |
| Fno. | 3.50 | 4.97 | 6.00 |
| 2ω(°) | 93.93 | 43.43 | 20.25 |
| BF | 4.07 | 5.59 | 4.27 |
| total length | 37.23 | 30.42 | 38.23 |
| d4 | 18.08 | 5.87 | 1.50 |
| d12 | 2.43 | 6.31 | 19.81 |
| d14 | 2.78 | 4.30 | 2.98 |

Unit focal length

| f1 = −11.93 | f2 = 9.78 | f3 = 22.52 |
|---|---|---|

Numerical Example 6

| unit mm | | | | |
|---|---|---|---|---|
| Surface data | | | | |
| Surface No. | r | d | nd | vd |
| Object plane | ∞ | ∞ | | |
| 1* | −51.865 | 0.70 | 1.85135 | 40.10 |
| 2* | 6.577 | 1.80 | | |
| 3 | 9.480 | 2.00 | 2.00170 | 20.60 |
| 4 | 18.105 | Variable | | |
| 5(S) | ∞ | 0.30 | | |
| 6* | 5.349 | 2.00 | 1.76802 | 49.24 |
| 7* | −42.129 | 0.10 | | |
| 8 | 10.657 | 1.75 | 1.77250 | 49.60 |
| 9 | −5.835 | 0.60 | 1.90366 | 31.32 |
| 10 | 4.269 | 0.60 | | |
| 11* | 6.623 | 1.10 | 1.49700 | 81.54 |
| 12* | 9.614 | Variable | | |
| 13 | 73.671 | 1.40 | 1.85135 | 40.10 |
| 14* | −15.796 | Variable | | |
| 15 | ∞ | 0.40 | 1.51633 | 64.14 |

-continued

| unit mm | | | | |
|---|---|---|---|---|
| 16 | ∞ | 0.40 | | |
| 17 | ∞ | 0.40 | 1.51700 | 64.20 |
| 18 | ∞ | 0.36 | | |
| Image plane | ∞ | | | |

Aspherical coefficients

1st surface

K = 0.000
A4 = 3.67543e−04, A6 = −3.19659e−06, A8 = 5.23731e−09
2nd surface

K = −3.135
A4 = 1.59061e−03, A6 = −1.99516e−05, A8 = 8.78972e−07,
A10 = −1.57760e−08
6th surface K = −0.009
A4 = −3.60051e−04, A6 = 2.49613e−05, A8 = −6.08935e−06,
A10 = 7.54600e−07
7th surface K = 0.000
A4 = 1.86120e−04, A6 = 2.61785e−05, A8 = −4.67752e−06,
A10 = 1.01515e−06
11th surface K = 0.000
A4 = −1.32642e−03, A6 = −1.45230e−04
12th surface K = 0.000
A4 = 6.47255e−04, A6 = 6.74404e−06
14th surface K = 0.000
A4 = 2.04930e−04, A6 = −1.01224e−05, A8 = 1.83143e−07

Zoom data

| | WE | ST | TE |
|---|---|---|---|
| IH | 3.84 | 3.84 | 3.84 |
| focal length | 4.49 | 9.80 | 21.56 |
| Fno. | 3.50 | 5.44 | 6.00 |
| 2ω(°) | 90.46 | 43.49 | 20.48 |
| BF | 4.66 | 3.84 | 3.86 |
| total length | 33.16 | 30.43 | 38.23 |
| d4 | 14.92 | 6.16 | 1.50 |
| d12 | 1.23 | 8.08 | 20.52 |
| d14 | 3.37 | 2.55 | 2.57 |

Unit focal length

| f1 = −11.99 | f2 = 9.40 | f3 = 15.39 |
|---|---|---|

Numerical Example 7

| unit mm | | | | |
|---|---|---|---|---|
| Surface data | | | | |
| Surface No. | r | d | nd | vd |
| Object plane | ∞ | ∞ | | |
| 1* | −33.000 | 0.70 | 1.88300 | 40.76 |
| 2* | 7.848 | 2.50 | | |
| 3 | 29.120 | 1.90 | 2.10220 | 16.80 |
| 4 | −470.707 | Variable | | |
| 5(S) | ∞ | 0.30 | | |
| 6* | 5.630 | 1.80 | 1.61881 | 63.85 |

-continued unit mm

| | | | | |
|---|---|---|---|---|
| 7* | −21.128 | 0.30 | | |
| 8 | 8.079 | 1.75 | 1.57099 | 50.80 |
| 9 | −20.222 | 0.60 | 1.90366 | 31.32 |
| 10 | 4.574 | 0.80 | | |
| 11 | 11.672 | 1.10 | 1.53100 | 55.60 |
| 12 | 67.163 | Variable | | |
| 13 | −14.250 | 1.90 | 1.88300 | 40.76 |
| 14* | −7.372 | Variable | | |
| 15 | ∞ | 0.40 | 1.51633 | 64.14 |
| 16 | ∞ | 0.40 | | |
| 17 | ∞ | 0.40 | 1.51633 | 64.14 |
| 18 | ∞ | 0.36 | | |
| Image plane | ∞ | | | |

Aspherical coefficients

1st surface

K = 0.000
A4 = 9.99446e−05, A6 = −9.63628e−07, A8 = 2.04237e−10
2nd surface

K = −3.135
A4 = 2.99480e−04, A6 = 1.83296e−06, A8 = −1.23683e−07,
A10 = 8.63364e−10
6th surface K = 0.101
A4 = −7.08773e−04, A6 = 6.60492e−05, A8 = −1.29815e−05,
A10 = 7.54600e−07
7th surface K = 0.000
A4 = 1.81705e−04, A6 = 6.06427e−05, A8 = −1.15239e−05,
A10 = 7.82583e−07
14th surface K = 0.000
A4 = 1.16896e−03, A6 = −8.05662e−06, A8 = 2.21234e−07

Zoom data

| | WE | ST | TE |
|---|---|---|---|
| IH | 3.84 | 3.84 | 3.84 |
| focal length | 3.74 | 9.80 | 21.56 |
| Fno. | 2.88 | 4.60 | 6.00 |
| 2ω(°) | 105.14 | 38.55 | 17.77 |
| BF | 5.17 | 4.89 | 3.88 |
| total length | 41.73 | 34.50 | 42.73 |
| d4 | 21.16 | 6.32 | 1.50 |
| d12 | 1.75 | 9.65 | 23.70 |
| d14 | 3.88 | 3.60 | 2.59 |

Unit focal length

| f1 = −11.70 | f2 = 10.75 | f3 = 15.32 |
|---|---|---|

Numerical Example 8 unit mm

Surface data

| Surface No. | r | d | nd | vd |
|---|---|---|---|---|
| Object plane | ∞ | ∞ | | |
| 1* | −74.353 | 0.70 | 1.88300 | 40.76 |
| 2* | 6.930 | 2.50 | | |
| 3 | 14.744 | 1.90 | 2.10220 | 16.80 |
| 4 | 31.398 | Variable | | |
| 5(S) | ∞ | 0.30 | | |

-continued unit mm

| | | | | |
|---|---|---|---|---|
| 6* | 5.727 | 1.80 | 1.61881 | 63.85 |
| 7* | −22.820 | 0.30 | | |
| 8 | 8.051 | 1.75 | 1.57099 | 50.80 |
| 9 | −17.795 | 0.60 | 1.90366 | 31.32 |
| 10 | 4.701 | 0.80 | | |
| 11 | 15.493 | 1.10 | 1.53100 | 55.60 |
| 12 | −38.885 | Variable | | |
| 13 | −12.297 | 1.30 | 1.88300 | 40.76 |
| 14* | −6.969 | Variable | | |
| 15 | ∞ | 0.40 | 1.51633 | 64.14 |
| 16 | ∞ | 0.40 | | |
| 17 | ∞ | 0.40 | 1.51633 | 64.14 |
| 18 | ∞ | 0.36 | | |
| Image plane | ∞ | | | |

Aspherical coefficients

1st surface

K = 0.000
A4 = 9.99446e−05, A6 = −9.63628e−07, A8 = 2.04237e−10
2nd surface

K = −3.135
A4 = 7.80651e−04, A6 = −6.85124e−06, A8 = 2.07357e−08,
A10 = −3.80663e−10
6th surface K = 0.136
A4 = −7.37642e−04, A6 = 6.42851e−05, A8 = −1.15529e−05,
A10 = 7.54600e−07
7th surface K = 0.000
A4 = 6.91906e−05, A6 = 6.98701e−05, A8 = −1.11219e−05,
A10 = 8.38141e−07
14th surface K = 0.000
A4 = 1.10831e−03, A6 = −8.00999e−06, A8 = 1.76000e−07

Zoom data

| | WE | ST | TE |
|---|---|---|---|
| IH | 3.84 | 3.84 | 3.84 |
| focal length | 3.74 | 9.80 | 21.56 |
| Fno. | 2.88 | 4.54 | 6.00 |
| 2ω(°) | 102.62 | 39.46 | 18.26 |
| BF | 4.95 | 4.67 | 3.89 |
| total length | 41.73 | 34.38 | 42.73 |
| d4 | 21.24 | 6.40 | 1.50 |
| d12 | 2.49 | 10.25 | 24.29 |
| d14 | 3.66 | 3.39 | 2.60 |

Unit focal length

| f1 = −11.44 | f2 = 10.64 | f3 = 16.34 |
|---|---|---|

Numerical Example 9 unit mm

Surface data

| Surface No. | r | d | nd | vd |
|---|---|---|---|---|
| Object plane | ∞ | ∞ | | |
| 1* | −32.955 | 0.70 | 1.85135 | 40.10 |
| 2* | 6.700 | 1.68 | | |
| 3* | 10.187 | 2.00 | 2.00170 | 20.60 |
| 4* | 28.354 | Variable | | |

-continued unit mm

| | | | | |
|---|---|---|---|---|
| 5(S) | ∞ | 0.30 | | |
| 6* | 5.349 | 2.00 | 1.69839 | 56.54 |
| 7* | −20.502 | 0.10 | | |
| 8 | 10.179 | 1.75 | 1.83481 | 42.71 |
| 9 | −6.909 | 0.60 | 1.90366 | 31.32 |
| 10 | 3.436 | 0.60 | | |
| 11 | 4.386 | 1.10 | 1.49700 | 81.54 |
| 12 | 5.639 | Variable | | |
| 13 | 604.034 | 1.60 | 1.85135 | 40.10 |
| 14* | −15.867 | Variable | | |
| 15 | 32.429 | 1.20 | 1.51633 | 64.14 |
| 16 | −27.967 | 0.05 | | |
| 17 | ∞ | 0.40 | 1.51633 | 64.14 |
| 18 | ∞ | 0.40 | | |
| 19 | ∞ | 0.40 | 1.51700 | 64.20 |
| 20 | ∞ | 0.36 | | |
| Image plane | ∞ | | | |

Aspherical coefficients

1st surface $K = 0.000$
$A4 = 5.48695e-04, A6 = -8.28778e-06, A8 = 3.64347e-08$
2nd surface $K = -3.135$
$A4 = 1.05147e-03, A6 = 2.82178e-06, A8 = -3.13378e-07,$
$A10 = 2.41864e-09$
3rd surface $K = 0.000$
$A4 = -3.66588e-04$
4th surface $K = 0.000$
$A4 = -1.53752e-04, A6 = -1.82943e-06, A8 = -4.03432e-08$
6th surface $K = -0.268$
$A4 = -3.67676e-04, A6 = 3.58032e-05, A8 = -5.87865e-06,$
$A10 = 7.54600e-07$
7th surface $K = 0.000$
$A4 = 5.45277e-04, A6 = 1.54624e-05, A8 = -2.83367e-06,$
$A10 = 8.31427e-07$
14th surface $K = 0.000$
$A4 = 2.47487e-04, A6 = -4.26395e-06, A8 = 5.59056e-08$ Zoom data

| | WE | ST | TE |
|---|---|---|---|
| IH | 3.84 | 3.84 | 3.84 |
| focal length | 4.53 | 9.80 | 21.74 |
| Fno. | 3.50 | 5.09 | 6.00 |
| 2ω(°) | 91.08 | 42.02 | 19.39 |
| BF | 1.34 | 1.34 | 1.33 |
| total length | 36.94 | 31.03 | 39.73 |
| d4 | 17.86 | 6.30 | 1.50 |

-continued unit mm

| | | | |
|---|---|---|---|
| d12 | 1.59 | 6.48 | 20.27 |
| d14 | 2.51 | 3.28 | 2.99 |

Unit focal length

| | | | |
|---|---|---|---|
| f1 = −13.29 | f2 = 10.04 | f3 = 18.18 | f4 = 29.28 |

Numerical Example 10 unit mm

Surface data

| Surface No. | r | d | nd | vd |
|---|---|---|---|---|
| Object plane | ∞ | ∞ | | |
| 1* | −30.134 | 0.70 | 1.85135 | 40.10 |
| 2* | 6.700 | 1.52 | | |
| 3* | 10.000 | 2.00 | 2.00170 | 20.60 |
| 4* | 19.715 | Variable | | |
| 5(S) | ∞ | 0.30 | | |
| 6* | 5.585 | 2.00 | 1.69100 | 54.82 |
| 7* | −23.851 | 0.10 | | |
| 8 | 102.158 | 1.75 | 1.83481 | 42.71 |
| 9 | 26.425 | 0.60 | 1.90366 | 31.32 |
| 10 | 4.922 | 0.60 | | |
| 11* | 6.856 | 1.80 | 1.49700 | 81.54 |
| 12* | −16.833 | Variable | | |
| 13* | 20.501 | 0.86 | 1.49700 | 81.54 |
| 14* | 19.414 | Variable | | |
| 15 | ∞ | 0.40 | 1.51633 | 64.14 |
| 16 | ∞ | 0.40 | | |
| 17 | ∞ | 0.40 | 1.51700 | 64.20 |
| 18 | ∞ | 0.36 | | |
| Image plane | ∞ | | | |

Aspherical coefficients

1st surface $K = 0.000$
$A4 = 7.01525e-04, A6 = -1.05131e-05, A8 = 4.56206e-08$
2nd surface $K = -3.135$
$A4 = 1.40211e-03, A6 = 4.07568e-06, A8 = 5.95034e-08,$
$A10 = -8.04560e-09$
3rd surface $K = 0.000$
$A4 = -4.11128e-05$
4th surface $K = 0.000$
$A4 = 1.00636e-04, A6 = -6.39290e-06, A8 = -3.88316e-08$
6th surface $K = -0.503$
$A4 = -5.04468e-05, A6 = 3.99543e-05, A8 = -6.91907e-06,$
$A10 = 7.54600e-07$
7th surface $K = 0.000$
$A4 = 4.43178e-04, A6 = 3.59271e-05, A8 = -7.84938e-06,$
$A10 = 1.06221e-06$
11th surface $K = 0.000$
$A4 = -1.75199e-05, A6 = -1.50346e-05, A8 = 2.47379e-06$ -continued unit mm 12th surface K = 0.000
A4 = −2.30795e−05, A6 = 4.23380e−06, A8 = 6.32128e−07

13th surface

K = 0.000
A4 = 4.16931e−05, A6 = −3.12374e−06, A8 = 1.56048e−07

14th surface

K = 0.000
A4 = 1.01805e−03, A6 = −2.11784e−05, A8 = 1.32318e−06

Zoom data

|  | WE | ST | TE |
|---|---|---|---|
| IH | 3.84 | 3.84 | 3.84 |
| focal length | 4.53 | 9.80 | 21.74 |
| Fno. | 3.50 | 4.75 | 6.00 |
| 2ω(°) | 92.07 | 42.39 | 18.98 |
| BF | 5.52 | 6.62 | 4.28 |
| total length | 40.73 | 33.60 | 39.58 |
| d4 | 19.57 | 7.30 | 1.50 |
| d12 | 3.40 | 7.44 | 21.56 |
| d14 | 4.24 | 5.33 | 2.99 |

Unit focal length

| f1 = −10.35 | f2 = 10.06 | f3 = −1000.10 |
|---|---|---|

Example 11 unit mm

Surface data

| Surface No. | r | d | nd | νd |
|---|---|---|---|---|
| Object plane | ∞ | ∞ | | |
| 1* | −20.941 | 0.70 | 1.85135 | 40.10 |
| 2* | 6.700 | 1.52 | | |
| 3* | 13.067 | 2.00 | 2.00170 | 20.60 |
| 4* | 55.782 | Variable | | |
| 5(S) | ∞ | 0.30 | | |
| 6* | 5.409 | 2.00 | 1.65160 | 58.55 |
| 7* | −26.684 | 0.10 | | |
| 8* | 46.622 | 1.75 | 1.90200 | 25.10 |
| 9 | −25.074 | 0.60 | 1.90366 | 31.32 |
| 10* | 4.726 | 0.60 | | |
| 11* | 9.779 | 1.80 | 1.49700 | 81.54 |
| 12* | −9.725 | Variable | | |
| 13 | ∞ | 0.40 | 1.51633 | 64.14 |
| 14 | ∞ | 0.40 | | |
| 15 | ∞ | 0.40 | 1.51700 | 64.20 |
| 16 | ∞ | 0.36 | | |
| Image plane | ∞ | | | |

Aspherical coefficients

1st surface

K = 0.000
A4 = 3.96735e−04, A6 = −5.86402e−06, A8 = 2.68139e−08

2nd surface

K = −3.135
A4 = 1.06684e−03, A6 = 3.90797e−07, A8 = 1.06988e−07,
A10 = 5.40454e−09

-continued unit mm

3rd surface

K = 0.000
A4 = −4.60151e−04

4th surface

K = 0.000
A4 = −3.68226e−04, A6 = −5.80043e−06, A8 = −1.27680e−07

6th surface

K = −0.454
A4 = −1.98428e−05, A6 = 3.40216e−05, A8 = −5.53012e−06,
A10 = 7.54600e−07

7th surface

K = 0.000
A4 = 5.25522e−04, A6 = 3.55408e−05, A8 = −4.55674e−06,
A10 = 9.08474e−07

8th surface

K = 0.000
A4 = −6.15070e−05, A6 = 7.18222e−06, A8 = −8.35230e−07

10th surface

K = 0.000
A4 = 4.45145e−04, A6 = 1.61644e−05, A8 = 5.46733e−06

11th surface

K = 0.000
A4 = 1.64232e−04, A6 = 9.08926e−05, A8 = 5.96204e−06

12th surface

K = 0.000
A4 = −7.61266e−04, A6 = 3.76790e−05, A8 = −5.95767e−06

Zoom data

|  | WE | ST | TE |
|---|---|---|---|
| IH | 2.50 | 2.50 | 2.50 |
| focal length | 4.53 | 9.80 | 21.74 |
| Fno. | 3.50 | 4.73 | 6.00 |
| 2ω(°) | 66.71 | 29.32 | 13.17 |
| BF | 10.46 | 15.87 | 28.12 |
| total length | 42.73 | 34.96 | 40.99 |
| d4 | 20.89 | 7.71 | 1.50 |
| d12 | 9.17 | 14.58 | 26.83 |

Unit focal length

| f1 = −10.40 | f2 = 10.66 |
|---|---|

FIGS. 12A through 22C are aberration diagrams of the zoom lenses according to the first to eleventh embodiments in the state in which the zoom lenses are focused on an object point at infinity. These aberration diagrams show spherical aberration (SA), astigmatism (AS), distortion (DT), and chromatic aberration of magnification (CC) respectively at the wide angle end in FIGS. 1A, 2A, 3A, 4A, 5A, 6A, 7A, 8A, 9A, 10A, and 11A, in an intermediate focal length state in FIGS. 1B, 2B, 3B, 4B, 5B, 6B, 7B, 8B, 9B, 10B, and 11B, and at the telephoto end in FIGS. 1C, 2C, 3C, 4C, 5C, 6C, 7C, 8C, 9C, 10C, and 11C. The sign "FIY" in these diagrams represents image height.

In the twelfth to twenty-second embodiments, the zoom lenses according to the first to the eleventh embodiments are respectively used in image pickup apparatuses that have the function of electrically correcting distortion. In these image pickup apparatuses, the shape of the effective image pickup area is changed during zooming. For this reason, the image height and the angle of view at a zoom position in these embodiments are different from those in the respective corresponding embodiments. In the twelfth to the twenty-second embodiments, barrel distortion that appears at wide angle zoom positions is corrected electrically, and an image thus-corrected is recorded or displayed.

The zoom lens used in the twelfth embodiment is the same as the zoom lens according to the first embodiment.

The zoom lens used in the thirteenth embodiment is the same as the zoom lens according to the second embodiment.

The zoom lens used in the fourteenth embodiment is the same as the zoom lens according to the third embodiment.

The zoom lens used in the fifteenth embodiment is the same as the zoom lens according to the fourth embodiment.

The zoom lens used in the sixteenth embodiment is the same as the zoom lens according to the fifth embodiment.

The zoom lens used in the seventeenth embodiment is the same as the zoom lens according to the sixth embodiment.

The zoom lens used in the eighteenth embodiment is the same as the zoom lens according to the seventh embodiment.

The zoom lens used in the nineteenth embodiment is the same as the zoom lens according to the eighth embodiment.

The zoom lens used in the twentieth embodiment is the same as the zoom lens according to the ninth embodiment.

The zoom lens used in the twenty-first embodiment is the same as the zoom lens according to the tenth embodiment.

The zoom lens used in the twenty-second embodiment is the same as the zoom lens according to the eleventh embodiment.

In the zoom lenses according to each of the embodiments, barrel distortion occurs on the rectangular photoelectric conversion surface, at the wide angle end. Whereas, at the telephoto end and near the intermediate focal length state, distortion is suppressed.

To correct distortion electrically, the effective image pickup area is designed to have a barrel shape at the wide angle end and a rectangular shape near the intermediate focal length position and at the telephoto end. In addition, the effective image pickup area, which has been set in advance, is transformed into rectangular image information with reduced distortion by image transformation using image processing.

The maximum image height $IH_w$ at the wide angle end is designed to be smaller than the maximum image height $IH_s$ at the intermediate focal length state and the maximum image height $IH_t$ at the telephoto end.

In the twelfth to twenty-second embodiments, the effective image pickup area is designed in such a way that the effective image pickup area at the wide angle end has a dimension in the shorter side direction equal to the dimension in the shorter side direction of the photoelectric conversion surface, and a distortion of approximately −3% remains after image processing. As a matter of course, a barrel shaped area smaller than that described above may be set as the effective image pickup area, and image resulting from transformation of this area into a rectangular area may be recorded/reproduced.

Value of conditional expressions (1A) to (9A) in each of the embodiments are as shown below.

| | Example 1 | Example 2 | Example 3 | Example 4 |
|---|---|---|---|---|
| (1A) $(r_{11a} + r_{11b})/(r_{11a} - r_{11b})$ | 0.618 | 0.625 | 0.673 | 0.719 |
| (2A) $f_{11}/r_{11b}$ | −0.909 | −0.946 | −0.975 | −1.003 |
| (3A) $f_t/f_w$ | 5.765 | 4.804 | 4.804 | 4.804 |
| (4A) $AVE(n_{G1})$ | 1.993 | 1.927 | 1.927 | 1.927 |
| (5A) $vd_{12}$ | 16.8 | 20.6 | 20.6 | 20.6 |
| (6A) $f_1/r_{11b}$ | −1.550 | −1.763 | −1.851 | −1.739 |
| (7A) $enp(w)/r_{1b}$ | 0.936 | 1.033 | 1.097 | 1.030 |
| (8A) $f_{12}/f_{11}$ | −0.906 | −0.799 | −0.815 | −0.814 |

| | Example 5 | Example 6 | Example 7 | Example 8 |
|---|---|---|---|---|
| (1A) $(r_{11a} + r_{11b})/(r_{11a} - r_{11b})$ | 0.677 | 0.775 | 0.616 | 0.829 |
| (2A) $f_{11}/r_{11b}$ | −0.977 | −1.037 | −0.908 | −1.032 |
| (3A) $f_t/f_w$ | 4.804 | 4.804 | 5.765 | 5.765 |
| (4A) $AVE(n_{G1})$ | 1.927 | 1.927 | 1.993 | 1.993 |
| (5A) $vd_{12}$ | 20.6 | 20.6 | 16.8 | 16.8 |
| (6A) $f_1/r_{11b}$ | −1.870 | −1.823 | −1.490 | −1.651 |
| (7A) $enp(w)/r_{1b}$ | 1.097 | 1.064 | 0.913 | 1.068 |
| (8A) $f_{12}/f_{11}$ | −0.820 | −0.784 | −0.919 | −0.930 |

| | Example 9 | Example 10 | Example 11 |
|---|---|---|---|
| (1A) $(r_{11a} + r_{11b})/(r_{11a} - r_{11b})$ | 0.662 | 0.636 | 0.515 |
| (2A) $f_{11}/r_{11b}$ | −0.968 | −0.953 | −0.880 |
| (3A) $f_t/f_w$ | 4.804 | 4.803 | 4.803 |
| (4A) $AVE(n_{G1})$ | 1.927 | 1.927 | 1.927 |
| (5A) $vd_{12}$ | 20.6 | 20.6 | 20.6 |
| (6A) $f_1/r_{11b}$ | −1.984 | −1.545 | −1.552 |
| (7A) $enp(w)/r_{1b}$ | 1.119 | 1.048 | 1.009 |
| (8A) $f_{12}/f_{11}$ | −2.319 | −2.878 | −2.824 |

| | Example 12 | Example 13 | Example 14 | Example 15 |
|---|---|---|---|---|
| (1A) $(r_{11a} + r_{11b})/(r_{11a} - r_{11b})$ | 0.618 | 0.625 | 0.673 | 0.719 |
| (2A) $f_{11}/r_{11b}$ | −0.909 | −0.946 | −0.975 | −1.003 |
| (3A) $f_t/f_w$ | 5.765 | 4.804 | 4.804 | 4.804 |
| (4A) $AVE(n_{G1})$ | 1.993 | 1.927 | 1.927 | 1.927 |
| (5A) $vd_{12}$ | 16.8 | 20.6 | 20.6 | 20.6 |
| (6A) $f_1/r_{11b}$ | −1.550 | −1.763 | −1.851 | −1.739 |
| (7A) $enp(w)/r_{1b}$ | 0.936 | 1.033 | 1.097 | 1.030 |
| (8A) $f_{12}/f_{11}$ | −0.906 | −0.799 | −0.815 | −0.814 |
| Image height after distortion correction | 3.473 | 3.401 | 3.563 | 3.570 |
| Angle of view after distortion correction | 94.85 | 86.83 | 85.53 | 85.66 |

| | Example 16 | Example 17 | Example 18 | Example 19 |
|---|---|---|---|---|
| (1A) $(r_{11a} + r_{11b})/(r_{11a} - r_{11b})$ | 0.677 | 0.775 | 0.616 | 0.829 |
| (2A) $f_{11}/r_{11b}$ | −0.977 | −1.037 | −0.908 | −1.032 |
| (3A) $f_t/f_w$ | 4.804 | 4.804 | 5.765 | 5.765 |
| (4A) $AVE(n_{G1})$ | 1.927 | 1.927 | 1.993 | 1.993 |
| (5A) $vd_{12}$ | 20.6 | 20.6 | 16.8 | 16.8 |
| (6A) $f_1/r_{11b}$ | −1.870 | −1.823 | −1.490 | −1.651 |
| (7A) $enp(w)/r_{1b}$ | 1.097 | 1.064 | 0.913 | 1.068 |
| (8A) $f_{12}/f_{11}$ | −0.820 | −0.784 | −0.919 | −0.930 |
| Image height after distortion correction | 3.522 | 3.593 | 3.482 | 3.548 |
| Angle of view after distortion correction | 86.59 | 85.97 | 94.38 | 94.9 |

| | Example 20 | Example 21 | Example 22 |
|---|---|---|---|
| (1A) $(r_{11a} + r_{11b})/(r_{11a} - r_{11b})$ | 0.662 | 0.636 | 0.515 |
| (2A) $f_{11}/r_{11b}$ | −0.968 | −0.953 | −0.880 |
| (3A) $f_t/f_w$ | 4.804 | 4.803 | 4.803 |
| (4A) $AVE(n_{G1})$ | 1.927 | 1.927 | 1.927 |
| (5A) $vd_{12}$ | 20.6 | 20.6 | 20.6 |
| (6A) $f_1/r_{11b}$ | −1.984 | −1.545 | −1.552 |
| (7A) $enp(w)/r_{1b}$ | 1.119 | 1.048 | 1.009 |
| (8A) $f_{12}/f_{11}$ | −2.319 | −2.878 | −2.824 |
| Image height after distortion correction | 3.569 | 3.542 | 2.319 |
| Angle of view after distortion correction | 84.78 | 85.07 | 61.35 |

Value of conditional expressions (1B) to (13B) in each of the embodiments are as shown below.

|  |  | Example 1 | Example 2 | Example 3 | Example 4 | Example 5 |
|---|---|---|---|---|---|---|
| (1B) | $(r_{1a}+r_{1b})/(r_{1a}-r_{1b})$ | 0.62 | 0.62 | 0.67 | 0.72 | 0.68 |
| (2B) | $\Sigma 2_G/ih$ | 1.65 | 1.60 | 1.48 | 1.60 | 1.60 |
| (3B) | $\Delta 2_G/f_2$ | 1.93 | 1.89 | 1.70 | 2.06 | 1.80 |
| (4B) | $f_2/r_{3a}$ | 1.99 | 1.79 | 1.94 | 1.71 | 1.77 |
| (5B) | $f_2/L_3$ | 1.45 | 1.59 | 1.58 | 1.66 | 1.38 |
| (6B) | $L_6/L_3$ | 3.02 | 4.29 | 3.50 | 4.73 | 2.39 |
| (7B) | $AVE(n_{dg1})$ | 1.993 | 1.927 | 1.927 | 1.927 | 1.927 |
| (8B) | $P_2/P_3$ | 1.37 | 1.91 | 2.06 | 1.91 | 2.30 |
| (9B) | $\beta_2(t)/\beta_2(w)$ | 5.23 | 4.76 | 4.55 | 4.60 | 4.86 |
| (10B) | $\beta_3(t)/\beta_3(w)$ | 1.10 | 1.01 | 1.06 | 1.04 | 0.99 |
| (11B) | $D_w/D_t$ | 0.98 | 0.92 | 1.00 | 0.85 | 0.97 |
| (12B) | $AVE(nd)$ | 1.785 | 1.805 | 1.798 | 1.804 | 1.798 |
| (13B) | $f_t/f_w$ | 5.76 | 4.80 | 4.80 | 4.80 | 4.80 |

|  |  | Example 6 | Example 7 | Example 8 | Example 9 | Example 10 |
|---|---|---|---|---|---|---|
| (1B) | $(r_{1a}+r_{1b})/(r_{1a}-r_{1b})$ | 0.77 | 0.62 | 0.83 | 0.66 | 0.64 |
| (2B) | $\Sigma 2_G/ih$ | 1.60 | 1.65 | 1.65 | 1.60 | 1.78 |
| (3B) | $\Delta 2_G/f_2$ | 1.97 | 1.92 | 1.95 | 1.91 | 1.68 |
| (4B) | $f_2/r_{3a}$ | 1.76 | 1.91 | 1.86 | 1.88 | 1.80 |
| (5B) | $f_2/L_3$ | 1.49 | 1.46 | 1.40 | 1.60 | 1.49 |
| (6B) | $L_6/L_3$ | 6.06 | 3.58 | 2.77 | 4.90 | 1.49 |
| (7B) | $AVE(n_{dg1})$ | 1.927 | 1.993 | 1.993 | 1.927 | 1.927 |
| (8B) | $P_2/P_3$ | 1.64 | 1.42 | 1.54 | 1.81 | −99.41 |
| (9B) | $\beta_2(t)/\beta_2(w)$ | 4.47 | 5.17 | 5.30 | 4.98 | 4.81 |
| (10B) | $\beta_3(t)/\beta_3(w)$ | 1.08 | 1.12 | 1.09 | 0.96 | 1.00 |
| (11B) | $D_w/D_t$ | 0.98 | 0.92 | 0.98 | 0.93 | 1.03 |
| (12B) | $AVE(nd)$ | 1.807 | 1.785 | 1.785 | 1.769 | 1.754 |
| (13B) | $f_t/f_w$ | 4.80 | 5.76 | 5.76 | 4.80 | 4.80 |

(Signal Processing of Chromatic Aberration of Magnification)

The image pickup apparatus has an image transformation section that transforms, by image processing, an electrical signal representing an image formed by the zoom lens into an image signal in which color misregistration caused by chromatic aberration of magnification is corrected. The image transformation section can transform, by image processing, an electrical signal representing an image containing distortion attributed to the zoom lens into an image signal representing an image in which distortion is corrected and transform, by image processing, an electrical signal representing an image containing chromatic aberration of magnification attributed to the zoom lens into an image signal in which chromatic aberration is corrected.

By correcting chromatic aberration of magnification attributed to the zoom lens electrically by the image transformation section, images having better image quality can be obtained.

In electronic still cameras, an image of an object is generally separated into images of three primary colors or first, second, and third primary colors, and a color image is reproduced by superimposing the output signals of the respective colors by computation. In a case where the zoom lens has chromatic aberration of magnification, if the image with the first primary color light is taken as a reference, the positions at which the images with the second primary color light and the third primary color light are formed will be displaced from the position at which the image with the first primary color light is formed.

In order to electrically correct chromatic aberration of magnification of an image, the amounts of displacement of the image positions with the second primary color light and the third primary color light relative to the image position with the first primary color light are obtained in advance for each pixel of the image pickup element based on information on the aberration of the zoom lens. Then, coordinate transformation may be performed for each pixel of a picked up image in such away that the displacement relative to the image position with the first primary color light is corrected. In a case, for example, where an image is composed of three primary color output signals of red (R), green (G), and blue (B), displacements in the R and B image positions from the G image position may be obtained for each pixel in advance, and coordinate transformation may be performed on the picked up image to correct or eliminate displacement from the G image position, and R and B signals after correction may be output.

Since chromatic aberration of magnification changes depending on the zoom position, the focus position, and the stop value, it is preferred that displacement amounts of the image positions with the second and the third primary colors relative to the image position with the first primary color for every lens position (i.e. zoom position, focus position and stop value) be stored as correction data in a memory device. Such correction data may be referred to in accordance with the lens position. Thus, the second and third primary color signals that have been corrected in terms of displacement relative to the first primary color signal can be output.

(Antireflection Coating)

For preventing the occurrence of the ghost and the flare, generally, the antireflection coating is applied to a surface of a lens in contact with air.

On the other hand, at a cemented surface of a cemented lens, a refractive index of an adhesive is sufficiently higher than a refractive index of air. Therefore, in many cases, a reflectance is originally of the level of a single-layer coating, or lower, and the coating is applied in few cases. However, when the antireflection coating is applied positively even to the cemented surface, it is possible to reduce further the ghost and the flare, and to achieve a more favorable image.

Particularly, recently, a glass material having a high refractive index has been widely used in an optical system of cameras, for having a high effect on the aberration correction. However, when the glass material having a high refractive index is used as a cemented lens, a reflection at the cemented surface becomes unignorable. In such a case, applying the antireflection coating on the cemented surface is particularly effective.

An effective usage of the cemented surface coating has been disclosed in Japanese Patent Application Laid-open Publication No. Hei 2-27301, No. 2001-324676, No. 2005-92115, and U.S. Pat. No. 7,116,482. In these patent literatures, a cemented lens surface coating in a first lens unit of a positive preceding zoom lens system has been described, and the same as disclosed in these patent literatures may be implemented for the cemented lens surface in the first lens unit having a positive power, of the present invention.

As a coating material to be used, according to a refractive index of the adhesive material and a refractive index of the lens which is a base, coating materials such as $Ta_2O_5$, $TiO_2$, $Nb_2O_5$, $ZrO_2$, $HfO_2$, $CeO_2$, $SnO_2$, $In_2O_2$, $ZnO$, and $Y_2O_3$ having a comparatively higher refractive index, and coating materials such as $MgF_2$, $SiO_2$, and $Al_2O_2$ having a comparatively lower refractive index may be selected appropriately, and set to a film thickness which satisfies phase conditions.

Naturally, similar to the coating on the surface of the lens in contact with air, the coating on the cemented surface may also be let to be a multi layer coating. By combining appropriately a film thickness and a coating material of number of films not less than in two layers, it is possible to reduce further the reflectance, and to control spectral characteristics and angular characteristics.

Moreover, it is needless to mention that for the cemented surface of lenses other than the lenses in the first lens unit, it is effective to apply the coating on the cemented surface based on a similar idea.

(Correction of Distortion)

Incidentally, when the zoom lens system of the present invention is used, a digital correction of distortion of an image is carried out electrically. A basic concept for the digital correction of the distortion of an image will be described below.

Figure 23:
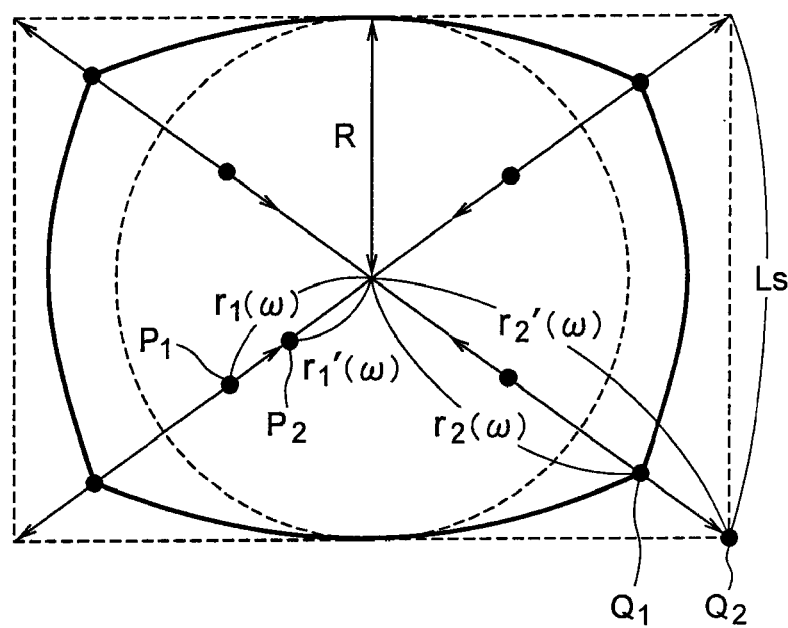
FIG. 23 is a diagram illustrating correction of distortion.

For example, as shown in FIG. 23, with a point of intersection of an optical axis and an image pickup plane to be a center, a magnification on a circumference (image height) of a circle of radius R making a contact internally with a longer side of an effective image pickup plane is fixed, and this circumference is let to be a base reference for the correction. Next, each point on a circumference (image height) of an arbitrary radius $r(\omega)$ other than the radius R is moved in a substantial direction of radiation, and the correction is carried out by moving on a concentric circle such that the radius becomes $r'(\omega)$.

For example, in FIG. 23, a point $P_1$ on a circumference of an arbitrary radius $r_1(\omega)$ positioned at an inner side of a circle of radius R is moved to a point $P_2$ on a circumference of a radius $r_1'(\omega)$ which is to be corrected, directed toward a center of the circle. Moreover, a point $Q_1$ on a circumference of an arbitrary radius $r_2(\omega)$ positioned at an outer side of the circle of radius R is moved to a point $Q_2$ on a circumference of a radius $r_2'(\omega)$ which is to be corrected, directed toward a direction away from the center of the circle.

Here, $r'(\omega)$ can be expressed as follows.

$$r'(\omega) = \alpha \cdot f \cdot \tan \omega \quad (0 \leq \alpha \leq 1)$$

where, $\omega$ is a half image angle of an object and f is a focal length of an imaging optical system (the zoom lens system in the present invention).

Here, when an ideal image height corresponding to a circle (image height) of radius R is let to be Y, then $$\alpha = R/Y = R/(f \cdot \tan \omega).$$

The optical system, ideally, is rotationally symmetric with respect to an optical axis. In other words, the distortion also occurs in a rotationally symmetric manner with respect to the optical axis. Consequently, as it has been described above, in a case of correcting electrically the optical distortion, when it is possible to carry out correction by fixing a magnification on a circumference (image height) of the circle of radius R making a contact internally with a longer side of the effective image pickup plane, with a point of intersection of an optical axis on a reproduced image, and an image pickup plane to be a center, and moving each point on the circumference (image height) of radius $r(\omega)$ other than the radius R in a substantial direction of radiation, and moving on a concentric circle such that the radius becomes $r'(\omega)$, it can be considered to be advantageous from a point of amount of data and amount of calculation.

Incidentally, an optical image ceases to be a continuous amount at a point of time when an image is picked up by an electronic image pickup element (due to sampling). Consequently, the circle of radius R which is drawn exactly on the optical image ceases to be an accurate circle as long as pixels on the electronic image pickup element are not arranged radially.

In other words, regarding a shape correction of image data expressed for each discrete coordinate point, a circle which can fix the magnification does not exist. Therefore, for each pixel (Xi, Yj), a method of determining coordinates of a destination of movement (Xi', Yj') may be used. When two or more points (Xi, Yj) have moved to the coordinates (Xi', Yj'), an average of values of each pixel is taken. Moreover, when there is no point which has moved, interpolation may be performed by using a value of coordinate (Xi', Yj') of some of the surrounding pixels.

Such method is effective for correction when the distortion with respect to the optical axis is remarkable due to a manufacturing error etc. of the optical system or the electronic image pickup element, in the electronic image pickup apparatus having the zoom lens system in particular, and when the circle of the radius R drawn on the optical image is asymmetric. Moreover, it is effective for correction when there occurs to be a geometric distortion at the time of reproducing a signal to an image in an image pickup element or various output devices.

In the electronic image pickup apparatus of the present invention, for calculating a correction amount $r'(\omega) - r(\omega)$, an arrangement may be made such that a relationship between $r(\omega)$, in other words, half image angle and the image height, or a relationship between a real image height r and an ideal image height $r'/\alpha$ is recorded in a recording medium which is built-in in the electronic image pickup apparatus.

For an image after the distortion correction, not to have an extreme shortage of an amount of light at both ends in a direction of short side, the radius R may satisfy the following conditional expression.

$$0 \leq R \leq 0.6 Ls$$

where, Ls is a length of a short side of the effective image pickup surface.

It is preferable that the radius R satisfies the following conditional expression.

$$0.3 Ls \leq R \leq 0.6 Ls$$

Furthermore, it is most advantageous to match the radius R with a radius of a circle making an internal contact in a short side direction of a substantially effective image pickup plane. In a case of correction in which, the magnification is fixed near the radius R=0, in other words, near on the axis, it is somewhat disadvantageous from an aspect of substantial number of images, but it is possible to secure an effect for making the size small even when the angle is widened.

A focal length interval which requires a correction is divided into a number of focal point zones. Moreover, the correction may be carried out with the amount of correction as in a case in which, a correction result which satisfies substantially the following relationship $$r'(\omega) = \alpha \cdot f \cdot \tan \omega$$

near a telephoto end in the focal point zones which are divided.

However, in this case, at a wide angle end in the focal point zones which are divided, a barrel-shape distortion at the wide angel end of the focal point zones which are divided is remained to some extent. Moreover, when the number of divided zones is increased, there arises a need to hold specific data necessary for correction, additionally in a recording medium. Therefore it is not preferable to increase the number of divided zones. Therefore, one or a plurality of coefficients associated with each focal length in the focal point zones which are divided, are calculated in advance. The coefficients may be determined based on a measurement by simulation or by actual equipment.

An amount of correction in a case in which, the correction result which satisfies substantially the following relationship $$r'(\omega) = \alpha \cdot f \cdot \tan \omega$$

near the telephoto end in the focal point zones which are divided may be calculated, and may let to be a final amount of correction by multiplying uniformly the coefficient for each focal length with respect to this amount of correction.

Incidentally, when there is no distortion in an image achieved by imaging (forming an image) of an infinite object, the following relationship $$f = y/\tan \omega$$

holds.

Here, y denotes a height (image height) of an image point from the optical axis, f denotes a focal length of an imaging system (zoom lens system in the present invention), and ω denotes an angle (object half image angle) with respect to the optical axis in an object point direction corresponding to image points connecting from a center on an image pickup plane up to a position of y.

When there is a barrel-shape distortion in the imaging system, the relationship becomes $$f > y/\tan \omega.$$

In other words, when the focal length f of the imaging system, and the image height y are let to be fixed, a value of ω becomes large.

(Digital Camera)

Figure 24:
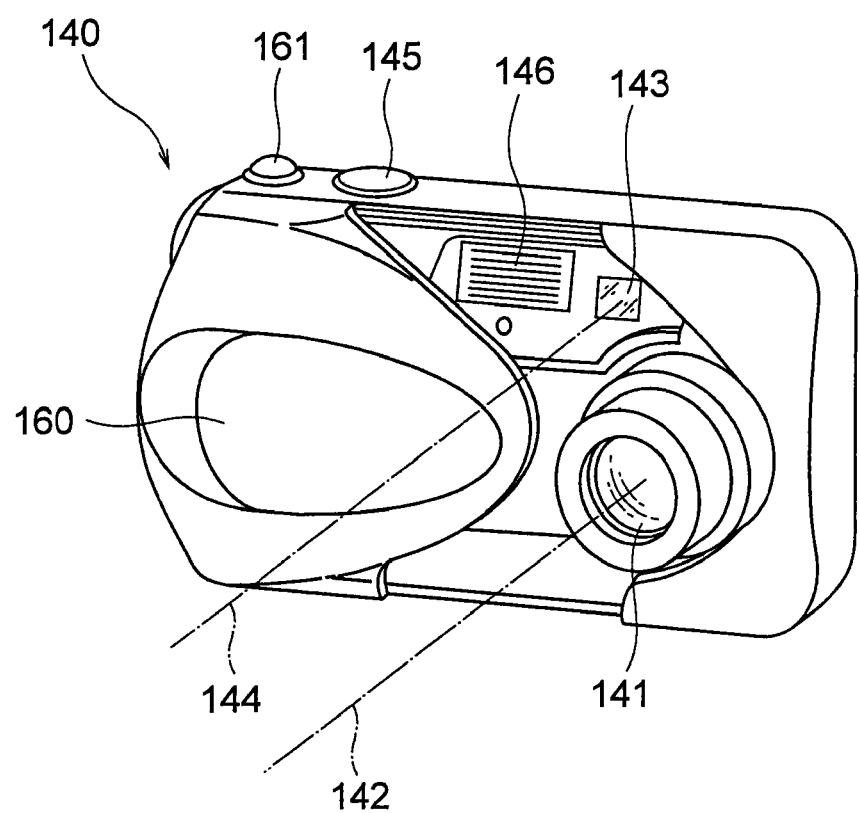
FIG. 24 is a front perspective view showing an outer appearance of a digital camera equipped with a collapsible zoom lens according to the present invention.
Figure 25:
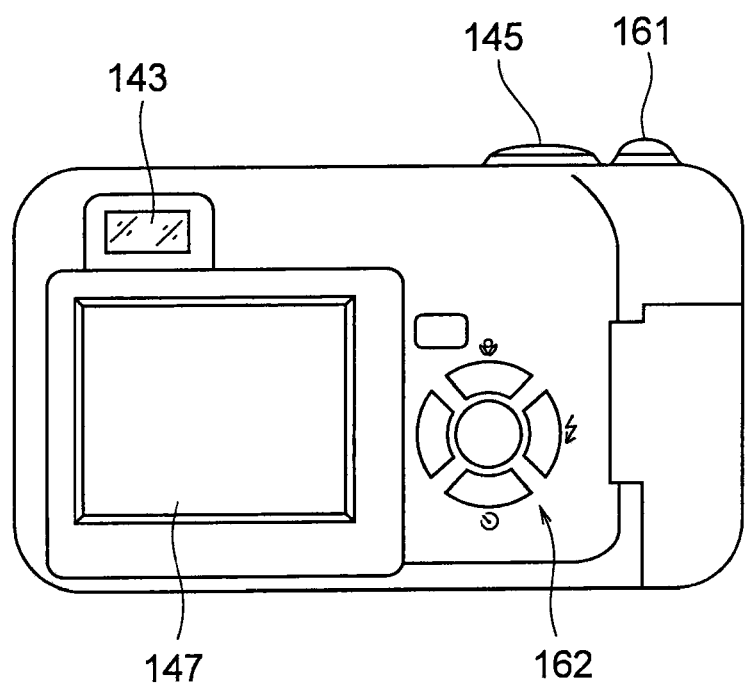
FIG. 25 is a rear view of the digital camera.

FIG. 24 to FIG. 26 are conceptual diagrams of a structure of a digital camera according to the present invention in which a zoom lens system described above is incorporated in a taking optical system 141. FIG. 24 is a front perspective view showing an appearance of a digital camera 140, FIG. 25 is a rear view of the same, and FIG. 26 is a schematic cross-sectional view showing a structure of the digital camera 140. In FIG. 24 and FIG. 26, show an uncollapsed state of the taking optical system 141. The digital camera 140, in a case of this example, includes the taking optical system 141 having a taking optical path 142, a finder optical system 143 having a finder optical path 144, a shutter button 145, a flash 146, a liquid-crystal display monitor 147, a focal-length changing button 161, and a setting changing switch 162 etc., and in the uncollapsed state of the taking optical system 141, by sliding a cover 160, the taking optical system 141, the finder optical system 143, and the flash 146 are covered by the cover 160. Further, when the cover 160 is opened and the digital camera is set in a photo taking state, the taking optical system 141 assumes the uncollapsed state as shown in FIG. 26 when the shutter button 145 disposed on an upper portion of the digital camera 140 is pressed, in synchronization with the pressing of the shutter button 145, a photograph is taken by the taking optical system 141 such as the zoom lens system in the first embodiment. An object image formed by the taking optical system 141 is formed on an image pickup surface of a CCD 149 via a cover glass C and a low pass filter on which a wavelength region restricting coating is applied. An object image which is received as light by the CCD 149 is displayed on the liquid-crystal display monitor 147 which is provided on a rear surface of the digital camera 140 as an electronic image, via a processing means 151. Moreover, a recording means 152 is connected to the processing means 151, and it is also possible to record the electronic image which is taken. The recording means 152 may be provided separately from the processing means 151, or may be formed by recording by writing electronically in a flexible disc, a memory card, or an MO etc.

Moreover, the camera may be formed as a silver-salt camera in which a silver-salt film is disposed instead of the CCD 149.

Furthermore, a finder objective optical system 153 is disposed on the finder optical path 144. The finder objective optical system 153 consists of a plurality of lens units (three units in the diagram), and two prisms, and is made of a zoom optical system in which a focal length changes in synchronization with a zoom lens system of the taking optical system 141. An object image formed by the finder objective optical system 153 is formed on a field frame 157 of an erecting prism 155 which is an image erecting member. On a rear side of the erecting prism 155, an eyepiece optical system 159 which guides an erected image to a viewer's eyeball, is disposed. A cover member 150 is disposed on an emergence side of the eyepiece optical system 159.

Since the digital camera 140 structured in such manner has the taking optical system 141 according to the present invention, has an extremely small thickness in collapsed state, and an extremely stable imaging performance in the entire zooming region at high magnification, it is possible to realize a high-performance, a small size, and a widening of angle.

(Internal Circuit Structure)

FIG. 27 is a structural block diagram of an internal circuit of main components of the digital camera 140. In the following description, the processing means 151 described above includes for instance, a CDS/ADC section 124, a temporary storage memory 117, and an image processing section 118, and a storage means 152 consists of a storage medium section 119 for example.

As shown in FIG. 27, the digital camera 140 includes an operating section 112, a control section 113 which is connected to the operating section 112, the temporary storage memory 117 and an imaging drive circuit 116 which are connected to a control-signal output port of the control section 113, via a bus 114 and a bus 115, the image processing section 118, the storage medium section 119, a display section 120, and a set-information storage memory section 121.

The temporary storage memory 117, the image processing section 118, the storage medium section 119, the display section 120, and the set-information storage memory section 121 are structured to be capable of mutually inputting and outputting data via a bus 122. Moreover, the CCD 149 and the CDS/ADC section 124 are connected to the imaging drive circuit 116.

The operating section 112 includes various input buttons and switches, and is a circuit which informs the control section, event information which is input from outside (by a user of the digital camera) via these input buttons and switches.

The control section 113 is a central processing unit (CPU), and has a built-in computer program memory which is not shown in the diagram. The control section 113 is a circuit which controls the entire digital camera 140 upon receiving instructions and commands input by the user of the camera via the operating section 112, according to a computer program stored in this computer program memory.

The CCD 149 receives as light an object image which is formed via the taking optical system 141 according to the present invention. The CCD 149 is an image pickup element which is driven and controlled by the imaging drive circuit 116, and which converts an amount of light for each pixel of the object image to an electric signal, and outputs to the CDS/ADC section 124.

The CDS/ADC section 124 is a circuit which amplifies the electric signal which is input from the CCD 149, and carries out analog/digital conversion, and outputs to the temporary storage memory 117 image raw data (bare data, hereinafter called as 'RAW data') which is only amplified and converted to digital data.

The temporary storage memory 117 is a buffer which includes an SDRAM (Synchronous Dynamic Random Access Memory) for example, and is a memory device which stores temporarily the RAW data which is output from the CDS/ADC section 124. The image processing section 118 is a circuit which reads the RAW data stored in the temporary storage memory 117, or the RAW data stored in the storage medium section 119, and carries out electrically various image-processing including the distortion correction, based on image-quality parameters specified by the control section 113.

The storage medium section 119 is a recording medium in the form of a card or a stick including a flash memory for instance, detachably mounted. The storage medium section 119 is a control circuit of a device in which, the RAW data transferred from the temporary storage memory 117 and image data subjected to image processing in the image processing section 118 are recorded and maintained in the card flash memory and the stick flash memory.

The display section 120 includes the liquid-crystal display monitor, and is a circuit which displays images and operation menu on the liquid-crystal display monitor. The set-information storage memory section 121 includes a ROM section in which various image quality parameters are stored in advance, and a RAM section which stores image quality parameters which are selected by an input operation on the operating section 112, from among the image quality parameters which are read from the ROM section. The set-information storage memory section 121 is a circuit which controls an input to and an output from the memories.

The digital camera 140 structured in such manner has the taking optical system 141, according to the present invention, which, while having a sufficient wide angle region, and a compact structure, has an extremely stable imaging performance in the entire magnification region at a high magnification. Therefore, it is possible to realize the high performance, the small size, and widening of the angle. Moreover, a prompt focusing operation at the wide angle side and the telephoto side is possible.

As described in the foregoing, the zoom lens according to the present invention is useful in cases where a high zoom ratio, a wide angle of view, and size reduction are to be achieved.

The image pickup apparatus according to the present invention is useful in cases where a high zoom ratio, a wide angle of view, and size reduction are to be achieved.

What is claimed is:

1. An image pickup apparatus comprising:
a zoom lens; and
an image pickup element disposed on the image side of the zoom lens, the image pickup element comprising an image pickup surface and converting an image formed on the image pickup surface by the zoom lens into an electrical signal, wherein
the zoom lens comprises, in order from its object side, a first lens unit having a negative refracting power, a second lens unit having a positive refracting power, and a third lens unit,
the zoom lens further comprises an aperture stop that moves integrally with the second lens unit during zooming from the wide angle end to the telephoto end,
during zooming from the wide angle end to the telephoto end, the first lens unit and the second lens unit move, and a distance between the lens units changes,
the first lens unit comprises, in order from the object side, a negative lens and a positive lens,
the total number of lens elements in the first lens unit is two,
the second lens unit comprises four lens elements comprising a positive lens and a negative lens,
the total number of lens elements in the second lens unit is four, and
the zoom lens satisfies the following conditional expressions (1B), (2B), and (3B):

$$-1.0<(r_{1a}+r_{1b})/(r_{1a}-r_{1b})<0.98 \quad (1B)$$

$$0.30<\sigma_{2G}/ih(\max)<2.80 \quad (2B)$$

$$1.5<\Delta_{2G}/f_2<5 \quad (3B),$$

where $r_{1a}$ and $r_{1b}$ are paraxial radii of curvature of an object side surface and an image side surface of the negative lens in the first lens unit respectively, $\sigma_{2G}$ is a thickness of the second lens unit on the optical axis, ih(max) is a maximum value of a maximum image height in an effective image pickup area on the image pickup surface, $\Delta_{2G}$ is a displacement of the position of the second lens unit at the telephoto end from the position thereof at the wide angle end, wherein a displacement toward the object side is represented by a positive value, and $f_2$ is a focal length of the second lens unit.

2. The image pickup apparatus according to claim 1, wherein the lens closest to the object side in the second lens unit is a positive lens, and the following conditional expression (4) is satisfied:

$$1.1<f_2/r_{3a}<3.0 \quad (4B),$$

where $r_{3a}$ is a paraxial radius of curvature of a refracting surface closest to the object side in the second lens unit.

3. The image pickup apparatus according to claim 1, wherein the zoom lens is a three-unit zoom lens, and the third lens unit has a positive refracting power.

4. The image pickup apparatus according to claim 1, wherein at least two adjacent lenses in the second lens unit are cemented together.

5. The image pickup apparatus according to claim 1, wherein a lens closest to the object side in the second lens unit satisfies the following conditional expression (5B):

$$1.1<f_2/L_3<3.0 \quad (5B),$$

where $L_3$ is a focal length of the lens closest to the object side in the second lens unit.

6. The image pickup apparatus according to claim 1, wherein the second lens unit comprises three positive lenses and one negative lens.

7. The image pickup apparatus according to claim 1, wherein a lens closest to the object side and a lens closest to the image side in the second lens unit are positive lenses that satisfy the following conditional expression (6B):

$$1.7<L_6/L_3<10 \quad (6B),$$

where $L_3$ is a focal length of the lens closest to the object side in the second lens unit, and $L_6$ is a focal length of the lens closest to the image side in the second lens unit.

8. The image pickup apparatus according to claim 1, wherein the average of refractive indices for the d-line of all the lenses in the first lens unit satisfies the following conditional expression (7B):

$$1.87<AVE(n_{dg1})<2.40 \quad (7B),$$

where $AVE(n_{dg1})$ is the average of the refractive indices for the d-line of all the lenses in the first lens unit.

9. The image pickup apparatus according to claim 1, wherein the third lens unit has a positive refracting power, and the refracting power of the second lens unit and the refracting power of the third lens unit satisfy the following conditional expression (8B):

$$1.0 < P_2/P_3 < 4.0 \tag{8B}$$

where $P_2$ is the refracting power of the second lens unit, and $P_3$ is the refracting power of the third lens unit.

10. The image pickup apparatus according to claim 1, wherein the second lens unit and the third lens unit satisfy the following conditional expressions (9B) and (10B):

$$4.0 < \beta_2(t)/\beta_2(w) < 10.0 \tag{9B}$$

$$0.7 < \beta_3(t)/\beta_3(w) < 2.0 \tag{10B},$$

where $\beta_2(w)$ is a lateral magnification of the second lens unit at the wide angle end, $\beta_2(t)$ is a lateral magnification of the second lens unit at the telephoto end, $\beta_3(w)$ is a lateral magnification of the third lens unit at the wide angle end, and $\beta_3(t)$ is a lateral magnification of the third lens unit at the telephoto end.

11. The image pickup apparatus according to claim 1, wherein the third lens unit has a positive refracting power, and an optical path length of the zoom lens at the wide angle end and an optical path length of the zoom lens at the telephoto end satisfy the following conditional expression (11B):

$$0.5 < D_w/D_t \le 1.0 \tag{11B},$$

where $D_w$ is the optical path length from the object side surface to the image pickup surface of the zoom lens at the wide angle end, and $D_t$ is the optical path length from the object side surface to the image pickup surface of the zoom lens at the telephoto end.

12. The image pickup apparatus according to claim 1, wherein the zoom lens satisfies the following conditional expression (13B):

$$3.6 < f_t/f_w < 10 \tag{13B},$$

where $f_w$ is a focal length of the zoom lens at the wide angle end, and $f_t$ is a focal length of the zoom lens at the telephoto end.

13. The image pickup apparatus according to claim 1 comprising an image transformation section that transforms, by image processing, an electrical signal representing an image containing distortion attributed to the zoom lens into an image signal in which distortion is corrected.

14. The image pickup apparatus according to claim 1 comprising:
an image transformation section that transforms, by image processing, an electrical signal containing chromatic aberration of magnification attributed to the zoom lens into an image signal in which chromatic aberration of magnification is corrected.

15. The image pickup apparatus according to claim 1 comprising a fourth lens unit disposed on the image side of the third lens unit.

16. The image pickup apparatus according to claim 15, wherein the fourth lens unit has a positive refracting power.

* * * * *